`US010769573B2`

United States Patent
Frederico et al.

(10) Patent No.: US 10,769,573 B2
(45) Date of Patent: *Sep. 8, 2020

(54) SYSTEM AND METHOD SUPPORTING ONGOING WORKER FEEDBACK

(71) Applicant: TRANSFORM SR BRANDS LLC, Hoffman Estates, IL (US)

(72) Inventors: Adam Robert Frederico, Elgin, IL (US); Naveen Seshadri, Chicago, IL (US); John C. Schneider, East Grand Rapids, MI (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/111,883

(22) Filed: Aug. 24, 2018

(65) Prior Publication Data

US 2019/0095832 A1  Mar. 28, 2019

Related U.S. Application Data

(63) Continuation of application No. 14/705,570, filed on May 6, 2015, now Pat. No. 10,089,588.

(60) Provisional application No. 61/989,351, filed on May 6, 2014.

(51) Int. Cl.
*G06Q 10/06* (2012.01)

(52) U.S. Cl.
CPC ... *G06Q 10/0637* (2013.01); *G06Q 10/06398* (2013.01); *Y04S 10/54* (2013.01)

(58) Field of Classification Search
CPC ......... G06Q 10/00; G06Q 40/00; G06Q 40/06
USPC .............................................. 705/7.36, 7.12
See application file for complete search history.

(56) References Cited

U.S. PATENT DOCUMENTS

| 8,301,482 | B2* | 10/2012 | Reynolds | G06Q 10/06 705/7.29 |
| 2004/0111314 | A1* | 6/2004 | Cavaretta | G06Q 30/02 705/7.32 |
| 2011/0071956 | A1* | 3/2011 | Pinto | G06F 17/50 705/348 |
| 2011/0178865 | A1* | 7/2011 | Ravichandran | G06Q 10/06 705/14.42 |
| 2013/0144685 | A1* | 6/2013 | Reynolds | G06Q 10/0637 705/7.32 |

OTHER PUBLICATIONS

Melanie et al "How can we best visualize worker movement throughout the day?", Oct. 2013, Southern Demographic Association Conference, pp. 1-12 (Year: 2013).*

* cited by examiner

*Primary Examiner* — Romain Jeanty
(74) *Attorney, Agent, or Firm* — McAndrews, Held & Malloy, Ltd.

(57) ABSTRACT

A system and method that enables the ongoing communication, tracking, and management review of feedback among a population of workers and their management.

21 Claims, 53 Drawing Sheets

Current Suggested Actions:

1. Read this interesting article about gaining trust in workplace.
    Click here to view the pdf.
2. Demonstrate 'Strategic Thinking' more by doing ... Watch this video here:
3. Ask more feedback from 'Associates who report to me'
4. Aim for 100% feedback request fulfillment

SYSTEM AND METHOD SUPPORTING ONGOING WORKER FEEDBACK

CROSS-REFERENCE TO RELATED APPLICATIONS

The present application is a continuation of U.S. patent application Ser. No. 14/705,570, filed May 6, 2015, titled "System and Method Supporting Ongoing Worker Feedback," now U.S. Pat. No. 10,089,588, which makes reference to, claims benefit of, and claims priority to U.S. Provisional Patent Application No. 61/989,351, filed May 6, 2014, both of which are hereby incorporated herein by reference, in their respective entirety.

FIELD

Aspects of the disclosure relate to systems and methods that support worker performance evaluation and feedback. More specifically, certain aspects of the present disclosure relate to systems and methods that support the ongoing communication, tracking, and management review of feedback among a population of workers and their management.

BACKGROUND

The typical performance review process for workers is incredibly manual. Goals may be standardized and may not be communicated in advance. As a result, workers may not have personalized goals, and may be reviewed on goals and/or metrics of which they may not have been aware until they meet with their manager for the typical year-end review. In some cases, reviews may be given to workers that joined an organization prior to a certain date. However, because of high turnover rates, some workers that have only been with the organization for a short period of time may be subject to review. The quality of the review conversation typically varies greatly with little focus on worker development opportunities.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and method that enables ongoing communication, tracking, and management review of feedback among a population of workers and their management, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 11 illustrates an exemplary screen image showing an example page that permits the individual giving feedback to select the topic of the feedback to be given, in accordance with a representative embodiment of the present disclosure.

FIG. 14 illustrates another exemplary "Give Feedback" page for Step 3 of the process of giving feedback, in accordance with a representative embodiment of the present disclosure.

FIG. 15 illustrates still another example "Give Feedback" page for Step 3 of the process of giving feedback, in accordance with a representative embodiment of the present disclosure.

FIG. 16 illustrates another example "Give Feedback" page for Step 3 of the process of giving feedback, in accordance with a representative embodiment of the present disclosure.

FIG. 17 illustrates an exemplary "Feedbacks Draft" page for use in the process of giving feedback to an individual, in accordance with a representative embodiment of the present disclosure.

FIG. 33 illustrates an example screen image showing another "Feedback Requests" page similar to that shown in FIG. 6, in accordance with a representative embodiment of the present disclosure.

FIG. 45 illustrates an example screen image showing another "Feedback Drafts" page similar to that shown in FIG. 17, in accordance with a representative embodiment of the present disclosure.

FIG. 49 illustrates a chart showing example topics, working relationships, capabilities, and questions to gather feedback, and quantitative scales used in user interfaces related to giving and requesting feedback, in accordance with a representative embodiment of the present disclosure.

DETAILED DESCRIPTION

Aspects of the disclosure relate to systems and methods that support worker performance evaluation and feedback. More specifically, certain aspects of the present disclosure relate to systems and methods that support the ongoing communication, tracking, and management review of feedback among a population of workers and their management.

The following description of example methods and apparatus is not intended to limit the scope of the description to the precise form or forms detailed herein. Instead the following description is intended to be illustrative so that others may follow its teachings.

The terms "merchant" and "sponsoring merchant/merchants" may be used herein to refer to the owner and/or operator of a business enterprise that operates either or both of traditional "brick-and-mortar" business locations or an e-commerce or social e-commerce platform as described herein, or enters into an agreement with another to operate such a platform on their behalf.

The terms "member," "end-user," and "user" may be used herein interchangeably to refer to workers in a merchant, business enterprise, or other organization that has individuals whose skills, performance, and behaviors are evaluated.

The term "e-commerce" may be used herein to refer to business or commerce that is transacted electronically, as over the Internet.

The term "social e-commerce" may be used herein to refer to e-commerce in which consumers interact with other consumers socially as part of e-commerce activities. Merchants or businesses may take part in social e-commerce by engaging consumers in various activities including, by way of example and not limitation, email messaging, text messaging, games, and posting or monitoring of activities and information exchanged on social networking platforms (e.g., Facebook®) and/or merchant supported social networks.

The term "crowdsourcing" may be may be used herein to refer to the practice of obtaining needed services, ideas, or content by soliciting contributions from a large group of people. The terms "crowdsource" and "crowdsource population" may be used herein to refer to a large group of people from which contributions of services, ideas, or content may be solicited.

As utilized herein, the terms "exemplary" or "example" means serving as a non-limiting example, instance, or illustration. As utilized herein, the term "e.g." introduces a list of one or more non-limiting examples, instances, or illustrations.

The methods and systems disclosed herein may be part of an overall performance feedback system for use in organizations and enterprises where feedback between and among workers and management is desired.

Figure 1:
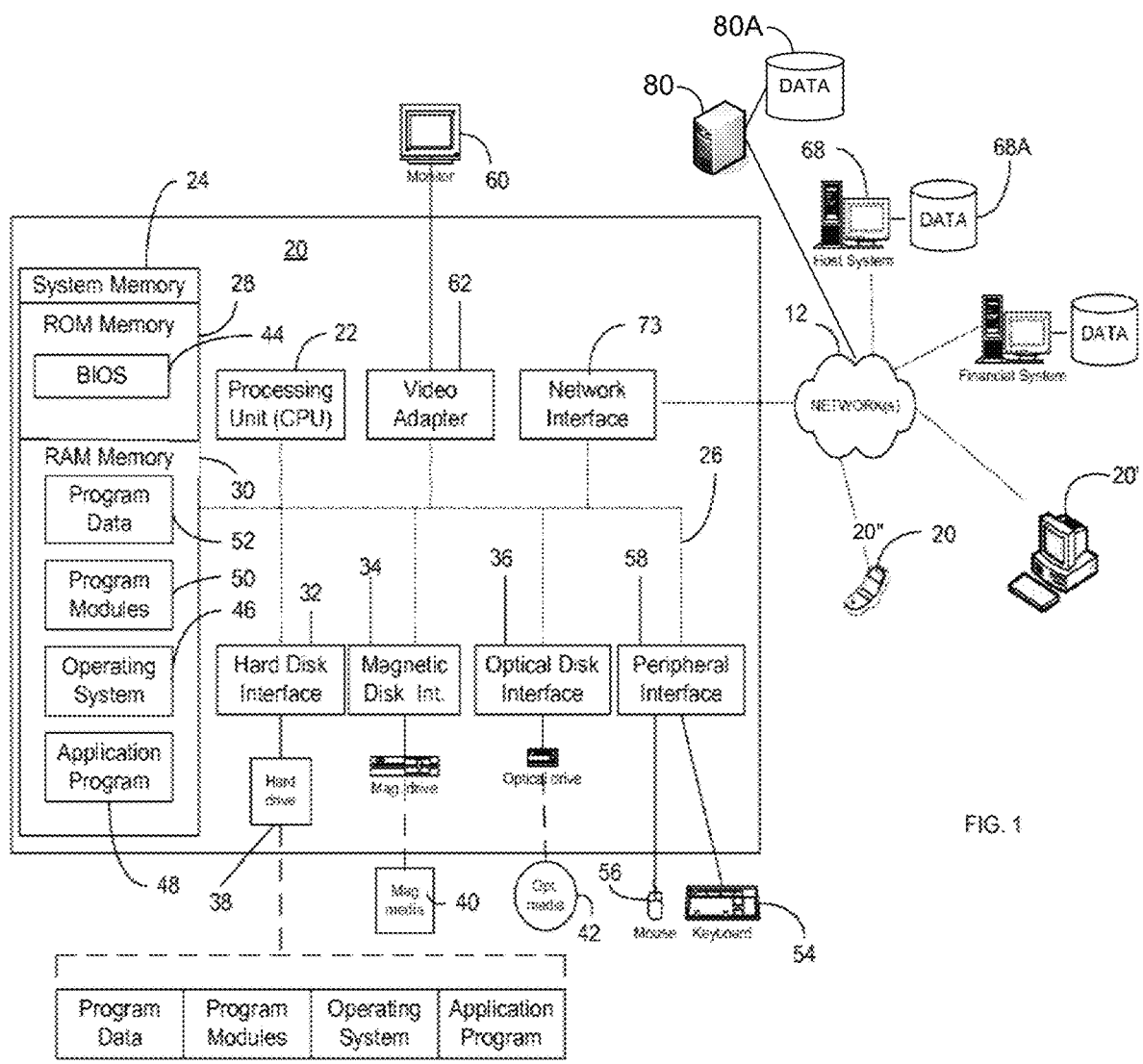
FIG. 1 is an illustration of computer network, in which a representative embodiment of the present disclosure may be practiced.

FIG. 1 is an illustration of exemplary computer network 100 in which a representative embodiment of the present disclosure may be practiced. The following discloses various example systems and methods for, by way of example and not limitation, directing queries to the most suitable potential responders of an audience selected from a crowdsourced population from which to request information, based on information such as query content, query context, and source of the query. Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("FDA"), cellular telephone, tablet computer, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, coordinating storage and retrieval of documents; maintaining social network storage of a shopping list; receiving a location of a customer via a mobile device; maintaining maps and layouts of buildings and geographic areas; calculating directions or routes within buildings and geographic areas; searching, retrieving, and analyzing web-based content; managing operating rules and communication with user devices used by participants in a multiplayer consumer game, for receiving a request for a service call center connection from either a customer or a sales associate; routing a received request via a distributed mobile video call center; receiving questions from individuals seeking information, distributing the questions to a targeted audience, and returning suitable answers to the requestor; and providing a service call infrastructure for providing the requestor with a distributed customer service experience.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

In addition to the elements of FIG. 1 described above, the computer network 100 of FIG. 1 may include a computer system 80 with data repository 80A, which may be specifically configured to support storage the data structures and executable code supporting the operation of a representative embodiment of the present disclosure, a communication interfaces to enable communication with user communication devices that support submission and display of feedback information as described herein.

A representative embodiment of the present disclosure permits workers to receive feedback (e.g., both unsolicited and solicited) from a 360° perspective on a continuous basis throughout the year. This provides workers with a dynamic understanding of their performance and any development needs. Workers may view trend lines of feedback they receive allowing them to monitor variation over time, and may request specific characteristics or skills for which they would like feedback, and may categorize feedback based on type of feedback and the individual that provided the feedback. Managers are enabled to not only view personal feedback that they receive, but to also view feedback that their direct reports receive.

A representative embodiment of the present disclosure provide the functionality needed for workers to see graphical trends of the feedback received, not just the verbatim, written feedback received from others. A representative embodiment of the present disclosure provides a responsive form for providing feedback, in which the form adapts based on input provided by the individual giving feedback. In some representative embodiments of the present invention, the form for providing feedback for a particular worker may be automatically adjusted based on feedback already received from other individuals that provided feedback for that particular worker, so that additional information may be gathered for areas of performance behaviors not covered by previous reviewers, or areas touched upon or mentioned by previous reviewers, but about which additional feedback from additional reviewers would be helpful. The individual providing feedback may provide quantitative indications of feedback such as, by way of example and not limitation, a numeric or "star"-based indication, and/or a qualitative or free-form text-based feedback mechanism to permit written elaboration or explanation concerning the reason(s) for the feedback, and providing greater detail about the nature of the feedback. The system may use the quantitative information to enable tracking and comparison of the behavior and performance of individuals in an organization at various geographic granularities. Requests for feedback may be targeted at any individual in the organization in which an embodiment of the present disclosure is used, and an expiration date assigned to each request helps to make the feedback that is received timely and relevant. Failure of members to respond to requests for feedback may be tracked, and reminders to non-responding members requesting their feedback may be automatically generated. A representative embodiment of the present disclosure provides flexible filtering of feedback received, pending feedback requests, and feedback given.

Figure 2A:
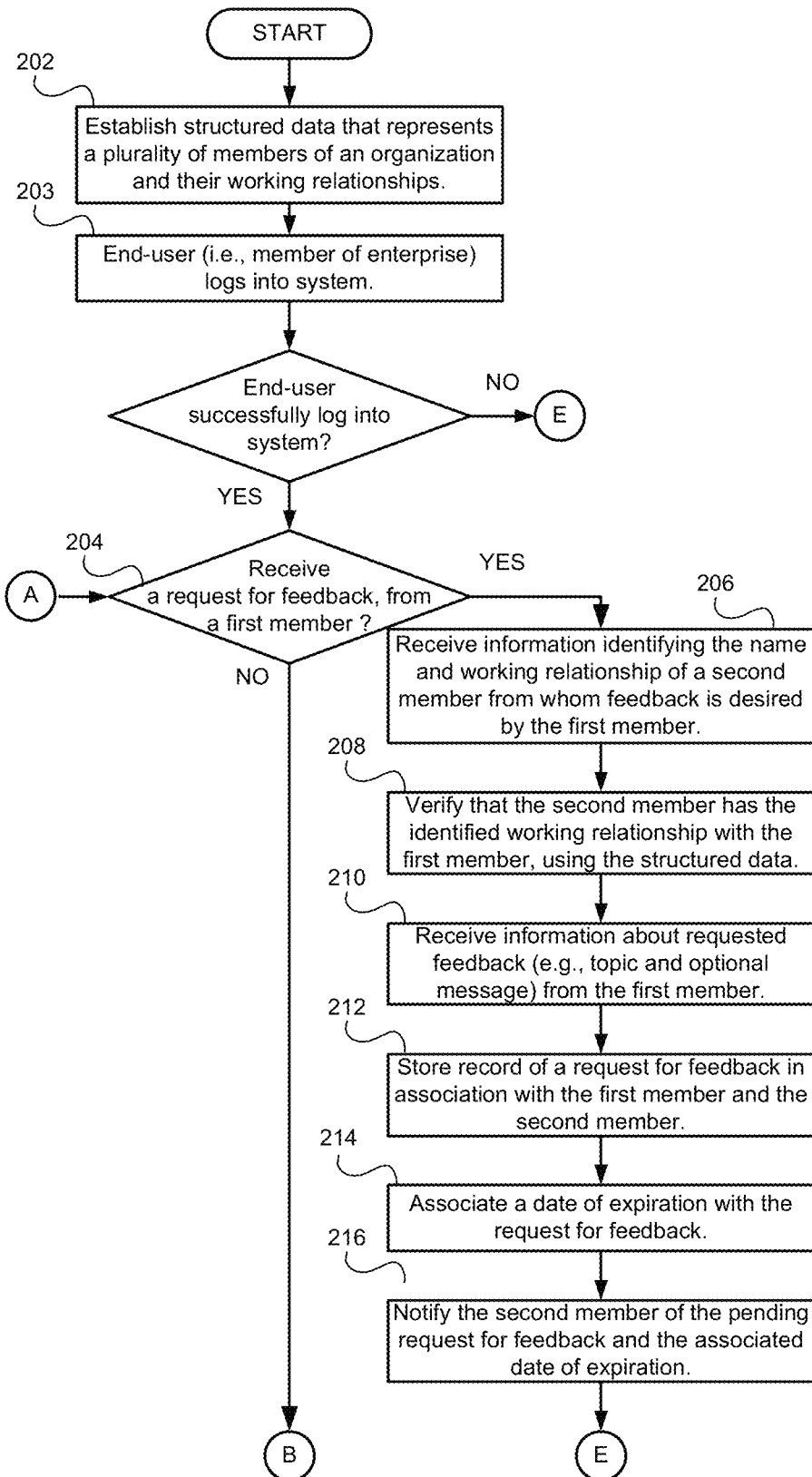
FIGS. 2A-2C are a flowchart illustrating an exemplary method that supports ongoing communication, tracking, and management review of feedback among a population of end-users of the system (e.g., workers and management of an enterprise), in accordance with a representative embodiment of the present disclosure.
Figure 2B:
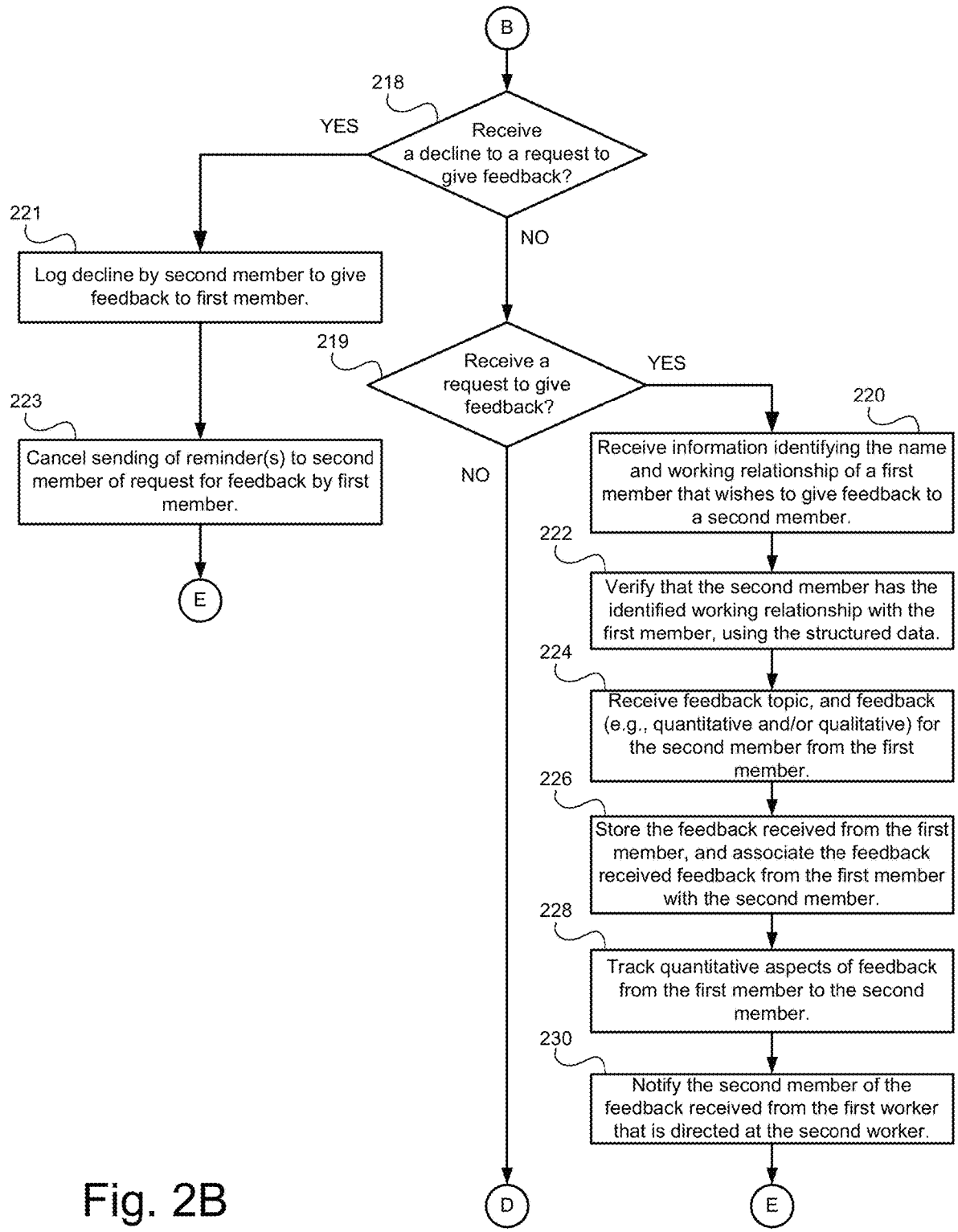
Figure 2C:
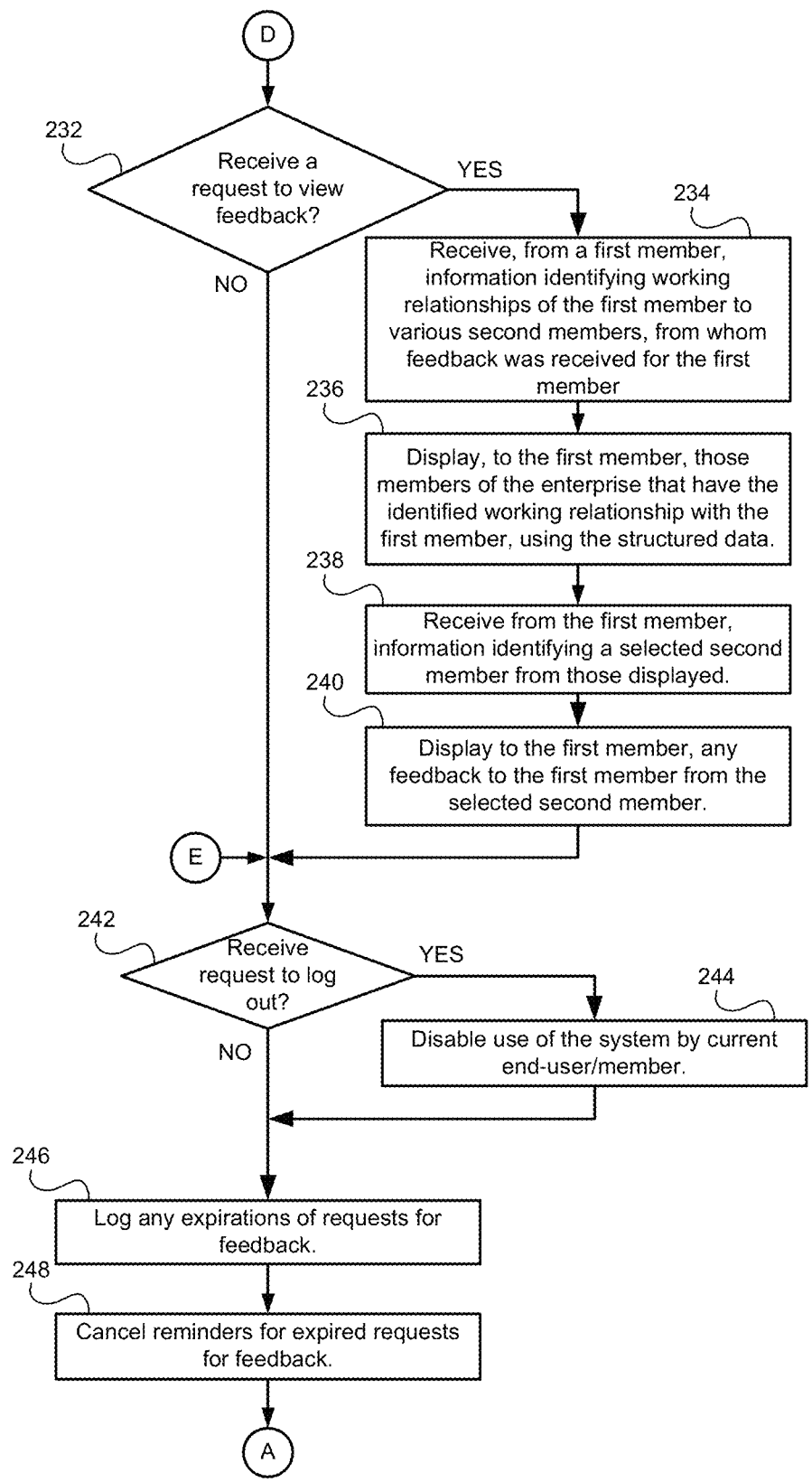

FIGS. 2A-2C are a flowchart illustrating an exemplary method that supports ongoing communication, tracking, and management review of feedback among a population of end-users of the system (e.g., workers and management of an enterprise), in accordance with a representative embodiment of the present disclosure. The actions of the method of FIGS. 2A-2C may be performed by a computer system such as, for example, the computer system 80 of FIG. 1, which may have storage configured to store structured data representative of, for example, each of the end-users of the system, their relationships to one another in the organizational structure of the enterprise, and any feedback requests made, responses to feedback requested, and failures to provide requested feedback noted, along with any executable instructions necessary to operate a system in accordance with the present disclosure. The method of FIGS. 2A-2C begins at block 202, at which a system performing the method may establish access to structured data that represents a plurality of members of an organization or enterprise and their working relationships with one another. The members of the organization may be, by way of example and not limitation, the associates, workers, and/or managers of a retail business, or any other enterprise that has a sufficient number of employees or workers for which a performance feedback system would be beneficial. The system is then ready for use, and an end-user may then, at block 203, log into the system, using information that identifies the end-user (i.e., member) and information that may be used to verify or confirm that that the end-user logging into the system is who they claim to be. If login is successful, the system enables end-user access to the functionality described below. If the login attempt fails, the system simply wait for a successful login Next, at decision block 204, the system may determine whether the system has received a request for feedback, from a first member. If the system determines that such a request for feedback for a particular member was not received, the method may continue at decision block 218, described below with respect to FIG. 2B. If, however, the system determines that such a request for feedback for a particular member was received, the system continues at block 206 of FIG. 2A, where the system may receive information identifying the name and working relationship, to the first member, of a second member from whom feedback is desired by the first member. Then, at block 208, the system may verify that the second member has the identified working relationship with the first member, using the structured data described above, and at block 210, may receive information about the feedback that is being requested from the first member (e.g., topic and optional message). Next, at block 212, the method of FIG. 2A may direct the system to store a record of the request for feedback in association with the first member and the second member, linking the request to the first member and the second member. Next, at block 214, the system may associate a date and/or time of expiration with the request for feedback. The date and/or time of expiration of the request may be set, for example, by the first member, or may be automatically set without further action by the first member, according to one or more rules set by the enterprise using the system of the present disclosure. Next, at block 216, the method of FIG. 2A may direct the system to notify the second member of the pending request for feedback and the associated date and/or time of expiration of the feedback request. The method then continues at block 218 of FIG. 2B.

At block 218 of FIG. 2B, the system may determine whether the system has received a decline to a request to give feedback. An end-user of the system, e.g., a second member, may have explicitly declined to give feedback requested by a first member. If it is determined that one end-user (e.g., the second member) has indicated that he/she does not wish to provide the feedback requested by another member (e.g., the first member), the system performing the method of FIGS. 2A-2C may then proceed to block 221 of FIG. 2C. At block 221, a system performing the method of FIGS. 2A-2C may log, in association with information identifying the second member, the decline by the second member to give feedback to the first member. Decline by members of the enterprise for whom the system is operated may be recorded or tracked, and statistics and performance appraisal information reflecting the failure or refusal to provide feedback when requested may be used in evaluation of the member. Then, at block 223, the system may cancel the sending of reminder(s) of the request for feedback by first member, to the second member.

If, however, the method at block 218 of FIG. 2B determines that the system has not received a decline to a request to give feedback, the method continues at block 219, where the system may determine whether the system has received a request from an end-user to give feedback about another end-user. For example, a first end-user may have received a request for feedback to a second end-user and may wish to respond with the requested feedback, or a first end-user may wish to give feedback to a second end-user, unsolicited, without having received a request for feedback. In such a situation, the first member may wish to submit to the system, a request to give feedback about the second member, and a system in accordance with the present disclosure may therefore determine that it has received a request from a the first end-user (i.e., a first member) to give feedback about another end-user (i.e., a second member). If, at block 219, the system determines that the system has not received a request from an end-user to give feedback about another end-user, control in the method of FIG. 2B passes to block 232 of FIG. 2C. Otherwise, the system may then, at block 220, receive, from the first member, information identifying the name and working relationship of the second member to whom feedback is to be given by the first member. Next, at block 222, the method may direct the system to verify that the first member and the second member have the identified working relationship within the enterprise in which they work, using the structured data previously described above. Then, at block 224, the system may receive, from the first end-user, an indication of the feedback topic, and the feedback (e.g., quantitative and/or qualitative) for the second member from the first member. At block 226, the system may store the feedback received from the first member, and associate the feedback received from the first member with the second member. Next, at block 228, the method may cause the system to track quantitative aspects of feedback from the first member to the second member. For example, certain elements of the request for feedback may relate to certain common characteristics of all members of an enterprise such as, for example, adhering to certain values or goals of the enterprise in their interactions with others, or exhibiting certain behaviors desired by the enterprise in their workplace. Then, at block 230, the system may notify the second member of the feedback received from the first worker that is directed at the second worker. The system then continues at block 242 of FIG. 2C.

At decision block 242 of FIG. 2C, the system may determine whether the system has receive a request to view feedback. For example, an end-user (i.e., a first member) may have been sent a notification or reminder about feedback received for that end-user by another end-user (i.e., a second member), either in response to a request for feedback by the first member, or unsolicited from the second member of the enterprise served by the system. If the system determines that a request to view feedback has not been received by the system, the method of FIGS. 2A-2C continues at block 242, described below. If, however, the system determines that a request to view feedback was received from a first member, the method passes control to block 234, where the system may receive, from a first member, information identifying a working relationship of the first member to various second members, from whom feedback was received for the first member. The system may then, at block 236, display, to the first member, those members of the enterprise that have the identified working relationship with the first member, using the structured data. Next, at block 238, the method may receive, from the first member, information identifying a selected second member from those members displayed. At block 240, the system may then display to the first member, any feedback to the first member from the selected second member. The system may then continue at block 242, described below.

At decision block 242, a determination may be made as to whether the system has received a request to log out from the currently logged-in member. If it is determined that a request to log out has been received, the system may, at block 244, disable use of the system by the current end-user/member, and control may pass to block 246. If, however, it is determined, at decision block 242, that a request to log out has not been received, the system may continue to block 246, where the system may log or store a record of any expirations of requests for feedback that have occurred and not yet been logged. To encourage timely feedback, a system in accordance with the present disclosure, as discussed above, may establish a system defined or end-user specified expiration date and/or time, at the time a request for feedback is submitted. Once the set date and/or time has passed, the request for feedback may expire and may no longer be accessible by the end-user/member from which feedback was requested, and a record of the expired feedback request may be maintained by the system in association with information that identifies the end-user/members that have failed to respond to a request for feedback by the assigned expiration date and/or time. In this way, end-users of the system (i.e., members of the enterprise using the system) are encouraged to respond promptly, emphasizing the importance and value of providing timely responses to requests for feedback.

At block 248, the system may cancel any reminders of request for feedback that have expired.

Figure 3:
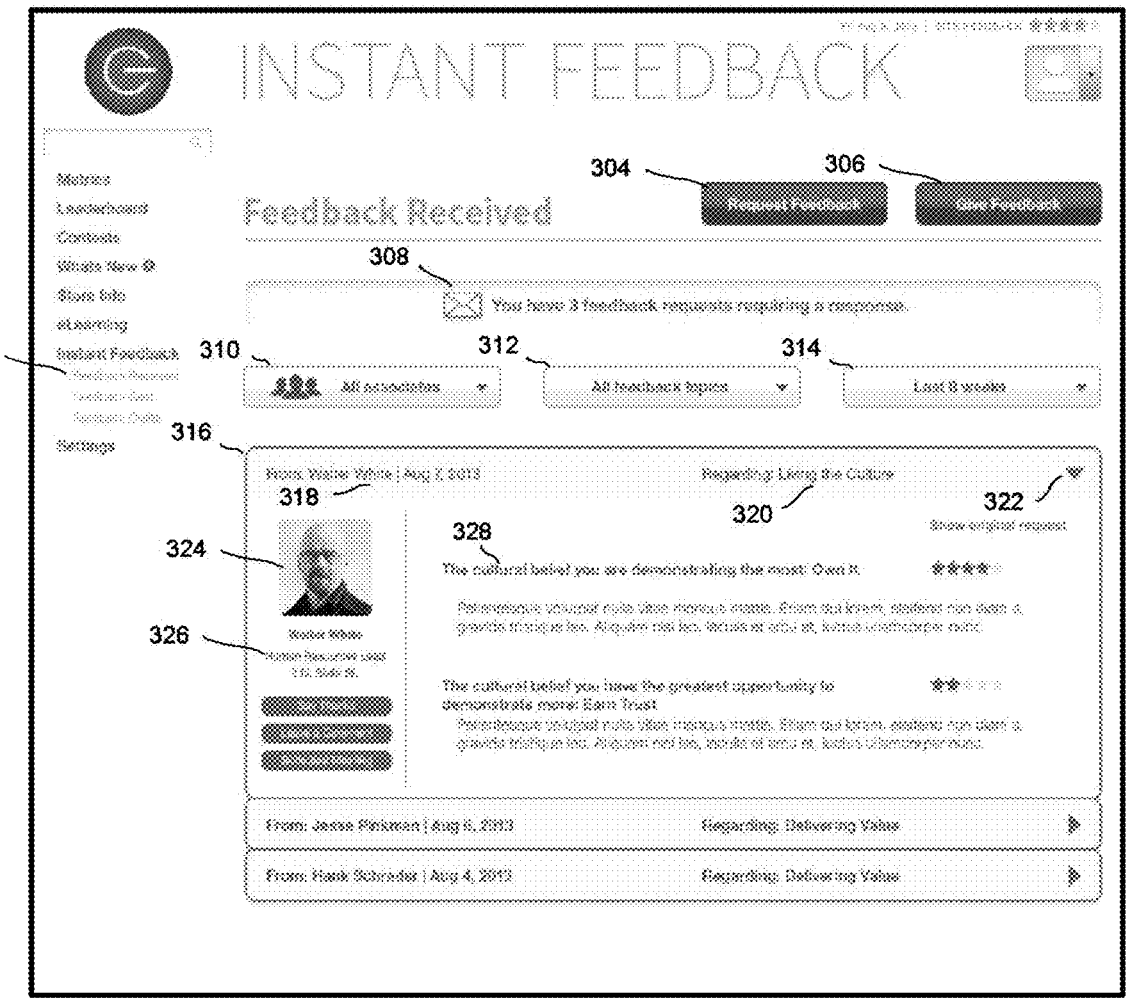
FIG. 3 is a screen image of an exemplary "Feedback Received" page, in accordance with a representative embodiment of the present disclosure.
Figure 4:
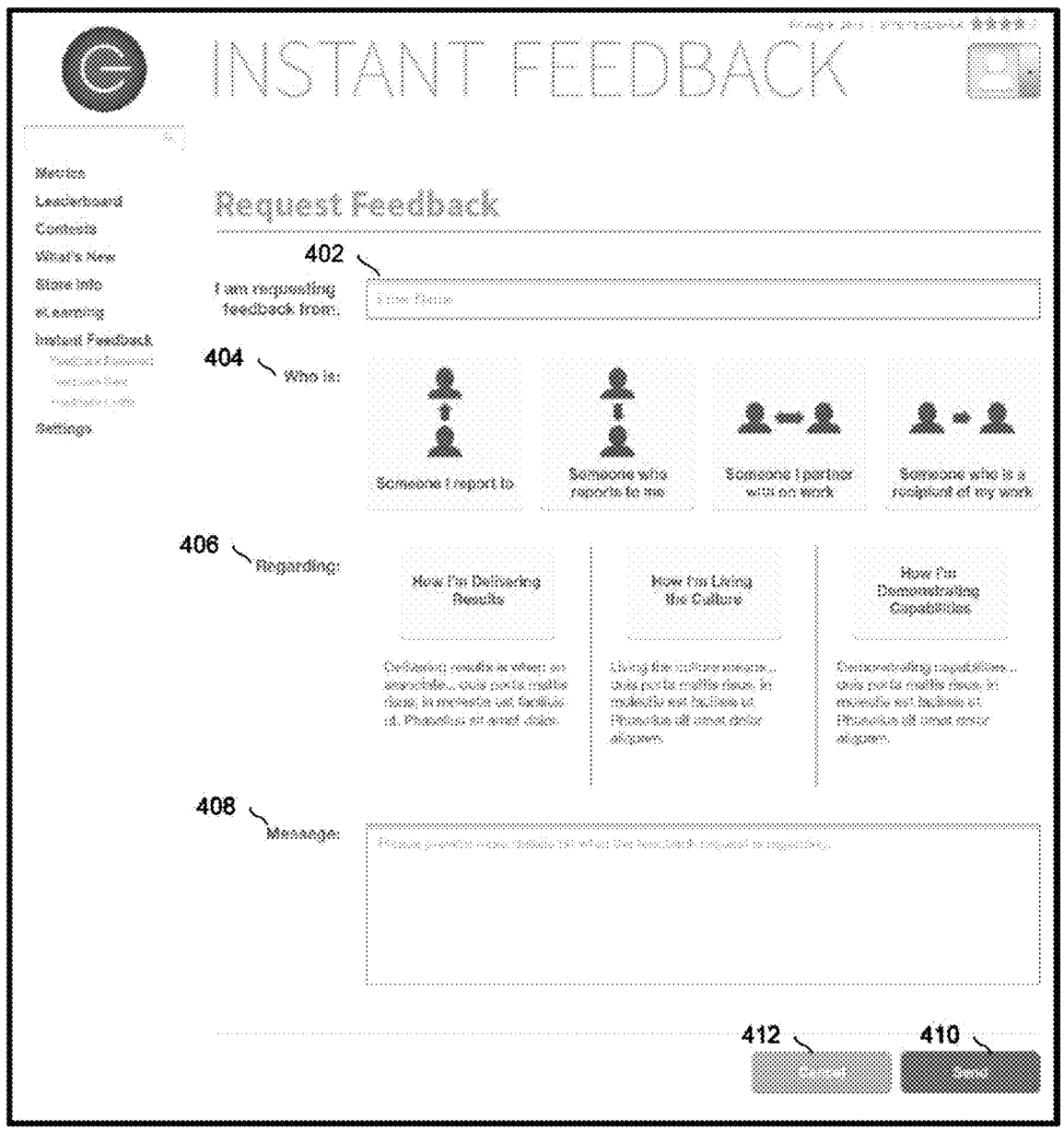
FIG. 4 is a screen image of an example "Request Feedback" page, in accordance with a representative embodiment of the present disclosure.
Figure 8:
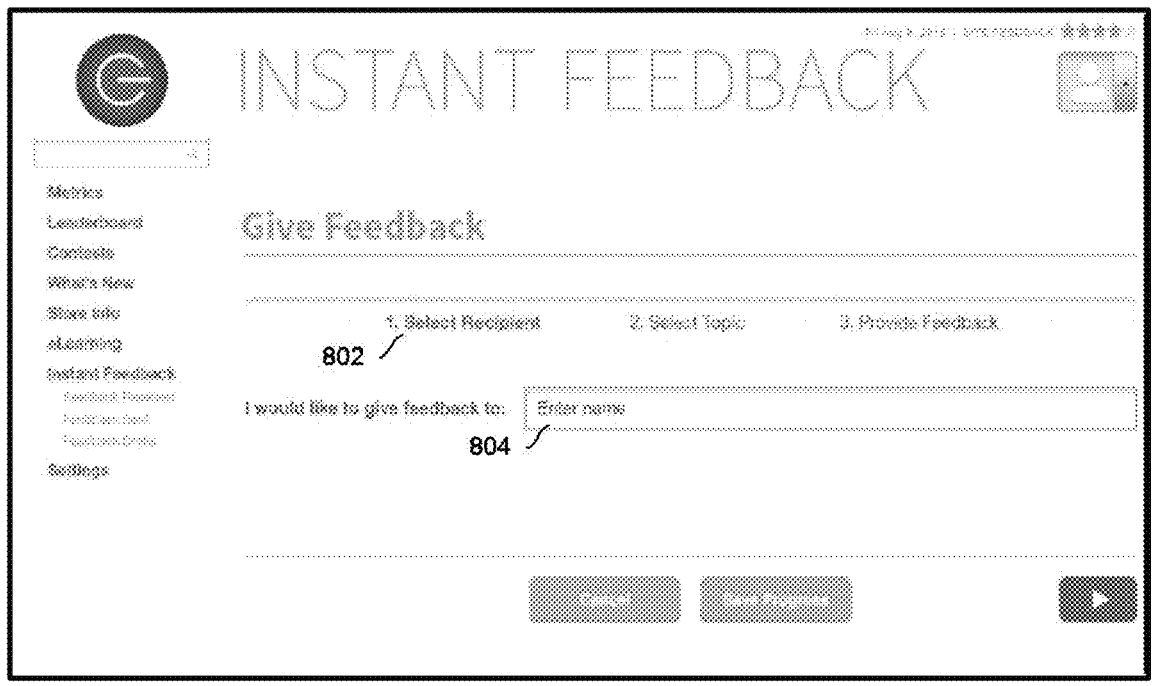
FIG. 8 is a screen image of an example "Give Feedback" page, in accordance with a representative embodiment of the present disclosure.

FIG. 3 is a screen image of an exemplary "Feedback Received" page 300, in accordance with a representative embodiment of the present disclosure. The feedback received page 300 of FIG. 3 may be the default landing page for all users of a system supporting ongoing communication, tracking, and management review of feedback among a population of workers and their management, such as the computer system 80 of the computer network 100 of FIG. 1. As shown in FIG. 3, a representative embodiment of the present disclosure may include a navigation area 302 that includes one or more user interface elements that enable a user to access "Feedback Received", "Feedback Sent," and "Feedback Drafts." FIG. 3 also includes a "Request Feedback" button 304 that takes the end-user to a page where the end-user may request feedback of other workers in the organization, as illustrated in the example of FIG. 4, described in detail below. In addition, FIG. 3 includes a "Give Feedback" button 306, which may take the user to a "Give Feedback" page where the end-user may provide their feedback to other workers in the organization, as illustrated in the example of FIG. 8. The end-user may access this feature when they wish to give feedback to a co-worker that has not requested their feedback.

In a representative embodiment of the present disclosure, a first user may be alerted that a second user has requested feedback. Such an alert may appear at the top of the page, as shown in FIG. 3 as alert 308, and the displayed text of the alert 308 may be hyperlinked to a page permitting them to give feedback, such as the exemplary "Give Feedback' page shown in FIG. 8. In such an embodiment, the system may skip requests for certain information about the intended recipient of the feedback to be given, because the recipient and topic are known.

A representative embodiment of the present disclosure may include a "relationship filter" such as, for example, the drop-down list 310, which may be used to select the set of people from whom feedback will be displayed. Such a filter may include a number of possible options including, by way of example and not limitation, an "All associates" option, which may be the default selection and may apply no filtering to the feedback. The relationship filter options may also include a "Workers I report to," which may include anyone a level up in the organization, from the user. The relationship filter may also include a "Workers who report to me" option, that represents those worker at a level at a level below the user. The relationship filter options may also include a "Workers I partner with on work," and a "Workers who are recipients of my work option."

A representative embodiment of the present disclosure may also include a "feedback topics filter" such as, for example, as illustrated by the drop-down list 312. Such a filter may include a number of options including, by way of example and not limitation, an "All feedback topics" option, which may be the default selection, and may apply no filtering to the feedback topics. The feedback topics filter options may also include a "Delivering Results" filter option, a "Living the Culture" option, and a "Demonstrating Capabilities" option, which may result in the display of only feedback related to the topics of "Delivering Results," "Living the Culture," and "Demonstrating Capabilities," respectively.

A representative embodiment of the present disclosure may also include a "Time" filter such as, for example, as illustrated by the drop-down list 314. Such a filter may include a number of choices including, by way of example and not limitation, a "Last 8 weeks" option, which may be the default setting, and choices for the first, second, third, and fourth fiscal quarters, and an option for the fiscal YTD (year to date) may be available. Feedback shown in the feedback area 316 may be listed most recent feedback first, and a maximum of ten feedback items may be displayed at a time. If more than ten feedback items result with the given set of filters, pagination may occur, and a link saying 'Click to load more' may be provided. It should be noted that the use of any of the filters described above may not affect the selection of any option for any other of the filters. For example, if user selects "Someone I report to," "Last 8 weeks," and "Delivering Results"; and the user then switches the topic filter to "Living the Culture," the other selected filter options ("Someone I report to" and 'Last 8 weeks') may remain the same.

A representative embodiment of the present disclosure may include a feedback area 316 that displays feedback item entries that are expandable and collapsible. As shown in FIG. 3, the first entry is expanded, and may include a name and date field 318, a topic field 320, an icon 322 for expanding and collapsing the feedback item entry, a thumbnail picture of the individual providing the feedback 324, and a number of actions 326 that the individual viewing the feedback may take including in response to the feedback including, for example, "Saying Thanks," "Leave a Comment," and "Schedule Meeting." Selecting "Saying Thanks" may send a notification to the sender of the feedback to indicate that the recipient has received their feedback and says "Thank you!" Selecting "Leave a Comment" permits the receiver of feedback to leave a comment that is attached to the feedback, and which may be made available to the individual to whom they report (i.e., their manager), enabling them to see what action was taken. The individual receiving the feedback may also select "Schedule Meeting," to request that a meeting with the sender of the feedback be scheduled. A "View Request" option may also be included, to permit the user to display a pop-up containing the text of the original request. The comment section 328 of FIG. 3 displays any free-form or qualitative comments that the individual sending the feedback entered, and a quantitative value (e.g., "Start rating") corresponding to the subjects identified. A message may also be provided below the qualitative feedback indicating that the provider of the feedback has requested a meeting. Such a message may, for example, say "<Feedback Giver> suggests that you schedule a meeting to discuss this feedback further."

FIG. 4 is a screen image of an example "Request Feedback" page 400, in accordance with a representative embodiment of the present disclosure. The request feedback page 400 of FIG. 4 may include, for example, a predictive-search enabled search bar 402 that enables a search of members of the organization, which may be determined from LDAP (lightweight directory access protocol) information for the organization or enterprise. Once a user selects someone from the search results, a profile picture, name, and title of the individual may appear. The request feedback page 400 of FIG. 4 may also include user information elements such as user interface elements 404 to permit the user to designate one or several possible working relationships of the user to the individual member of the organization from whom they are requesting feedback. In addition, the request feedback page 400 of FIG. 4 includes an example set of user interface elements 406 for user selection of one of several topics of the feedback being provided. A free-form message area 408 is also provided, to permit the user to describe what the feedback request is about and to give a context as to nature and reason for the feedback. The illustrated example of FIG. 4 also includes a "Send" button 410. The "Send" button 410 may be deactivated until the certain fields of the request feedback page 400 are completed. The example of FIG. 4 also shows a "Cancel" button 412. Selection of the "Cancel" button 412 may cause the information entered in the request feedback page to be discarded, and the user may then be returned to a previous screen. Upon successfully sending the feedback to the intended recipient, the user may be shown a confirmation screen, as illustrated in FIG. 5.

Figure 5:
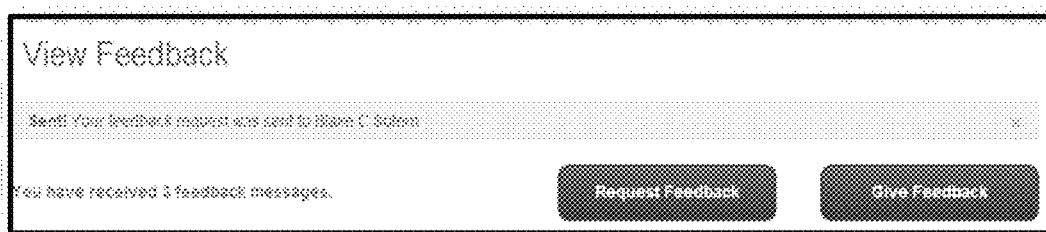
FIG. 5 is a screen image of an example "Confirmation" page, in accordance with a representative embodiment of the present disclosure.

FIG. 5 is a screen image of an example "Confirmation" page 500, in accordance with a representative embodiment of the present disclosure. The "Confirmation" page 500 may be displayed to a sender of feedback, to confirm that their feedback to the selected recipient has been sent to the intended recipient. In some representative embodiments of the present disclosure, when the individual providing feedback sends a request to someone who is not his/her manager, or if the queue for a recipient is full, the person giving the feedback may not be able to submit the request, and no confirmation may be given. He/she may instead be sent a notification indicating that the intended recipient has no more room to receive additional requests, and that their request has been saved in a draft storage area for later submission.

Figure 6:
FIG. 6 is a screen image of an example "Feedback Requests" page, in accordance with a representative embodiment of the present disclosure.

FIG. 6 is a screen image of an example "Feedback Requests" page 600, in accordance with a representative embodiment of the present disclosure. As shown in FIG. 6, the title line 602 shows the number of requests for feedback that are currently awaiting responses by the viewer of the "Feedback Requests" page 600. In a representative embodiment of the present disclosure, received feedback requests may be separated into two or more queues. In addition, the "Feedback Requests" page 600 may include a user interface element 604, such as a "drop-down box," that may be used to filter the received feedback requests according to the relationship of the recipient to the sender of the requests for feedback. The received feedback requests may be displayed, for example, as in list 606, in which entries may be in an expanded or a compact format, similar to that described above with respect to FIG. 3. In a representative embodiment in accordance with the present disclosure, feedback requests may be displayed in order of oldest to newest (i.e. in order of nearest expiration). For example, in some representative embodiments of the present disclosure, the expiration of a feedback request may be automatically set at 15 days from the date on which the feedback request was submitted by the sender. In other representative embodiments, the user submitting the feedback request may set the amount of time within they want the feedback, or have the request expire. For example, if a feedback request is received at any time on Dec. 1, 2013, the feedback request may expire on Dec. 30, 2013 at midnight, and the feedback request may disappear from the list of received feedback requests. At that time, the user that requested feedback may receive a notification stating "Your request sent to <User> has expired." A listing of "Requests Sent" may be provided, and may list the feedback request as "Expired," and may include a button permitting the user to 'Resubmit' the feedback request. At various points in time following the submission of the feedback request, a notification or reminder may be sent to the recipient, alerting the recipient that he/she has one or more pending feedback requests that require their attention. Such notifications may use changes in color, font, point size, or other visual, audible, or tactual/physical means to emphasize the importance of a response to the recipient. In a representative embodiment of the present invention, the failure of a recipient of a feedback request to provide the feedback to the requestor may be recorded. Such a record may include information that identifies the individual that made the request for feedback, the individual(s) that were asked for feedback, and an indication of those individuals that failed to provide the requested feedback by the expiration date and/or time. Additional information may be provided in the record, to permit designated individuals to review the contents of the feedback request and the details of the failure of the requested individual(s) to respond to the feedback request.

In addition to the above, the "Feedback Requests" page 600 may include a "Give Feedback" button 608, to permit the recipient to provide their response to the feedback request. Selecting the "Give Feedback" button 608 may take the responding user to a "Give Feedback" page, which may have the information for the associated feedback request (i.e., the recipient, the relationship of the recipient to the sender, and the topic) already filled in, enabling the recipient to avoid the need to provide that information. The "Feedback Request" page 600 may also include a "Decline Request" button 610, to enable the recipient of the feedback request to decline to respond, such as the page screen image shown in FIG. 7, described below. Feedback requests may be tagged by, for example, a particular icon 612 (e.g. "DR") when the feedback requests are from a "Direct Report" of the recipient, as indicated by human resource or LDAP information sources discussed previously. Finally, a feedback request page according to the present disclosure may include a user interface element such as the "Done" button 614 of FIG. 6, which may take the user to a "View Feedback" page.

Figure 7:
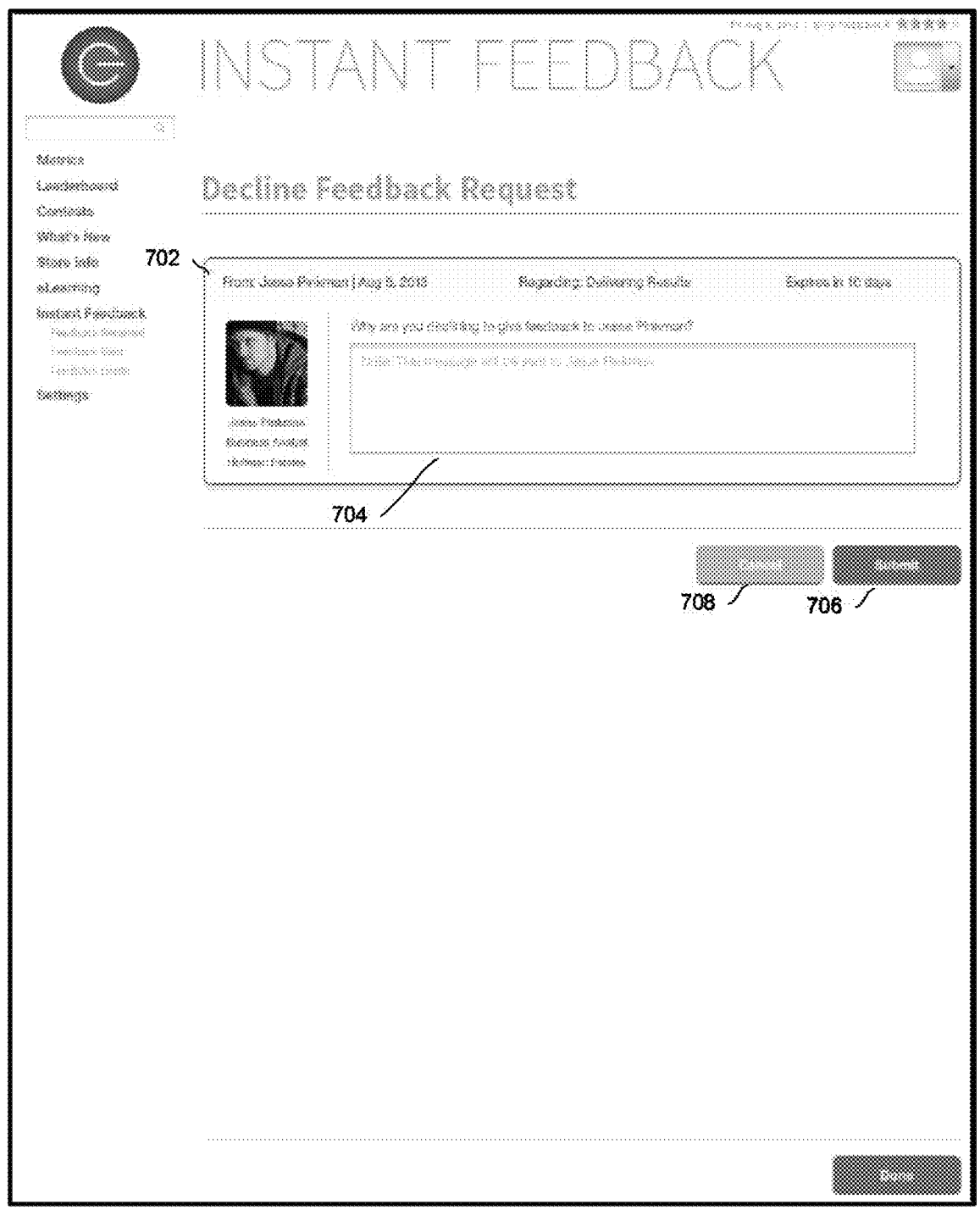
FIG. 7 is a screen image of an exemplary "Decline Feedback Request" page, in accordance with a representative embodiment of the present disclosure.

FIG. 7 is a screen image of an exemplary "Decline Feedback Request" page 700, in accordance with a representative embodiment of the present disclosure. As shown in FIG. 7, the format of the "Decline Feedback Request" page may use the same expanded structure of feedback as that described above with regard to FIG. 3 and FIG. 6. A decline feedback page such as that shown in FIG. 7 may include information identifying the individual 702 that declined the feedback request, and a text box 704 to permit the declining user to explain why he/she has chosen not to provide feedback and is declining the feedback request. Additional information identifying the topic of the requested feedback, and the deadline or expiration date for submission of a response may be provided. A "Submit" button 706 permits the responder to cause their response to be sent to the individual that requested feedback using, for example, email, text messaging, multimedia messaging service, or other messaging mechanism. The user may then be returned to the feedback requests" page, such as the example "Feedback Request" page 600 shown in FIG. 6. The user may avoid explicitly declining to send feedback, by simply selecting the "Cancel" button 708, which may, for example, then return the user to the "Feedback Requests" page 600 of FIG. 6.

FIG. 8 is a screen image of an example "Give Feedback" page 800, in accordance with a representative embodiment of the present disclosure. The example process of giving feedback shown in FIG. 8 includes three steps shown in the "give Feedback" page 800, "1. Select Recipient," "2. Select Topic," and "3. Provide Feedback." In a representative embodiment of the present disclosure, a bar may be displayed showing user progress through the completion of these three exemplary steps of providing feedback. As the user progresses through the process of giving feedback, the bolded step may change. For those instances in which the user is using the "Give Feedback" page 800 as an unsolicited means of giving feedback, the process may start at step 1, "1. Select Recipient." If the user is fulfilling a request for feedback, the system may already know the intended recipient of the feedback, the relationship of the requestor and the sender, and the feedback topic. Thus, the user may begin the process of providing feedback at the third step, "3. Provide Feedback" (e.g., indicate the topic of the feedback as, for example, "Delivering Results," "Living the Culture," or "Demonstrating Capabilities"). A representative embodiment of the present disclosure may employ a "suggestive" or "self-completing" search bar that the user may use to identify the member of the organization to whom they would like to give feedback. In the example, of FIG. 8, feedback may be given to only one recipient at a time. It should be noted that the present disclosure is not intended to be limited by the illustration of FIG. 8, and that a representative embodiment of the present disclosure may permit a number of intended recipients to be identified, without exceeding the scope of the present disclosure.

Figure 9:
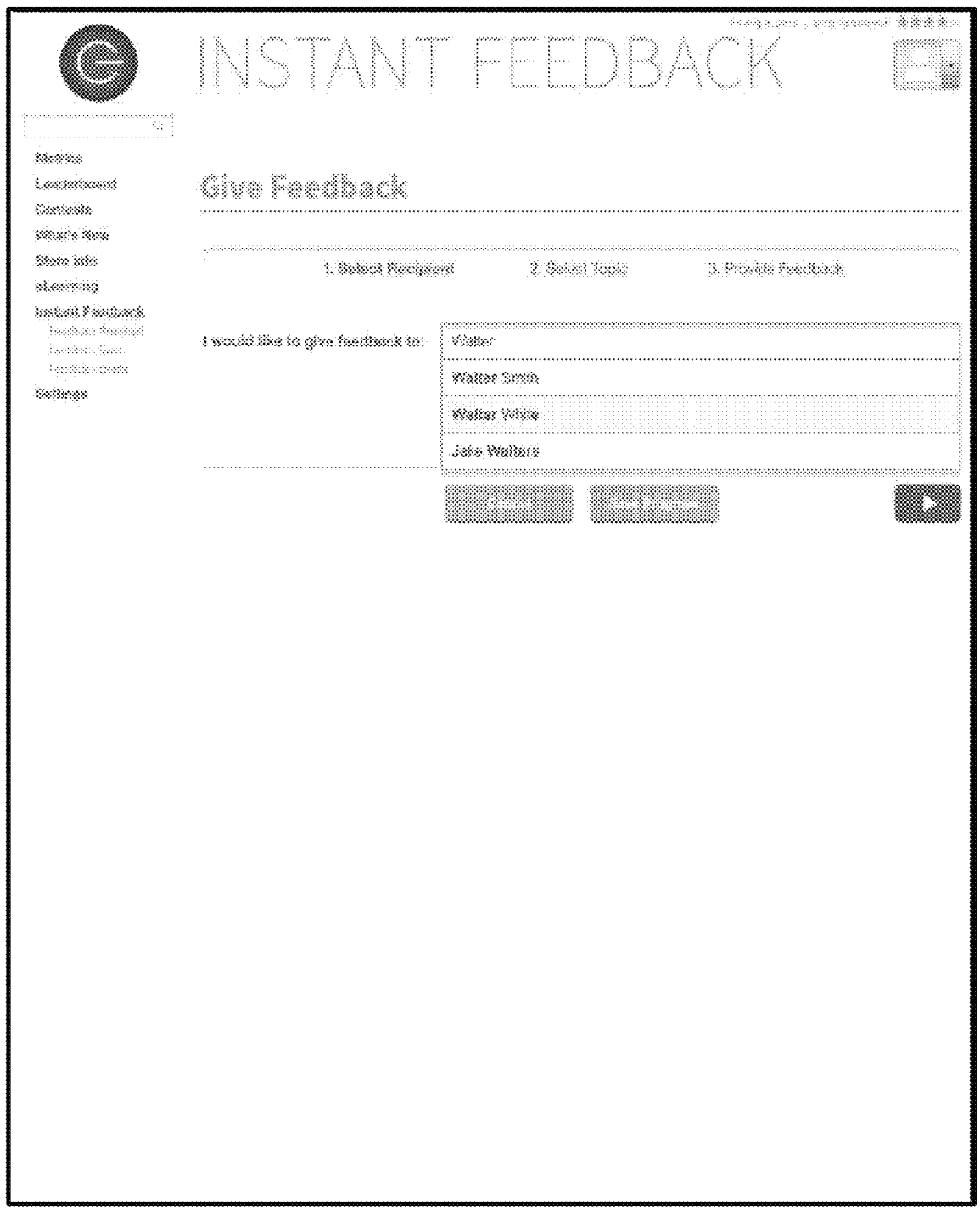
FIG. 9 is a screen image of the use of an example suggestive or self-completing search bar, in which possible choices of individuals whose names match the letters that have been entered by the user at a particular point in time, are displayed, such as the example mentioned above with respect to FIG. 8, in accordance with a representative embodiment of the present disclosure.

FIG. 9 is a screen image of the use of an example suggestive or self-completing search bar, in which possible choices of individuals whose names match the letters that have been entered by the user at a particular point in time, are displayed, such as the example mentioned above with respect to FIG. 8, in accordance with a representative embodiment of the present disclosure.

Figure 10:
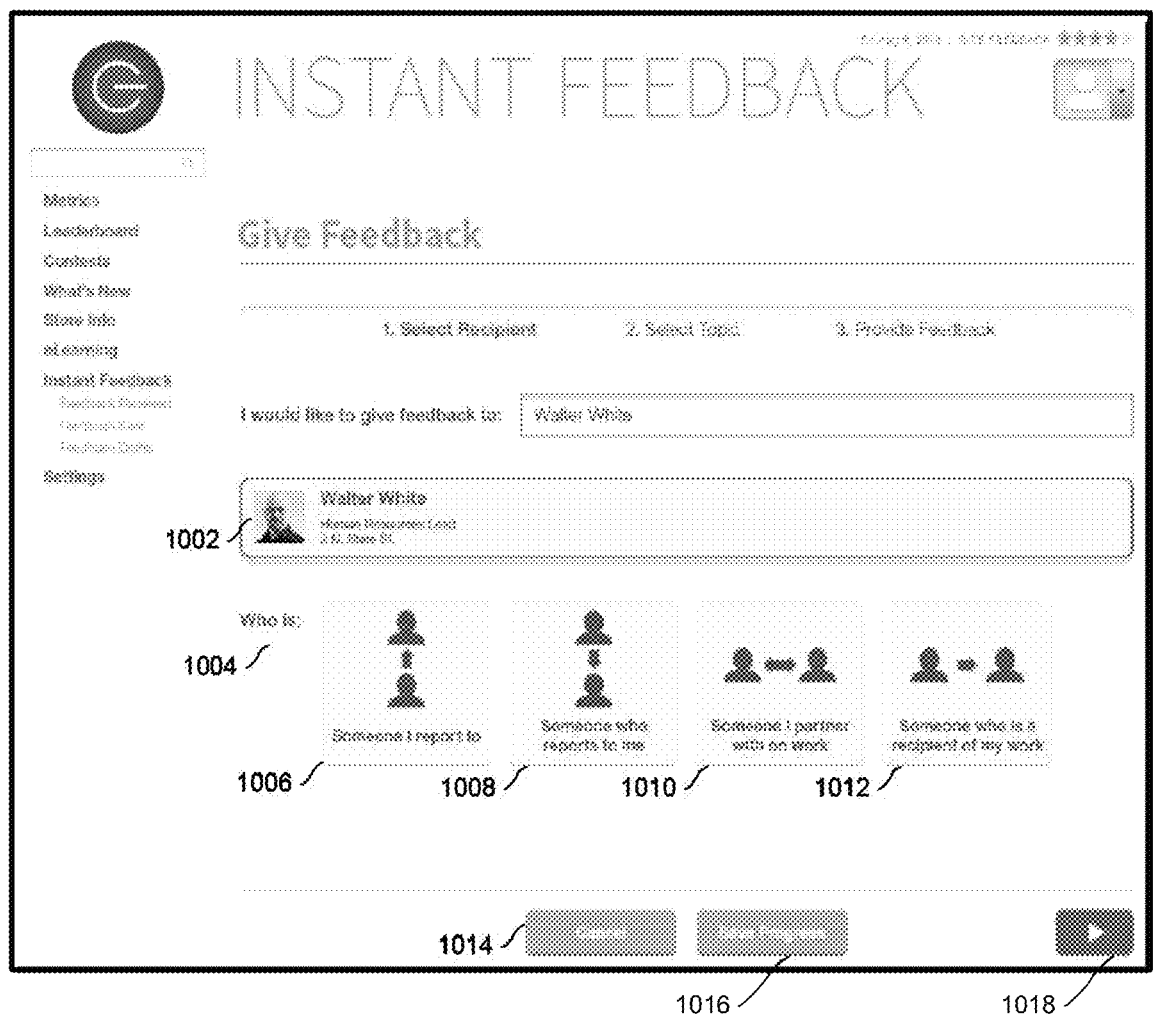
FIG. 10 is a screen image of an example "Give Feedback" page for step 1 of the process of giving feedback, in accordance with a representative embodiment of the present disclosure.

FIG. 10 is a screen image of an example "Give Feedback" page for step 1 of the process of giving feedback, in accordance with a representative embodiment of the present disclosure. In a representative embodiment of the present disclosure, a user profile 1002 may be displayed, including a thumbnail picture, name of the intended feedback recipient, and additional details. The user may also be prompted to respond to the question 1004, "Who is", and select from one of a number of user interface elements 1006, 1008, 1010, 1012 representing possible working relationships of the identified feedback recipient to the individual giving feedback (e.g., "Someone I report to," "Someone who reports to me," "Someone I partner with on work," and "Someone who is a recipient of my work," respectively). A "Cancel" button 1014 is provided to permit the user to exit the "Give Feedback" page without saving any responses, and return to the "View Feedback" form. A "Save Progress" button 1016 is also provided, to enable the user to save the information and state of the feedback process. The "Next" button 1018, transitions the user to the next page of the process.

Figure 11:
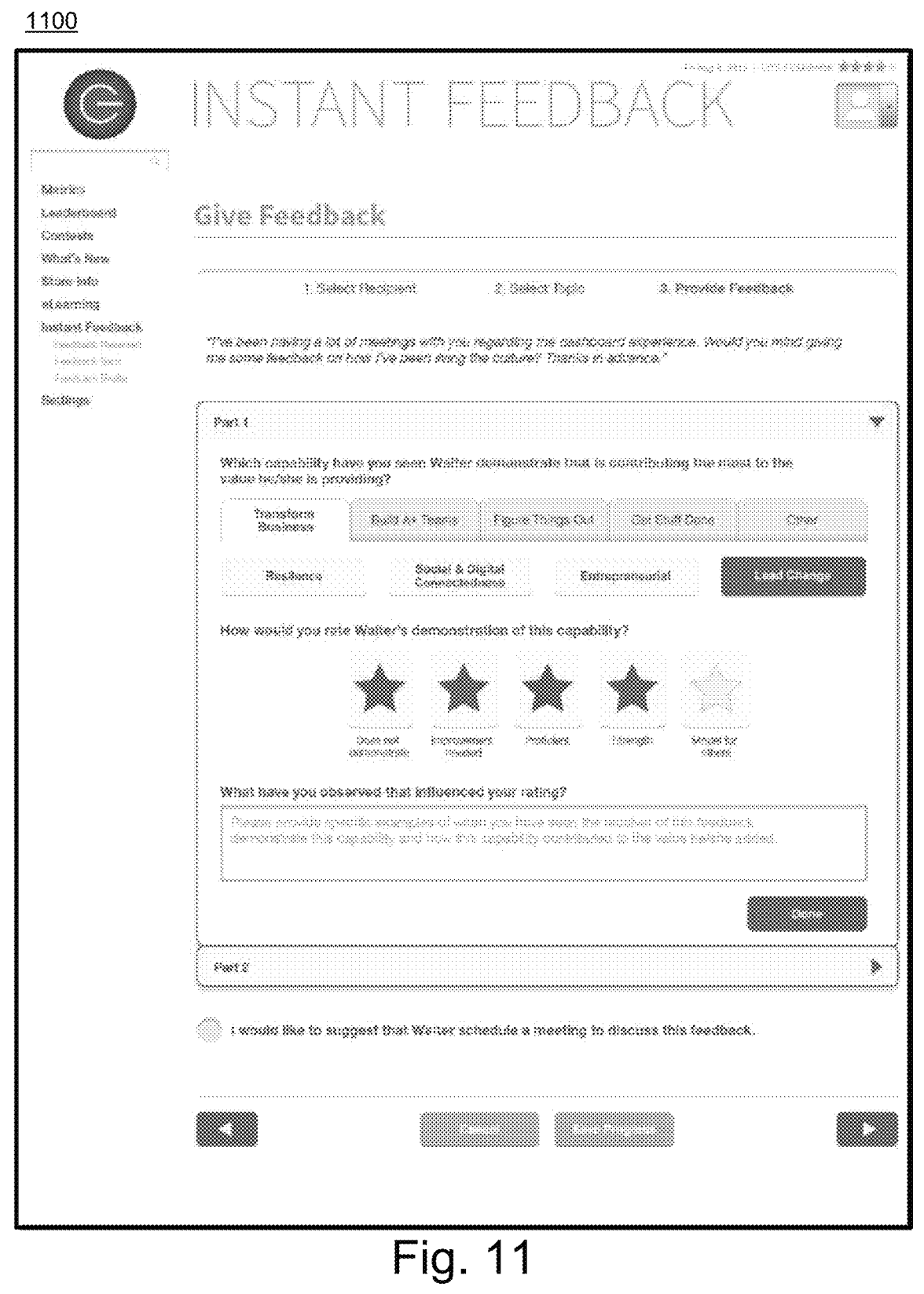

FIG. 11 illustrates an exemplary screen image showing an example page 1100 that permits the individual giving feedback to select the topic of the feedback to be given, in accordance with a representative embodiment of the present disclosure. As can be seen in FIG. 11, the individual giving feedback may select from a number of different capabilities (e.g., "Transform Business," "Build A+ Teams," "Figure Things Out," Get Stuff Done," and "Other") on which to give feedback. The feedback responder is also provided with a means to provide related quantitative feedback (e.g. a number of "Stars") for the selected "capability," and a means to provide text input to give additional details as qualitative feedback. A user interface element is also provided that allows the provider of feedback to indicate that the recipient schedule a meeting to discuss the feedback provided. In this way, a system in accordance with the present disclosure guide those wishing to give feedback for a collection of capabilities, using either or both of quantitative and/or qualitative forms of feedback.

Figure 12:
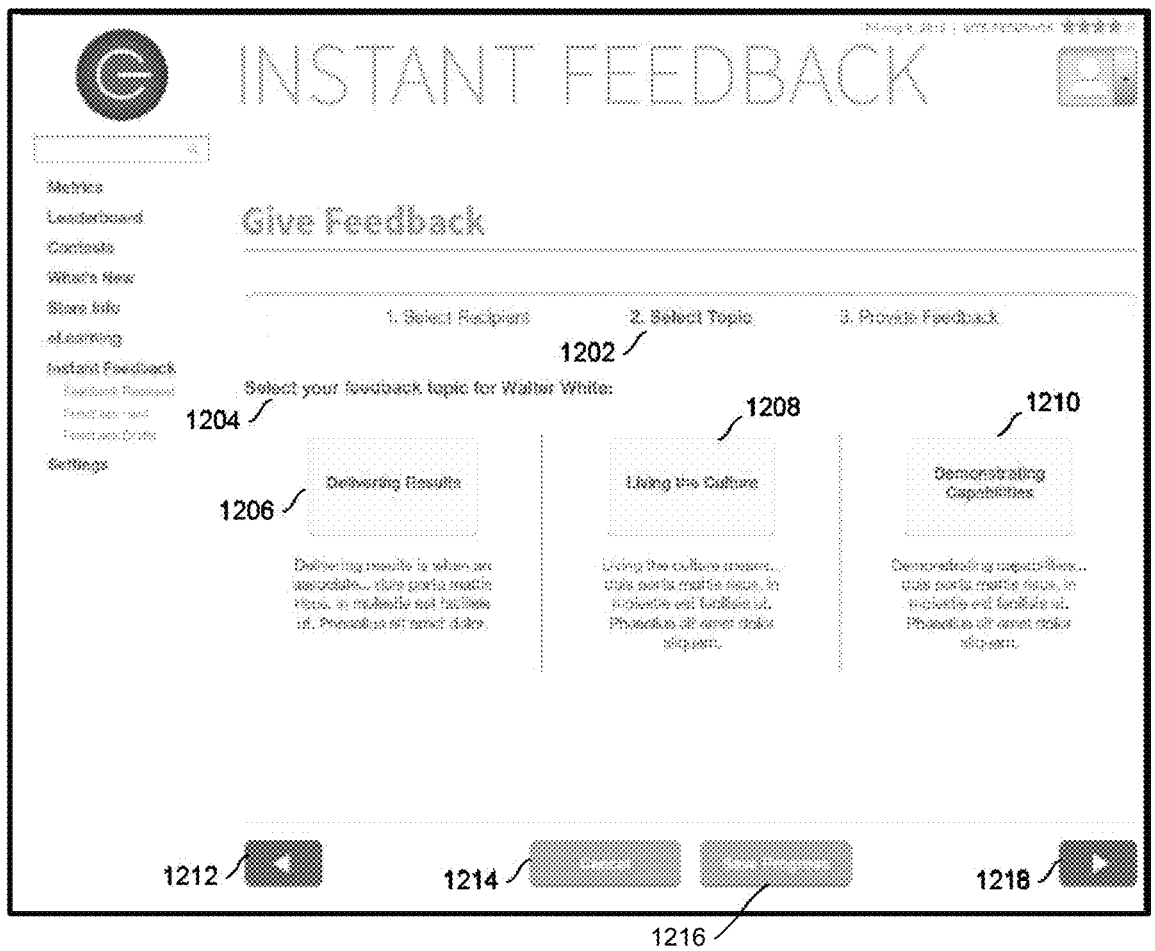
FIG. 12 illustrates an exemplary "Give Feedback" page for Step 2 of a guided, multi-step process of giving feedback, in accordance with a representative embodiment of the present disclosure.

FIG. 12 illustrates an exemplary "Give Feedback" page for Step 2 of a guided, multi-step process of giving feedback, in accordance with a representative embodiment of the present disclosure. FIG. 12 includes an indication that it is part of Step 2 by the bolded text 1202. In the illustration of FIG. 12, the user is presented with a prompt 1204 for the topic of the feedback to be given. As shown in the example of FIG. 12, the user may select from one of three topics, "Delivering Results" 1206, "Living the Culture" 1208 and "Demonstrating Capabilities" 1210. It should be clear to the reader that other topics may be employed without departing from the scope of the present disclosure. The user may return to the previous page and Step 1 of the process of giving feedback using the left arrow icon 1212, which may cause caching of all entered data, and may move forward to Step 3, using the right arrow icon 1218. The user may cancel the process of giving feedback and return to "View Feedback,"

using the "Cancel" button 1214, and may use the "Save Progress" button 1216 to save all user input up to this point as a "Feedback" draft.

Figure 13:
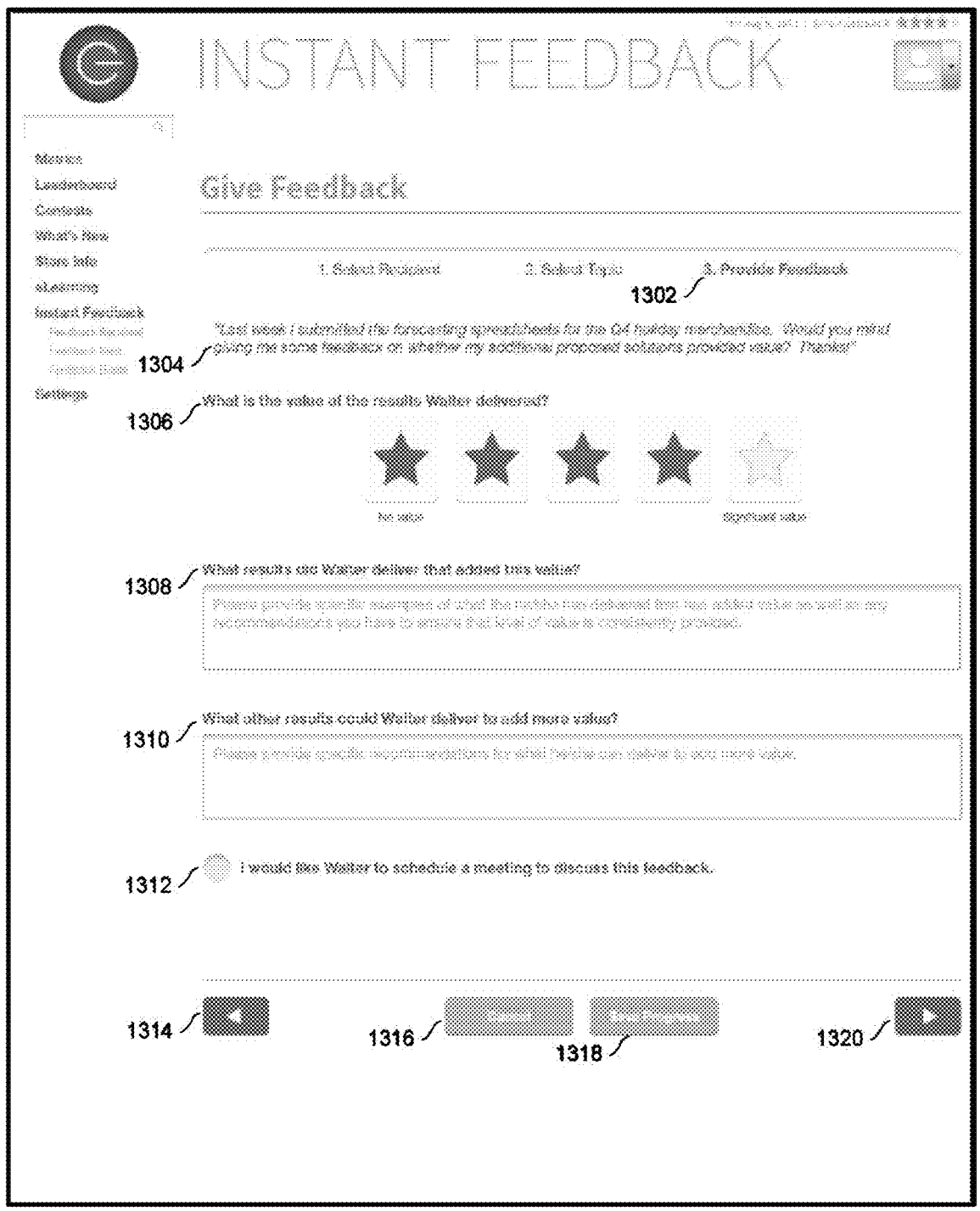
FIG. 13 illustrates an exemplary "Give Feedback" page for Step 3 of the process of giving feedback, in accordance with a representative embodiment of the present disclosure.

FIG. 13 illustrates an exemplary "Give Feedback" page for Step 3 of the process of giving feedback, in accordance with a representative embodiment of the present disclosure. As shown in the example of FIG. 13, Step 3 1302 of the "Give Feedback" process is to "Provide Feedback" on the topic selected in Step 2. A representative embodiment of the present disclosure may repeat the text of the original feedback request, as shown by the text 1304. A representative embodiment of the present disclosure may include both quantitative forms of feedback to show a degree or value, such as the use of the user-selectable "5-Star" icons 1306, as well as opportunities for free-form or text input, such as the text boxes 1308, 1310, to provided qualitative feedback. The user may also be provided with the ability to indicate interest in meeting with the intended recipient of the feedback using a dedicated user interface element such as a check box or radio button 1312, which may be communicated using, for example, an email, a text message, a multimedia messaging service message, or any other suitable form of messaging mechanism. The illustration of FIG. 13 also includes a left arrow icon 1314 to move to the previous step, a "Cancel" button 1316 to exit the current step without saving the user entries, a "Save Progress" button 1318, to save all current user entries as a "draft," and a right arrow icon 1320 that may become active when all user inputs (e.g., both qualitative and quantitative) have been answered. The user may then be presented with a confirmation page.

Figure 14:
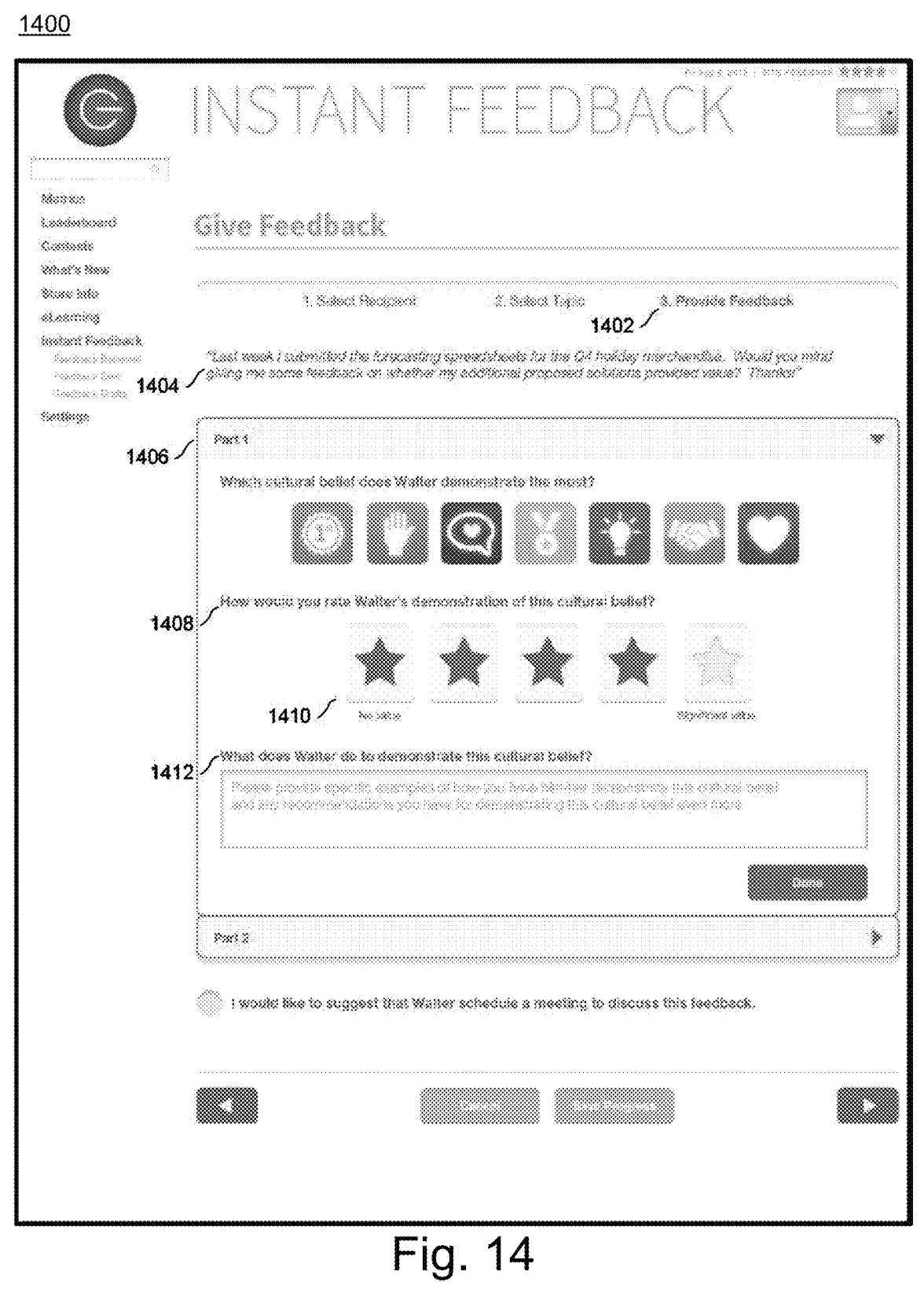

FIG. 14 illustrates another exemplary "Give Feedback" page for Step 3 of the process of giving feedback, in accordance with a representative embodiment of the present disclosure. As shown in the example of FIG. 14, Step 3 1402 of the "Give Feedback" process is to "Provide Feedback" on the topic selected in Step 2. A representative embodiment of the present disclosure may again repeat the text of the original feedback request, as shown by the text 1404. Guidance in responding to the feedback request is provided by presenting a elements of sub-portion of the feedback to be provided (i.e., "Part 1 1406"), asking the responder to provide input, in this example, by selecting various "cultural beliefs," a quantitative rating 1408, 1410 of how the recipient of the feedback performed with respect to the selected "cultural belief," and an option to provide textual qualitative feedback 1412, as well.

Figure 15:
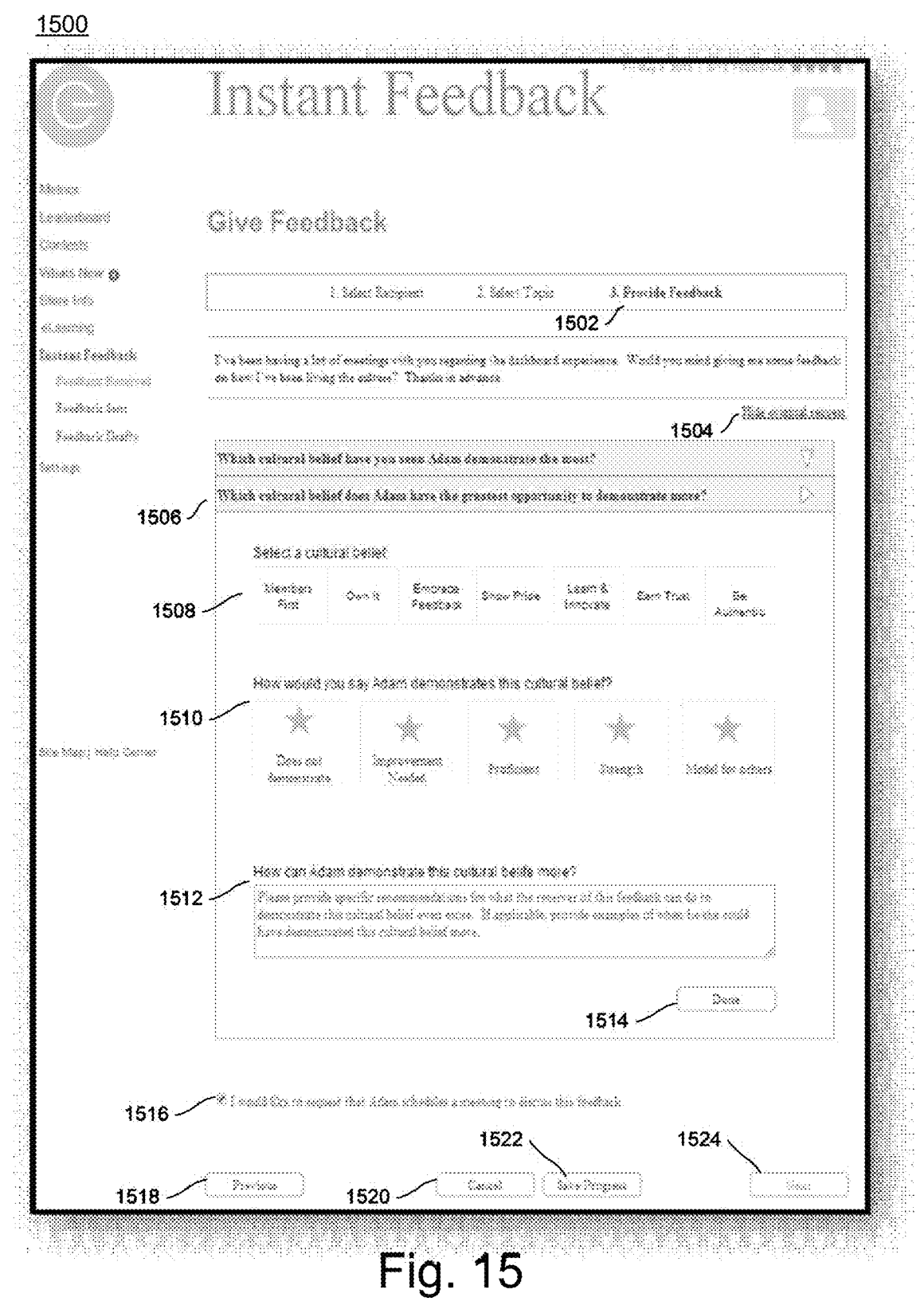

FIG. 15 illustrates still another example "Give Feedback" page for Step 3 of the process of giving feedback, in accordance with a representative embodiment of the present disclosure. In the example of FIG. 15, as in FIG. 14, Step 3 1502 of the "Give Feedback" process is to "Provide Feedback" on the topic selected in Step 2. A representative embodiment of the present disclosure may again repeat the text of the original feedback request, but may include a user interface element 1504 that permits the viewer to hide the text of the original feedback request. Guidance in providing further responses to the feedback request is provided, asking the responder to provide input, in this example, by selecting from various "cultural beliefs" 1508, the cultural belief that the responder feels in which the individual could improve the most. The responder can provide a quantitative rating 1510 showing how the recipient of the feedback performed with respect to the selected "cultural belief," and an option to provide textual qualitative feedback 1512, as well. The responder can end and submit the response by click-on/selecting "Done" 1514, and may suggest that the recipient of the feedback schedule a meeting by selecting checkbox 1516. The viewer/responder can also move forward and backward in the process using the "Previous" and "next" buttons 1518, 1524, may save the current state of the feedback submission using the "Save Progress" button 1522, and cancel the feedback provided by clicking on the "Cancel" button 1520.

Figure 16:
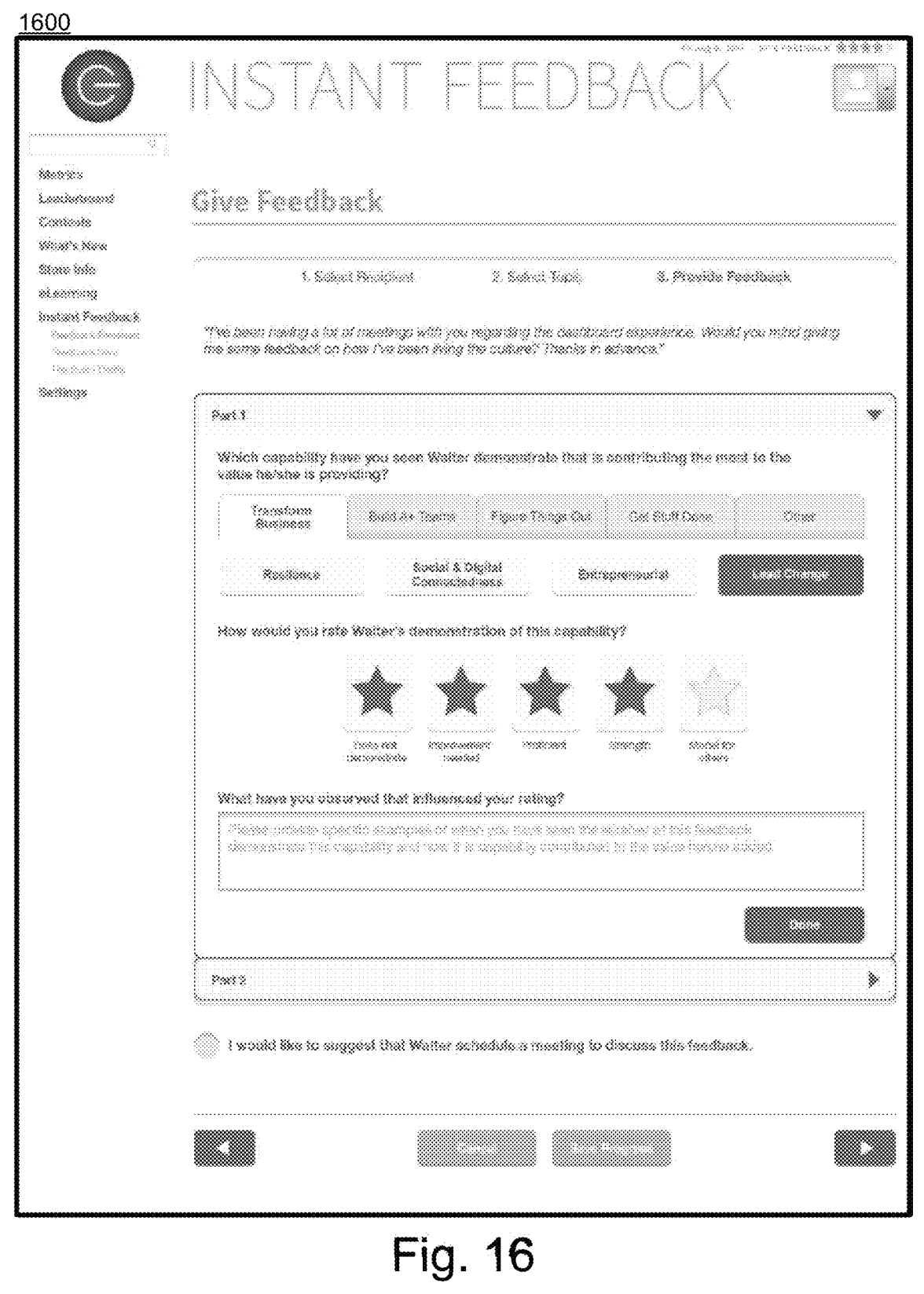

FIG. 16 illustrates another example "Give Feedback" page 1600 for Step 3 of the process of giving feedback, in accordance with a representative embodiment of the present disclosure. The "Give Feedback" page 1600 offers the responder addition opportunities to provide further quantitative and qualitative feedback to the individual that request their input.

Figure 17:
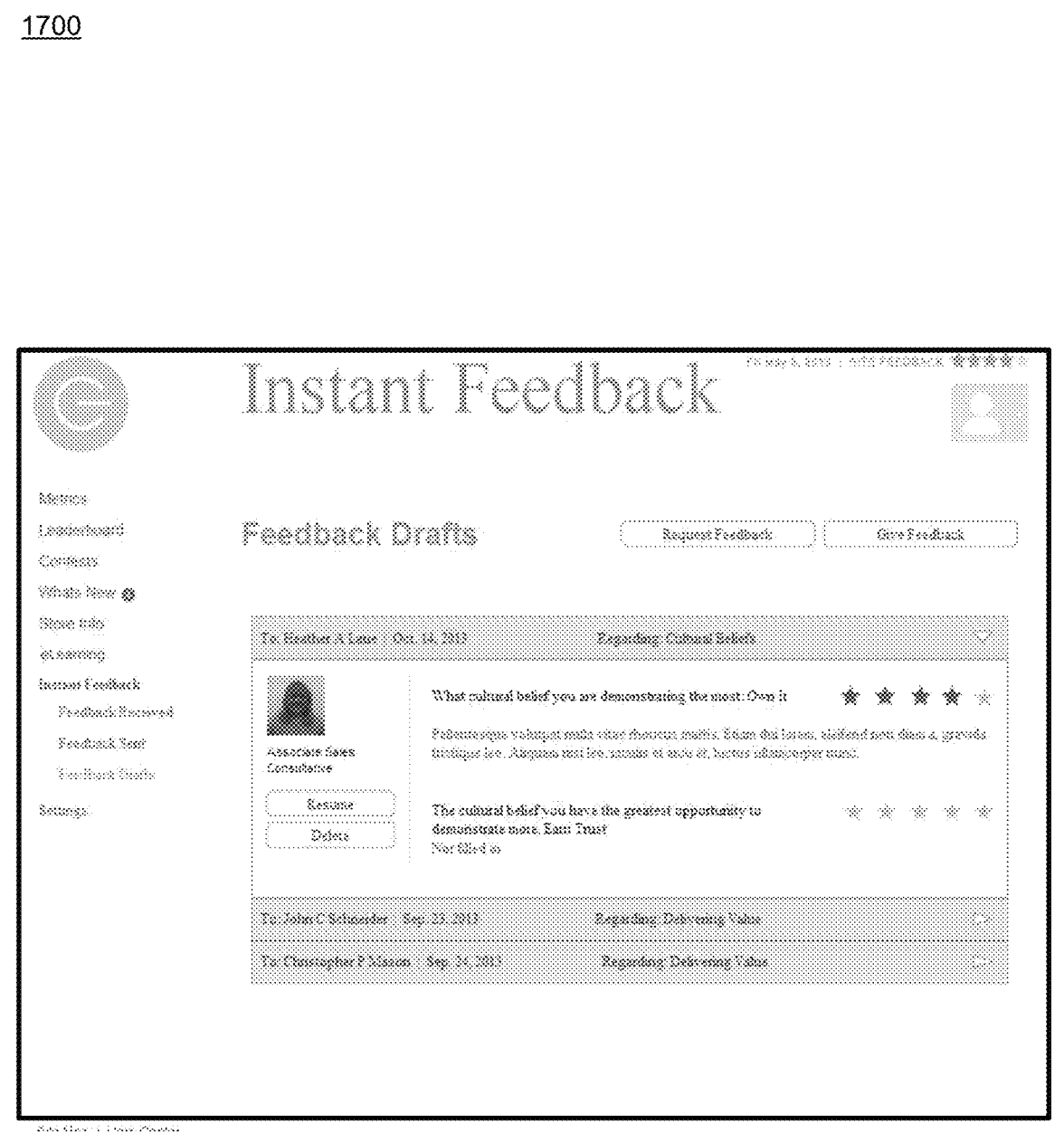

FIG. 17 illustrates an exemplary "Feedbacks Draft" page 1700 for use in the process of giving feedback to an individual, in accordance with a representative embodiment of the present disclosure. As can be seen in FIG. 17, the "Feedback Drafts" page 1700 includes a listing of feedback requests for which entry of feedback may have been begun, but not completed and submitted. The entries may be displayed in a compact or an expanded form. User interface elements are provided to permit the viewer to request or give feedback, to resume the process of providing feedback to a requestor, or to delete feedback in progress from the list of feedback requests.

Figure 18:
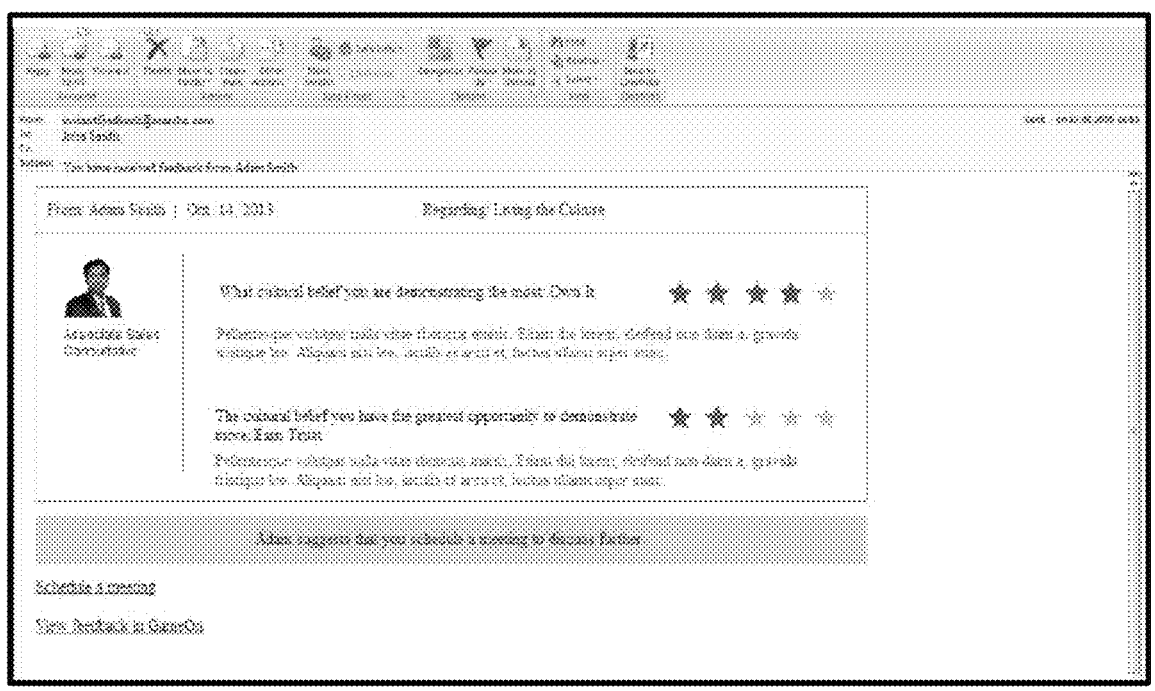
FIG. 18 illustrates an example email message notifying a user of received feedback, in accordance with a representative embodiment of the present disclosure.

FIG. 18 illustrates an example email message notifying a user of received feedback, in accordance with a representative embodiment of the present disclosure. As can be seen in FIG. 18, the example email identifies the provider of the feedback, the date on which the feedback was submitted, the topic of the feedback, and two more specific quantitative indicators of the feedback provided by the responder. The email of FIG. 18 may have been generated by, for example, the computer system 80 of FIG. 1. User interface elements are included to permit the reader of the email to request that a meeting with the responder be scheduled, or to login and view the feedback from within the system of the present disclosure, such as the system supported by the computer system 80, previously described.

Figure 19:
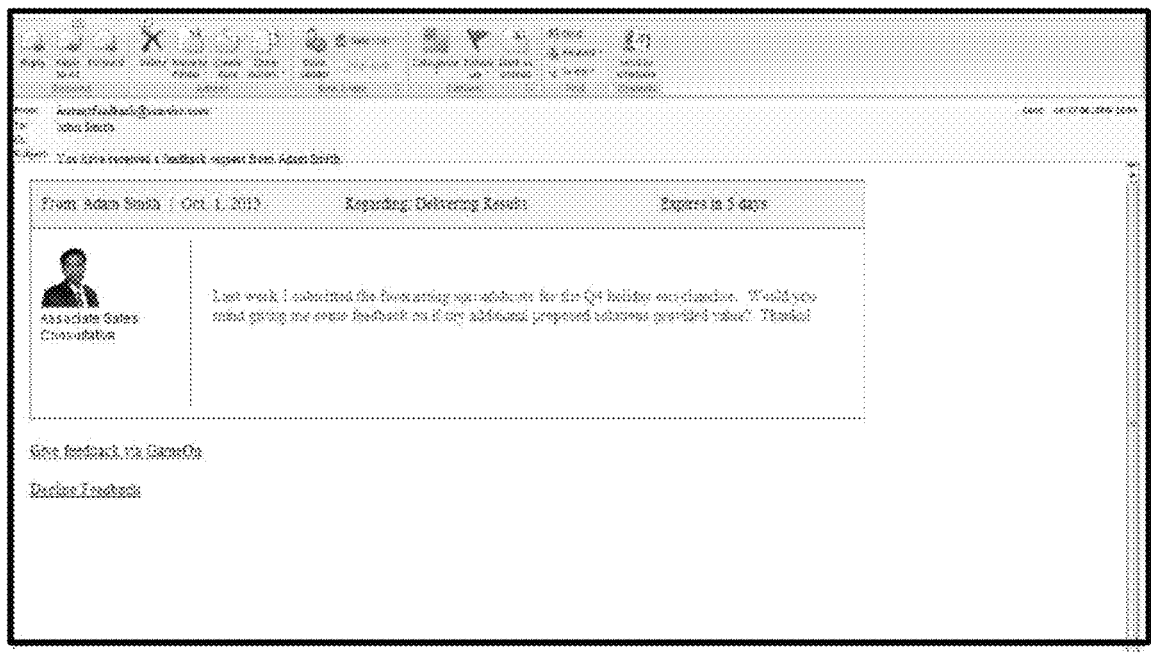
FIG. 19 illustrates an example email message requesting feedback, in accordance with a representative embodiment of the present disclosure.

FIG. 19 illustrates an example email message requesting feedback, in accordance with a representative embodiment of the present disclosure. As illustrated in FIG. 19, the example email identifies the individual that is requesting feedback, and the time at which the feedback request was made. The email shows the number of days until the feedback request expires, and the topic of the request for feedback. The text of the feedback request is clearly shown, alongside a thumbnail, name, and current role of the requestor within the enterprise. The viewer may choose to access the feedback request by logging in to the system of the present disclosure from within the email, using a user interface element provided for that purpose, and the recipient of the email may choose to explicitly decline to respond to the request for feedback, using another user interface element provided by the email of FIG. 19.

Figure 20:
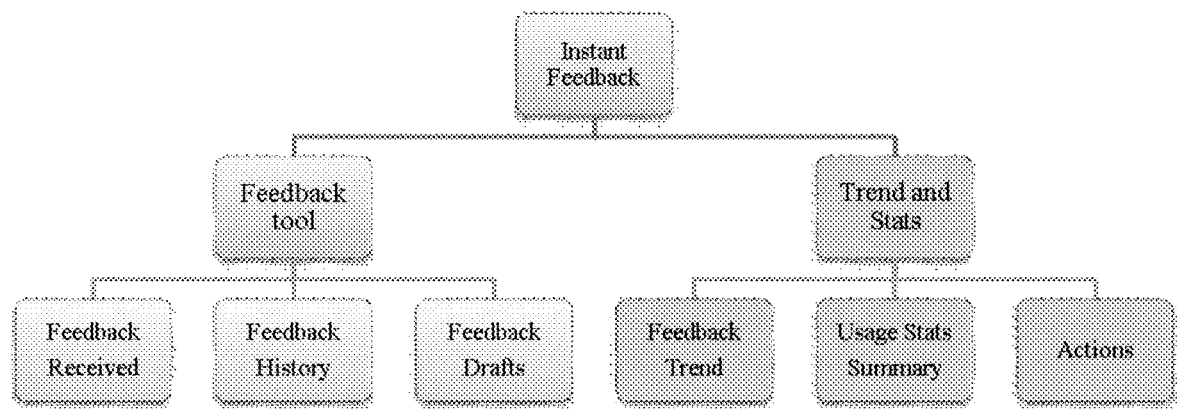
FIG. 20 illustrates an example information architecture diagram, in accordance with a representative embodiment of the present disclosure.

FIG. 20 illustrates an example information architecture diagram 2000, in accordance with a representative embodiment of the present disclosure.

Figure 21:
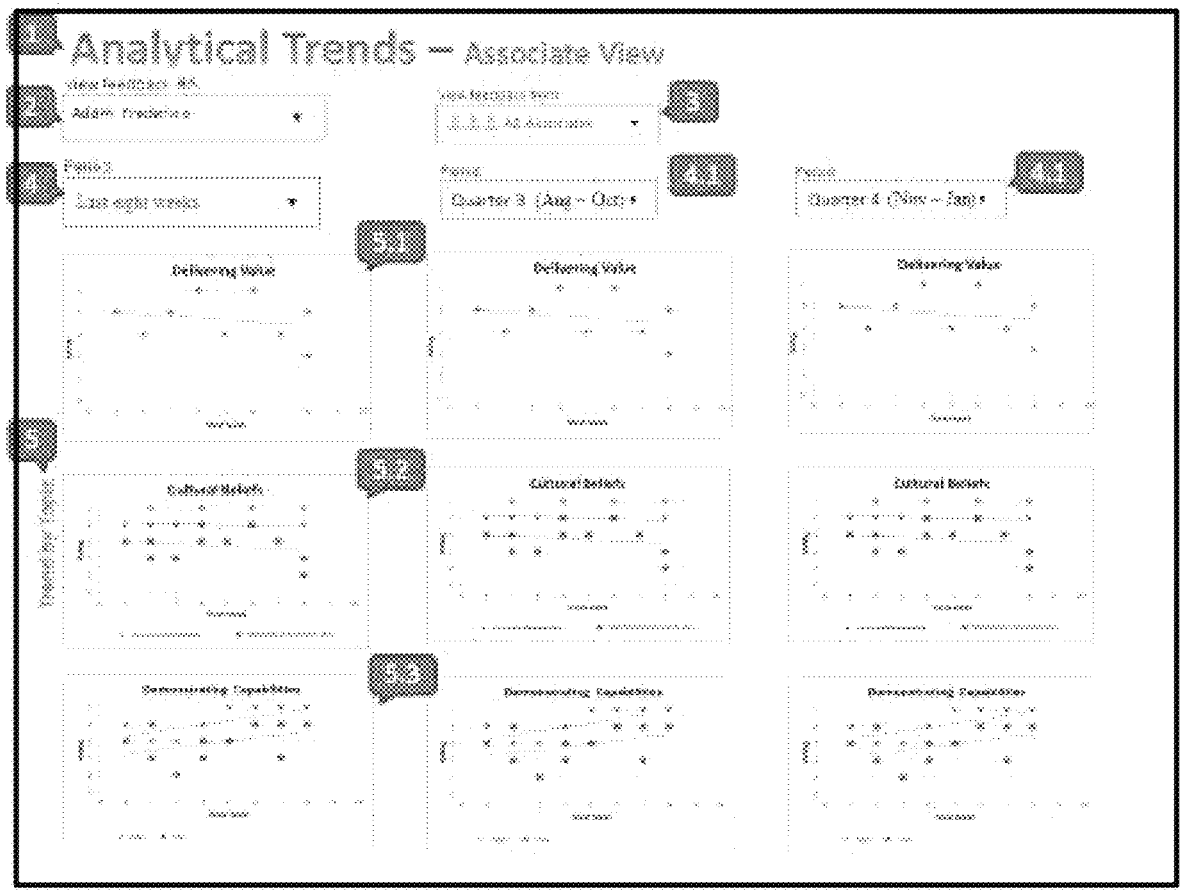
FIG. 21 illustrates an example screen image showing trends in various topics of feedback over a selected period of time for a particular individual, as seen by the particular individual, in accordance with a representative embodiment of the present disclosure.

FIG. 21 illustrates an example screen image 2100 showing trends in various topics of feedback over a selected period of time for a particular individual, as seen by the particular individual, in accordance with a representative embodiment of the present disclosure. The illustration shown in FIG. 21 illustrates graphically the results that may be derived by a system of the present disclosure from feedback information captured from communications sent by a responder to a request for feedback from the identified individual. For example, the responses provided by a responder using quantitative user interface elements (e.g., "Star" ratings) may be tracked by the system for each particular member of an enterprise, and may be used by the system to provide to the particular member, information about trends and summarizations of results. This may also be done at various granularities including, for example, per individual, per working group, per physical location of an enterprise, or per country, as illustrated, for example, in FIG. 25. In the example of FIG. 21, three separate topics (e.g., "Delivering Value," "Cultural Beliefs," and "Demonstrating Capabilities") are shown for different time frames (e.g., "Last Eight Weeks," "Quarter 3," and "Quarter 4"), for a single individual, allowing the viewer to compare results and detect trends in their own behaviors, attitudes, and performance.

Figure 22:
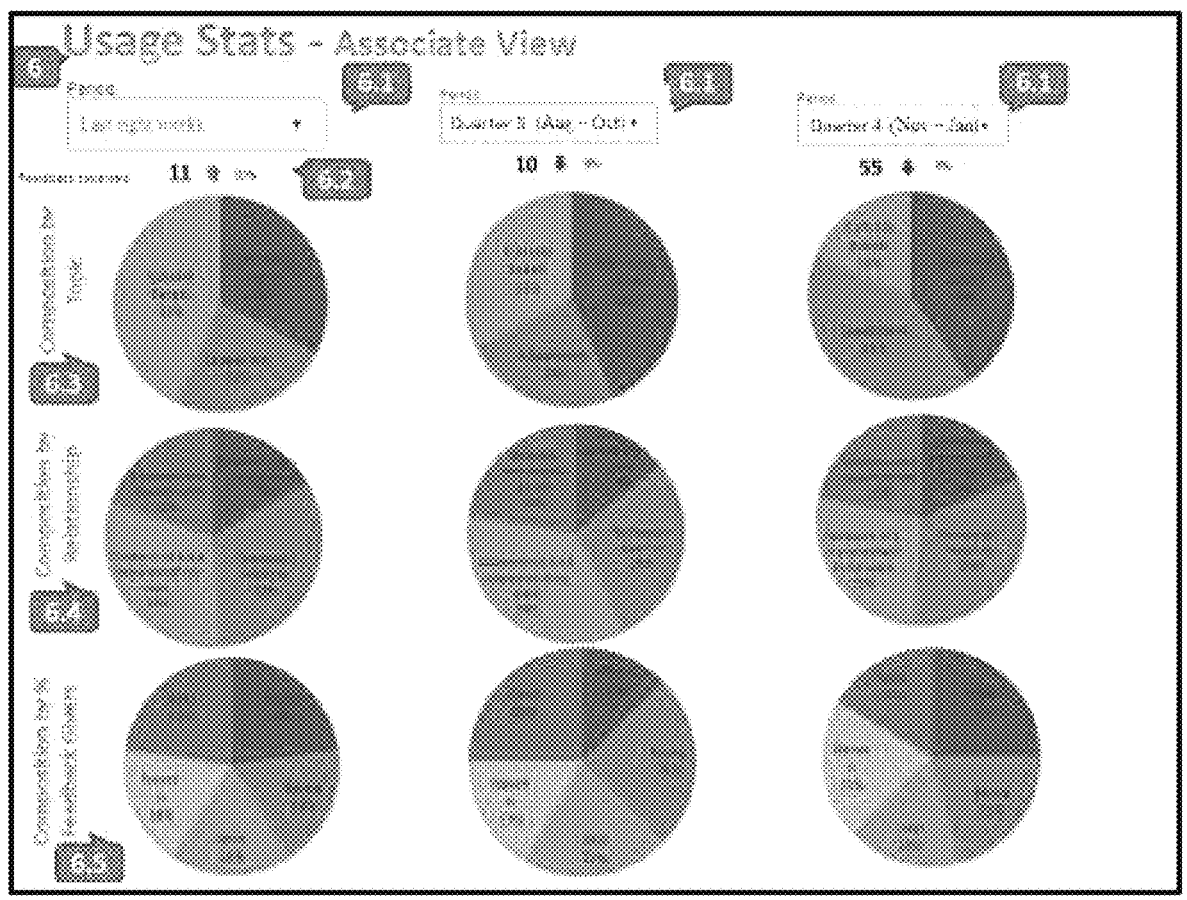
FIG. 22 illustrates an example screen image showing trends in various topics of feedback over a selected period of time for a particular individual, as seen by the particular individual, in accordance with a representative embodiment of the present disclosure.

FIG. 22 illustrates an example screen image showing trends in various topics of feedback over a selected period of time for a particular individual, as seen by the particular individual, in accordance with a representative embodiment of the present disclosure.

Figure 23:
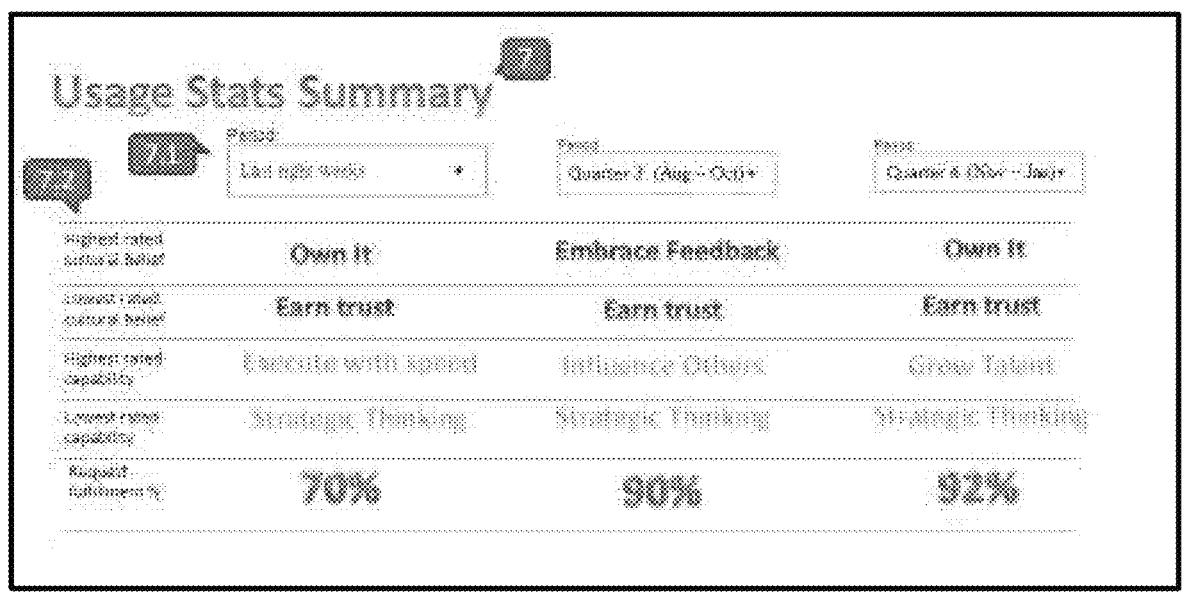
FIG. 23 illustrates another example screen image showing a graphical representation presenting results of various measures over various time frames derived from captured feedback information exchanged by individuals in an enterprise, in accordance with a representative embodiment of the present disclosure.

FIG. 23 illustrates another example screen image 2300 showing a graphical representation presenting results of various measures over various time frames derived from captured feedback information exchanged by individuals in an enterprise, in accordance with a representative embodiment of the present disclosure. In the illustration of FIG. 23, levels of five different measures for individuals of the enterprise (e.g., "Highest Rated Cultural Belief," "Lowest Rated Cultural Belief," "Highest Rated Capability," Lowest Rated Capability," "Request Fulfillment") are shown for each of three different time frames.

Figure 24:
FIG. 24 illustrates an exemplary screen image showing suggested actions based on feedback captured by a system in accordance with a representative embodiment of the present disclosure.

FIG. 24 illustrates an exemplary screen image 2400 showing suggested actions based on feedback captured by a system in accordance with a representative embodiment of the present disclosure. FIG. 24 illustrates that the results of quantitative information provided in feedback exchanged between end-users of the system described herein may be used by a representative embodiment of the present disclosure to automatically generate recommendations or suggestions for members throughout an enterprise.

Figure 25:
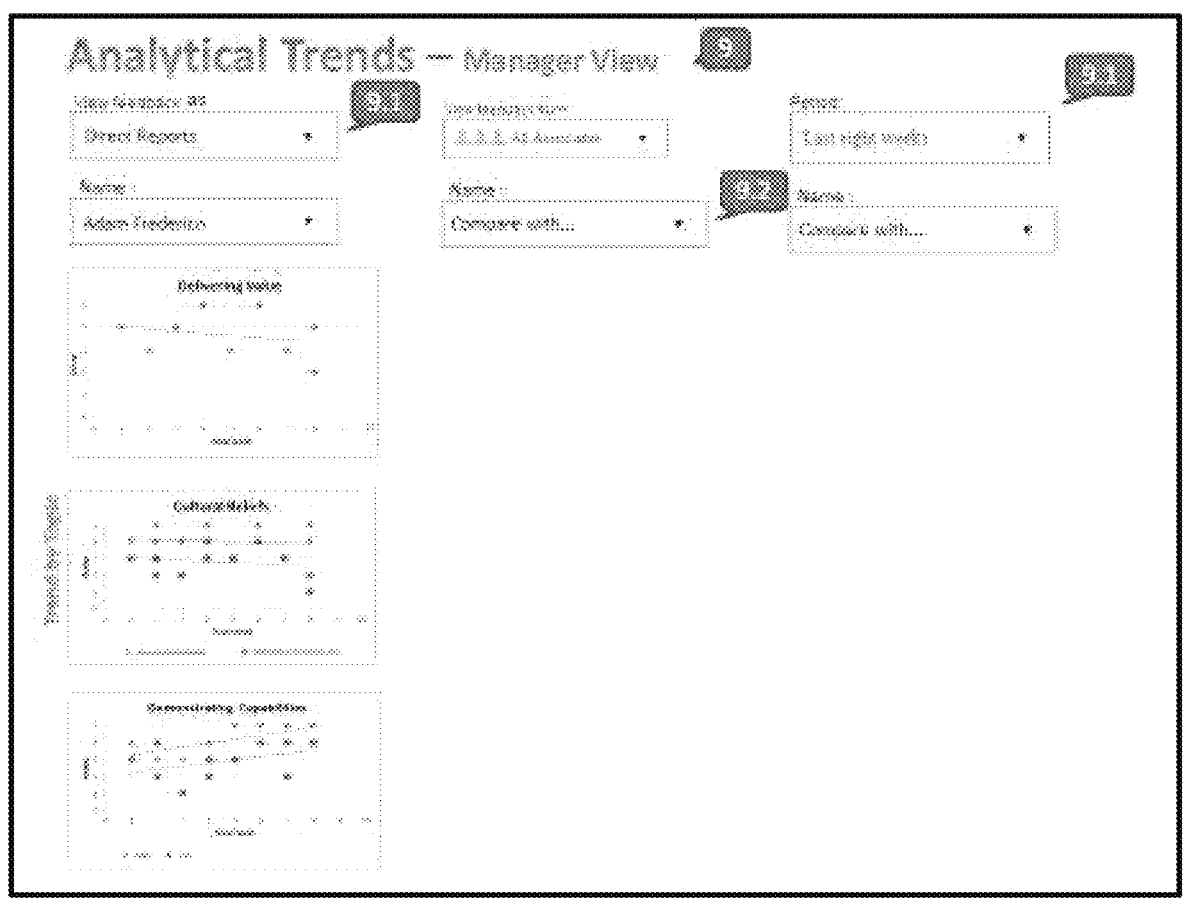
FIG. 25 illustrates an example screen image showing trends in various topics of feedback over a selected period of time for one or more selected individuals, as seen by a manager of the selected individuals, in accordance with a representative embodiment of the present disclosure.

FIG. 25 illustrates an example screen image 2500 showing trends in various topics of feedback over a selected period of time for one or more selected individuals, as seen by a manager of the selected individuals, in accordance with a representative embodiment of the present disclosure. The example of FIG. 25 permits comparisons of data for two or more individuals of a team, over various selectable time periods.

Figure 26:
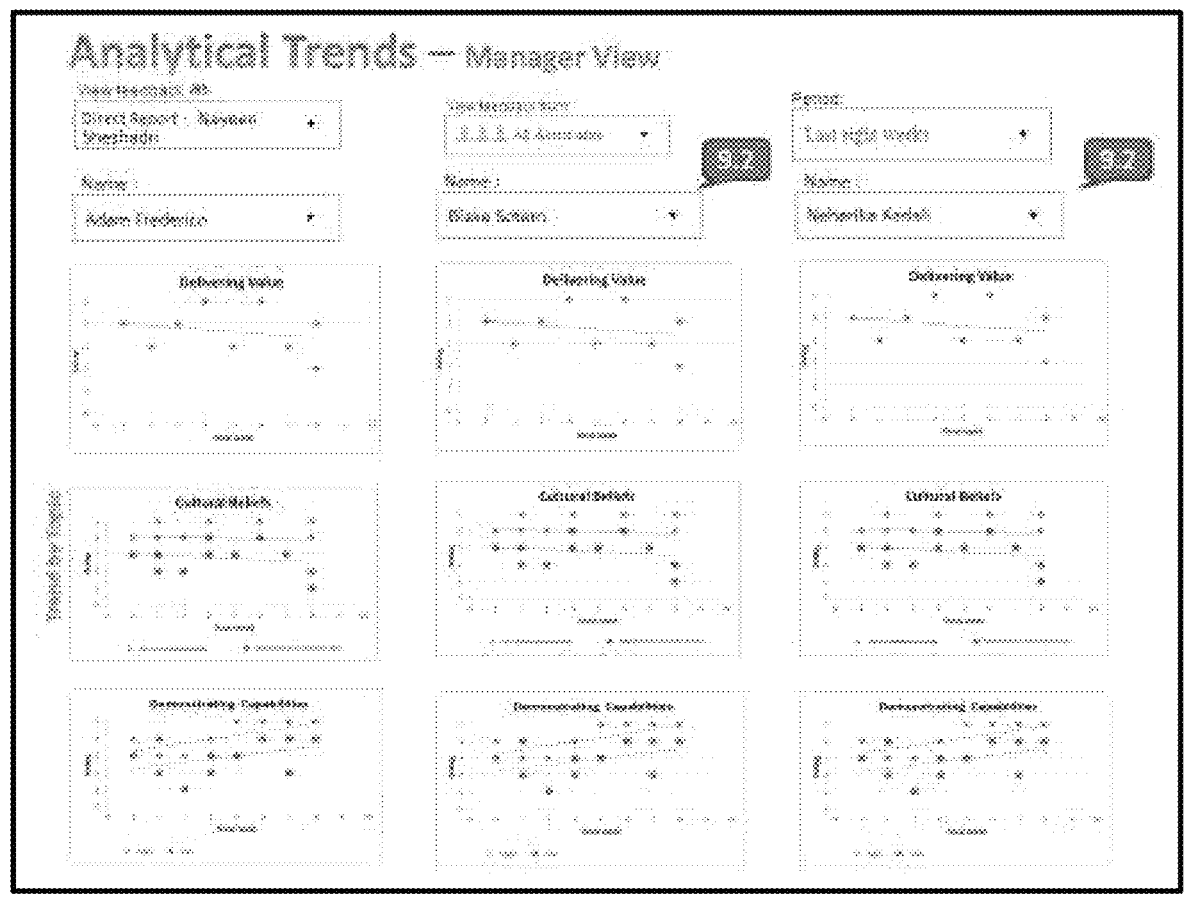
FIG. 26 illustrates an example screen image showing trends in various topics of feedback over a selected period of time for three selected individuals of a particular manager, as seen by a still higher-level manager of the particular manager of the three selected individuals, in accordance with a representative embodiment of the present disclosure.

FIG. 26 illustrates an example screen image 2600 showing trends in various topics of feedback over a selected period of time for three selected individuals of a particular manager, as seen by a still higher-level manager of the particular manager of the three selected individuals, in accordance with a representative embodiment of the present disclosure. Like FIG. 25, the example of FIG. 26 permits comparisons of data for the three individuals of a team, over various selectable time periods, to permit upper-level management to gauge the effectiveness of given managers of their teams.

Figure 27:
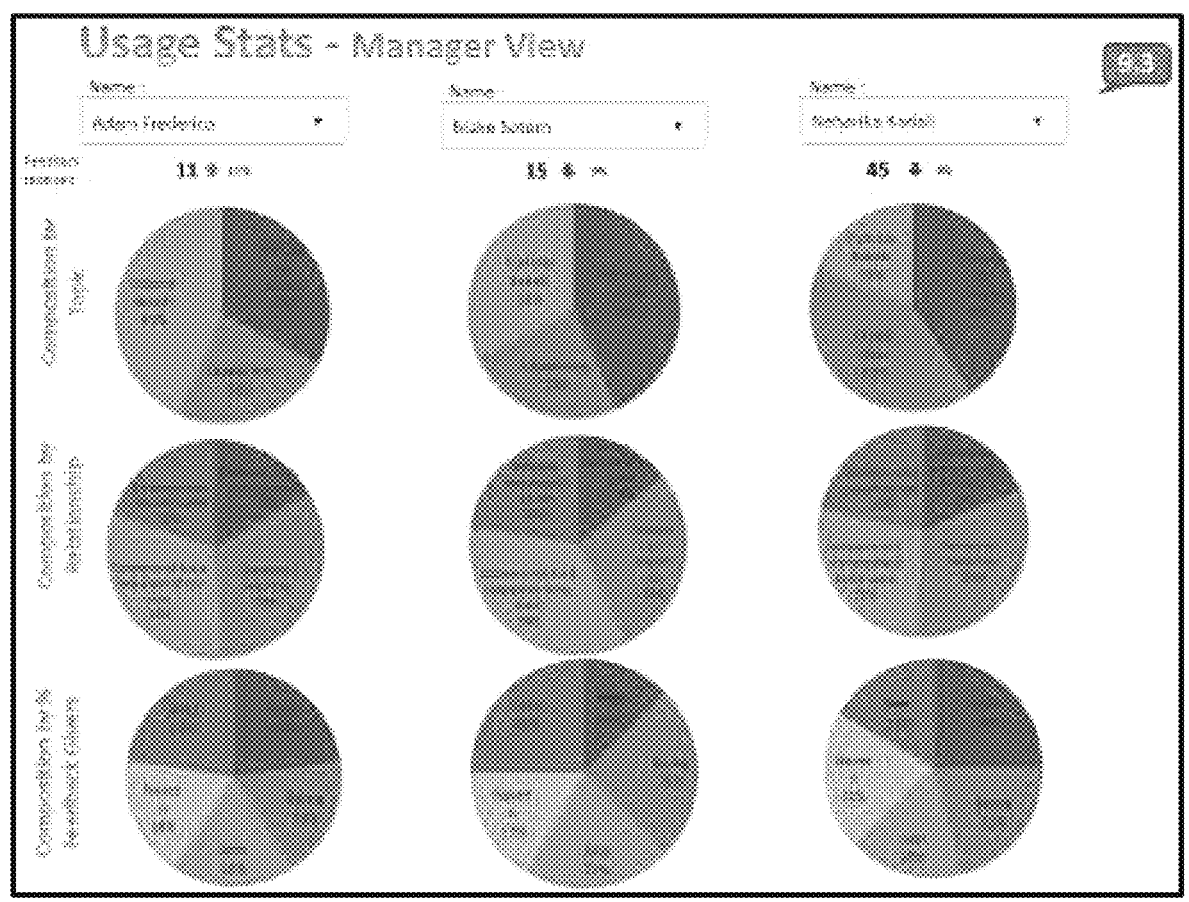
FIG. 27 illustrates another example screen image showing a different graphical representation presenting further results derived from captured feedback information exchanged by individuals in an enterprise from a manager's point of view, similar to the screen shown in FIG. 22, in accordance with a representative embodiment of the present disclosure.

FIG. 27 illustrates another example screen image 2700 showing a different graphical representation presenting further results derived from captured feedback information exchanged by individuals in an enterprise from a manager's point of view, similar to the screen shown in FIG. 22, in accordance with a representative embodiment of the present disclosure.

Figure 28:
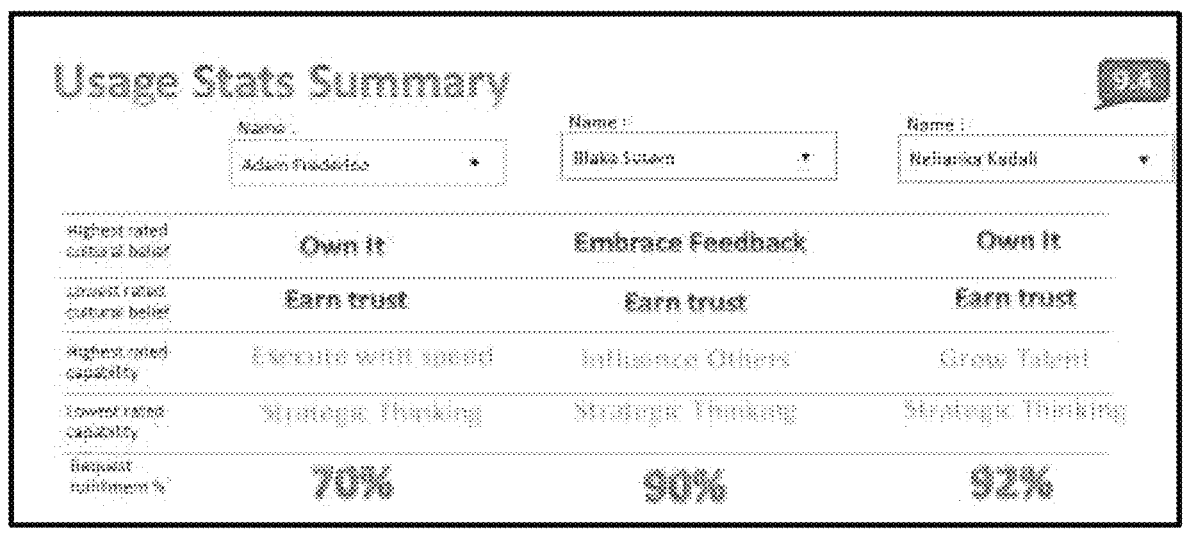
FIG. 28 illustrates an example screen image showing a graphical representation presenting results of various measures for different individuals, derived from captured feedback information exchanged by members of an enterprise, in accordance with a representative embodiment of the present disclosure.

FIG. 28 illustrates an example screen image 2800 showing a graphical representation presenting results of various measures for different individuals, derived from captured feedback information exchanged by members of an enterprise, in accordance with a representative embodiment of the present disclosure. In the illustration of FIG. 28, levels of five different measures for individuals of the enterprise (e.g., "Highest Rated Cultural Belief," "Lowest Rated Cultural Belief," "Highest Rated Capability," Lowest Rated Capability," "Request Fulfillment") are shown for each of three different individuals, in accordance with a representative embodiment of the present disclosure.

Figure 29:
FIG. 29 illustrates an example screen image showing a "Leaderboard" listing business operational result and related worker feedback results, in accordance with a representative embodiment of the present disclosure.

FIG. 29 illustrates an example screen image 2900 showing a "Leaderboard" listing business operational result and related worker feedback results, in accordance with a representative embodiment of the present disclosure.

Figure 30:
FIG. 30 illustrates an example screen image showing another "Feedback Received" page similar to that shown in FIG. 3, in accordance with a representative embodiment of the present disclosure.

FIG. 30 illustrates an example screen image 3000 showing another "Feedback Received" page similar to that shown in FIG. 3, in accordance with a representative embodiment of the present disclosure.

Figure 31:
FIG. 31 illustrates an example screen image showing another "Feedback Received" page similar to that shown in FIG. 3, in accordance with a representative embodiment of the present disclosure.

FIG. 31 illustrates an example screen image 3100 showing another "Feedback Received" page similar to that shown in FIG. 3, in accordance with a representative embodiment of the present disclosure.

Figure 32:
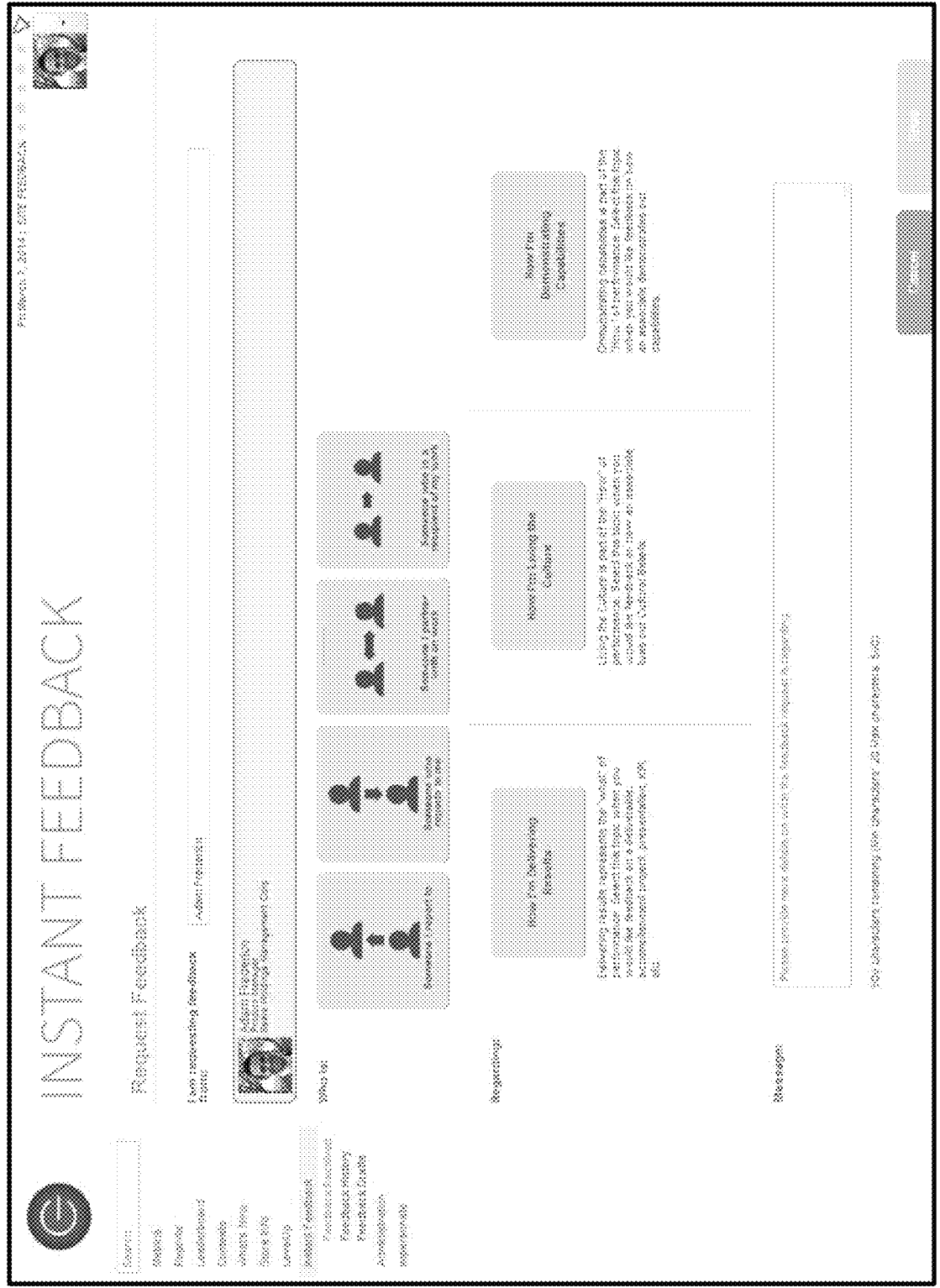
FIG. 32 illustrates an example screen image showing another "Request Feedback" page similar to that shown in FIG. 4, in accordance with a representative embodiment of the present disclosure.

FIG. 32 illustrates an example screen image 3200 showing another "Request Feedback" page similar to that shown in FIG. 4, in accordance with a representative embodiment of the present disclosure.

Figure 33:
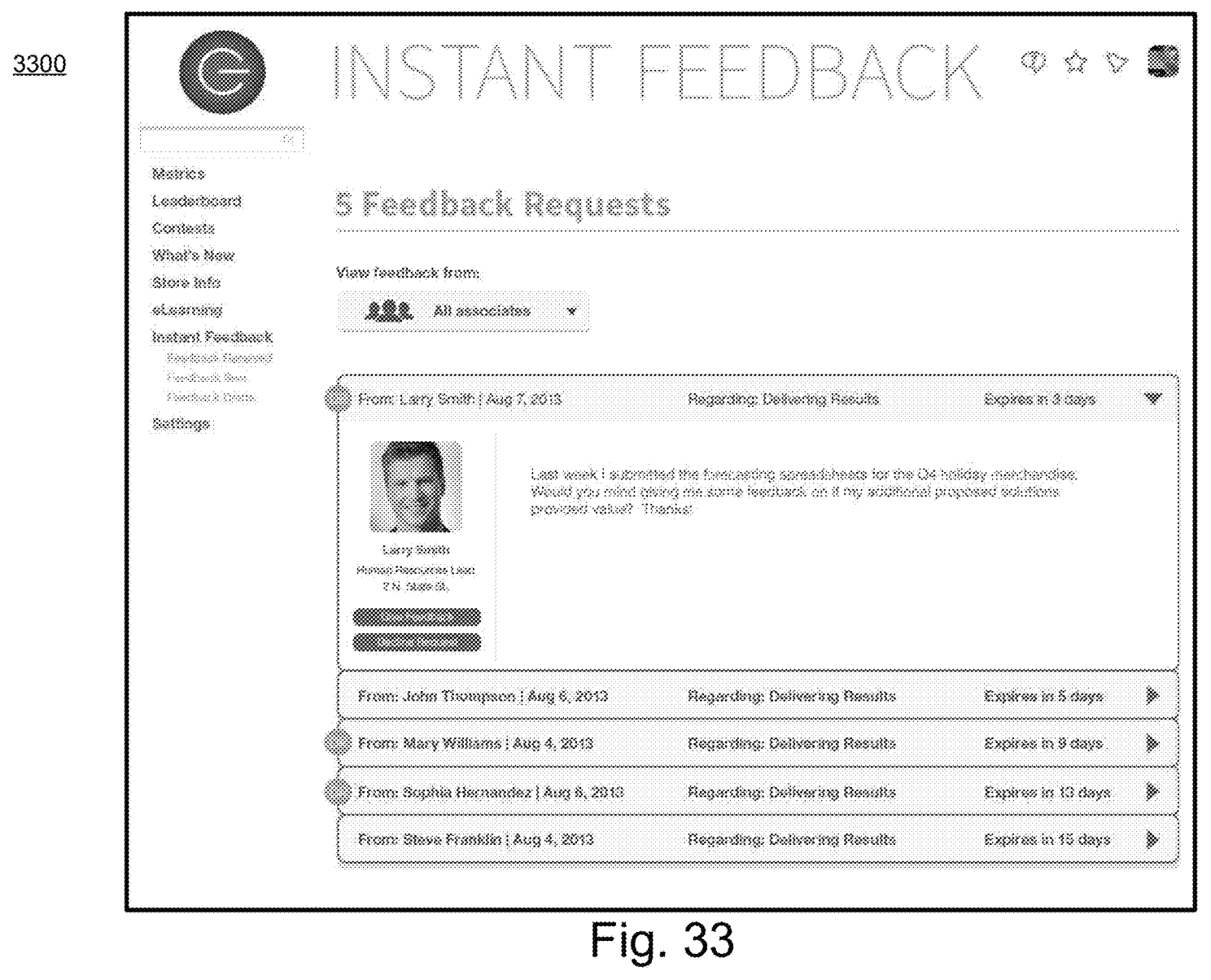

FIG. 33 illustrates an example screen image 3300 showing another "Feedback Requests" page similar to that shown in FIG. 6, in accordance with a representative embodiment of the present disclosure.

Figure 34:
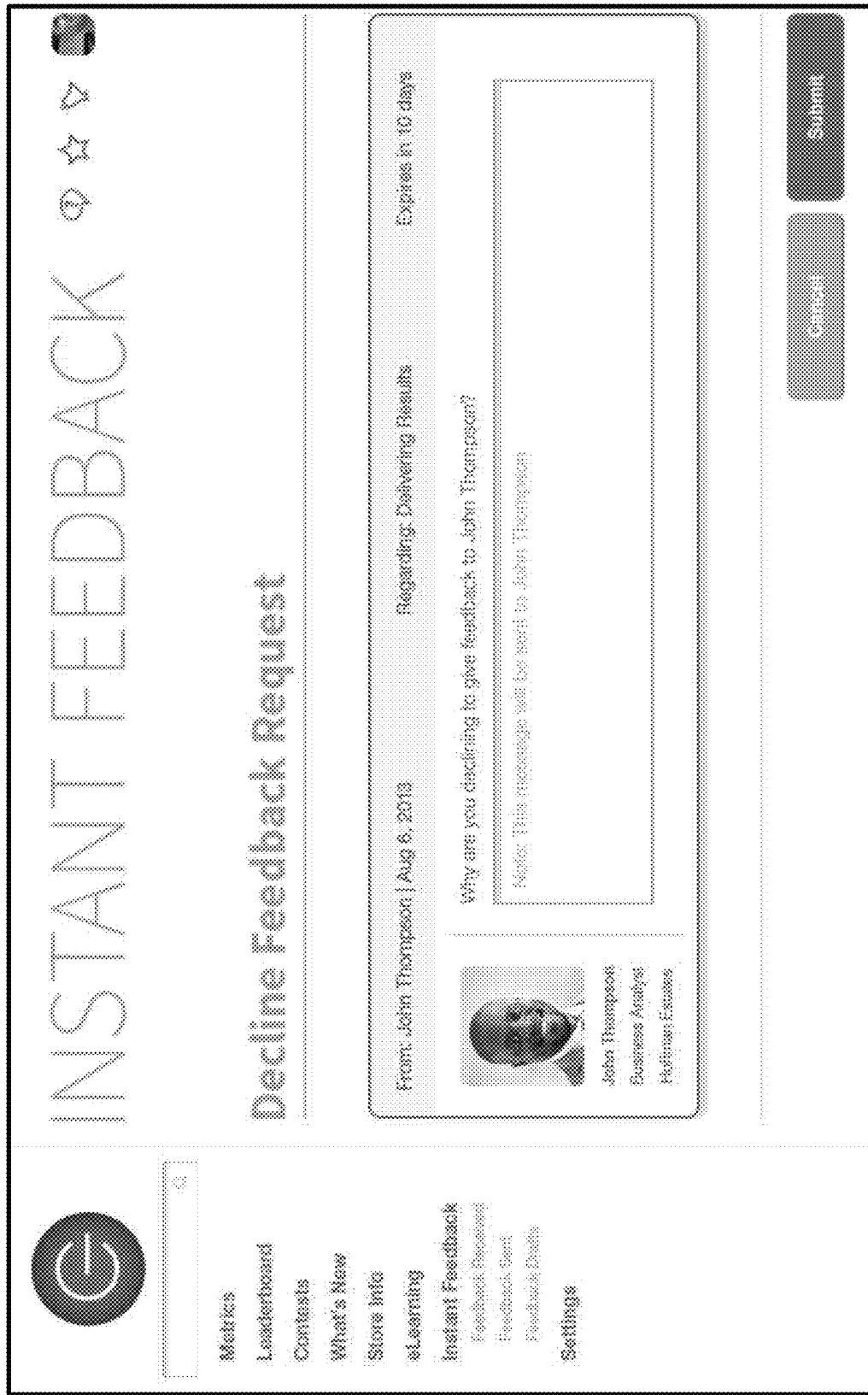
FIG. 34 illustrates an example screen image showing another "Decline Feedback Request" page similar to that shown in FIG. 7, in accordance with a representative embodiment of the present disclosure.

FIG. 34 illustrates an example screen image 3400 showing another "Decline Feedback Request" page similar to that shown in FIG. 7, in accordance with a representative embodiment of the present disclosure.

Figure 35:
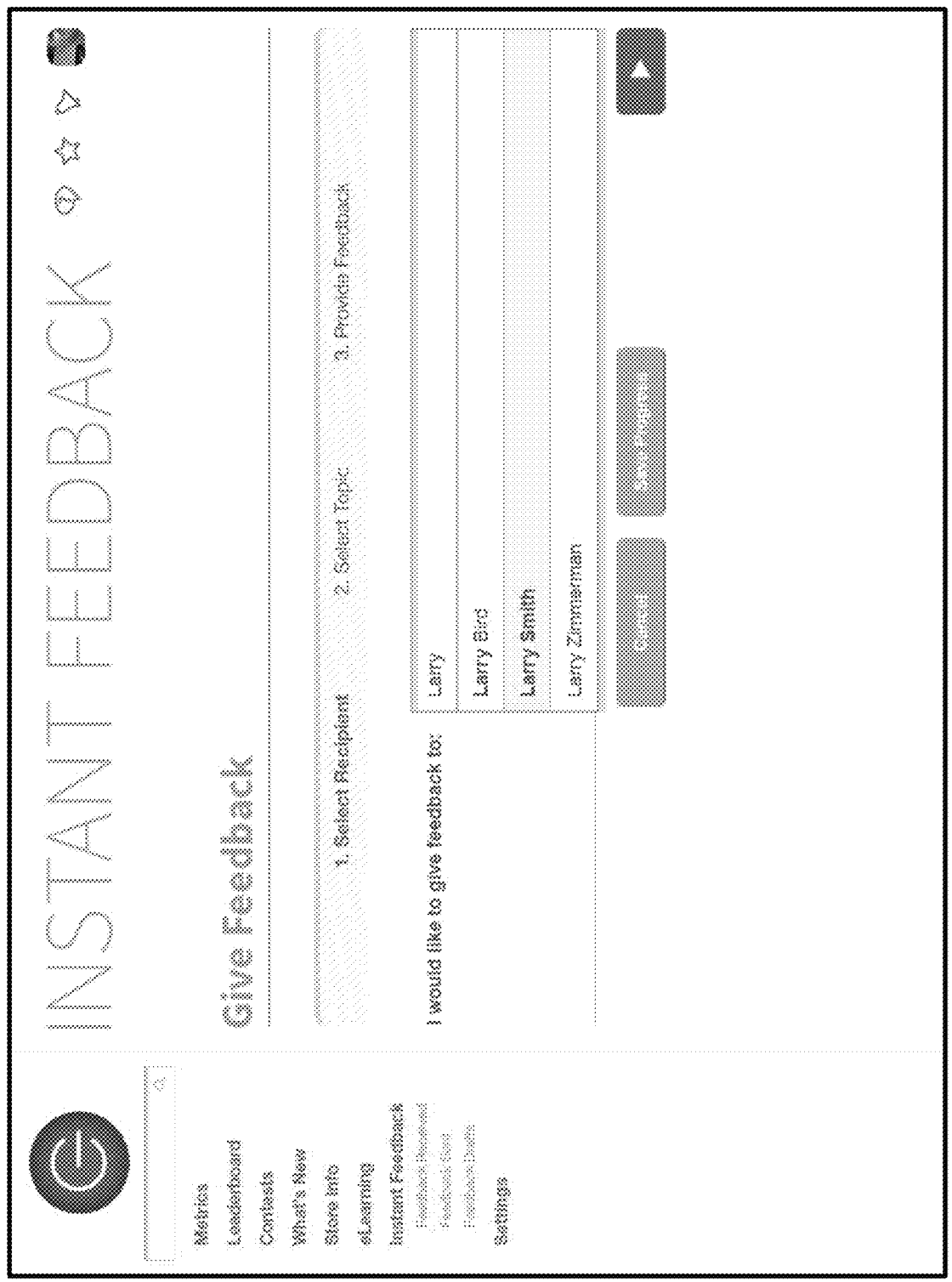
FIG. 35 illustrates an example screen image showing another "Give Feedback" page similar to that shown in FIG. 9, in accordance with a representative embodiment of the present disclosure.

FIG. 35 illustrates an example screen image 3500 showing another "Give Feedback" page similar to that shown in FIG. 9, in accordance with a representative embodiment of the present disclosure.

Figure 36:
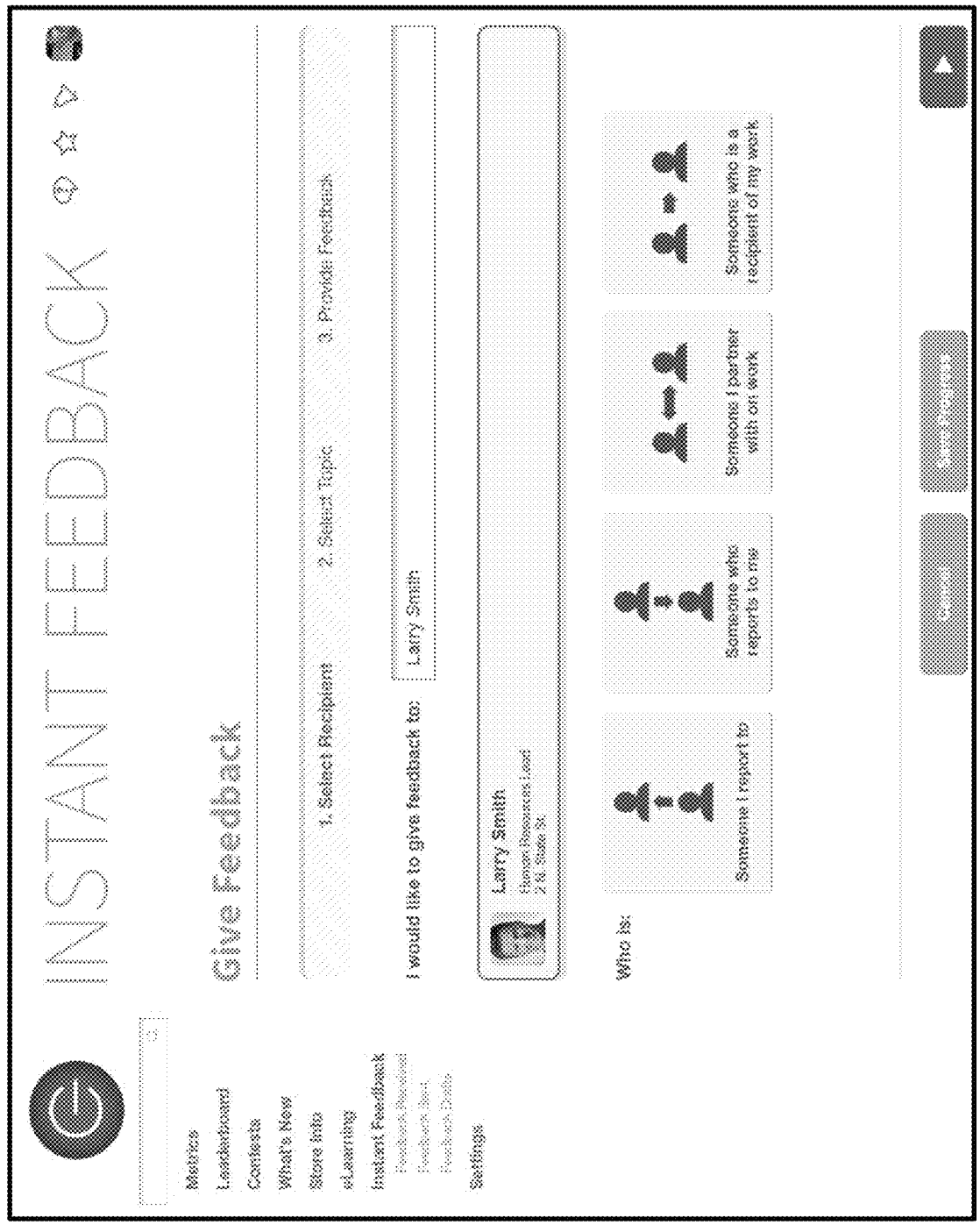
FIG. 36 illustrates an example screen image showing another "Give Feedback" page similar to that shown in FIG. 10, in accordance with a representative embodiment of the present disclosure.

FIG. 36 illustrates an example screen image 3600 showing another "Give Feedback" page similar to that shown in FIG. 10, in accordance with a representative embodiment of the present disclosure.

Figure 37:
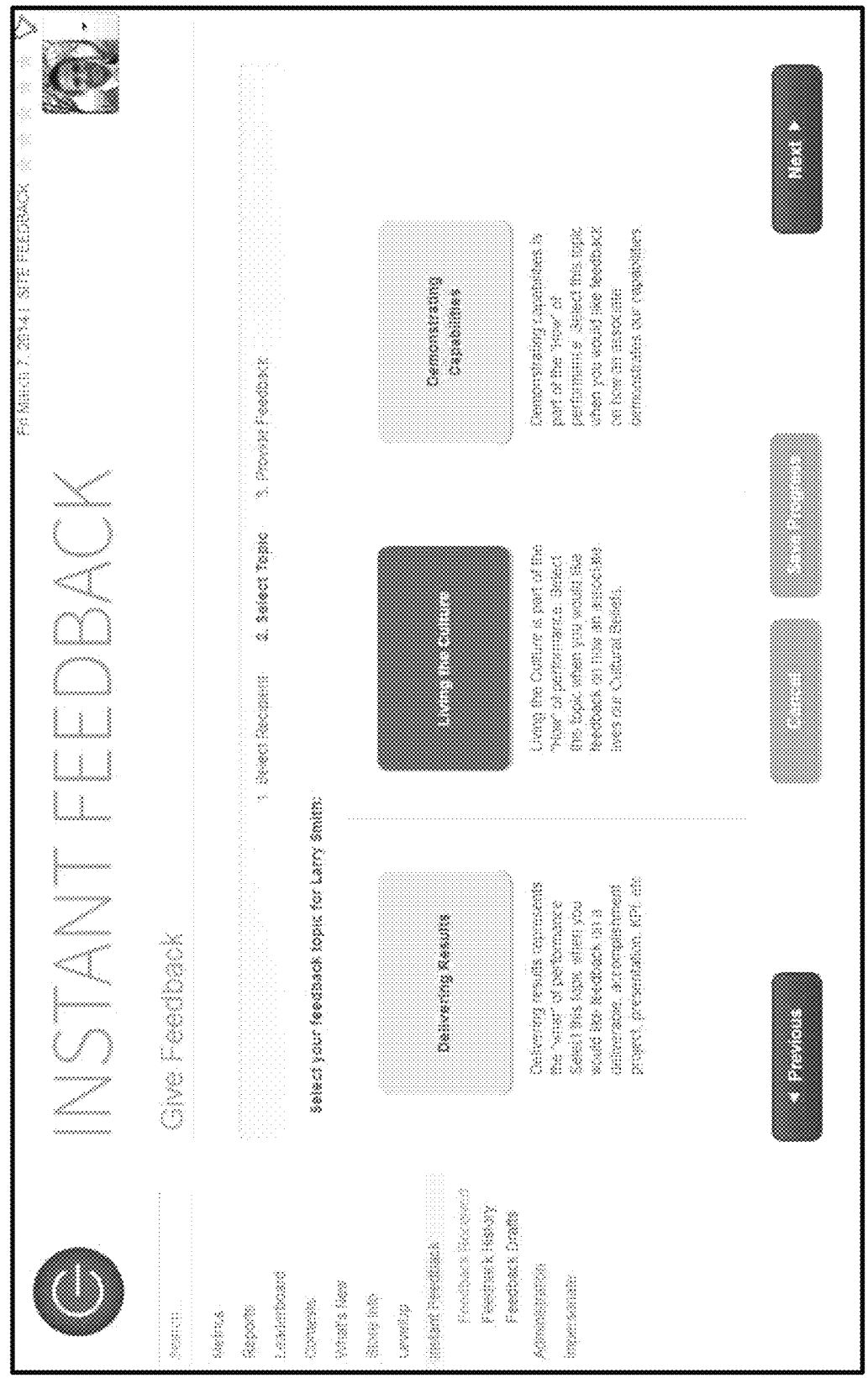
FIG. 37 illustrates an example screen image showing another "Give Feedback" page similar to that shown in FIG. 12, in accordance with a representative embodiment of the present disclosure.

FIG. 37 illustrates an example screen image 3700 showing another "Give Feedback" page similar to that shown in FIG. 12, in accordance with a representative embodiment of the present disclosure.

Figure 38:
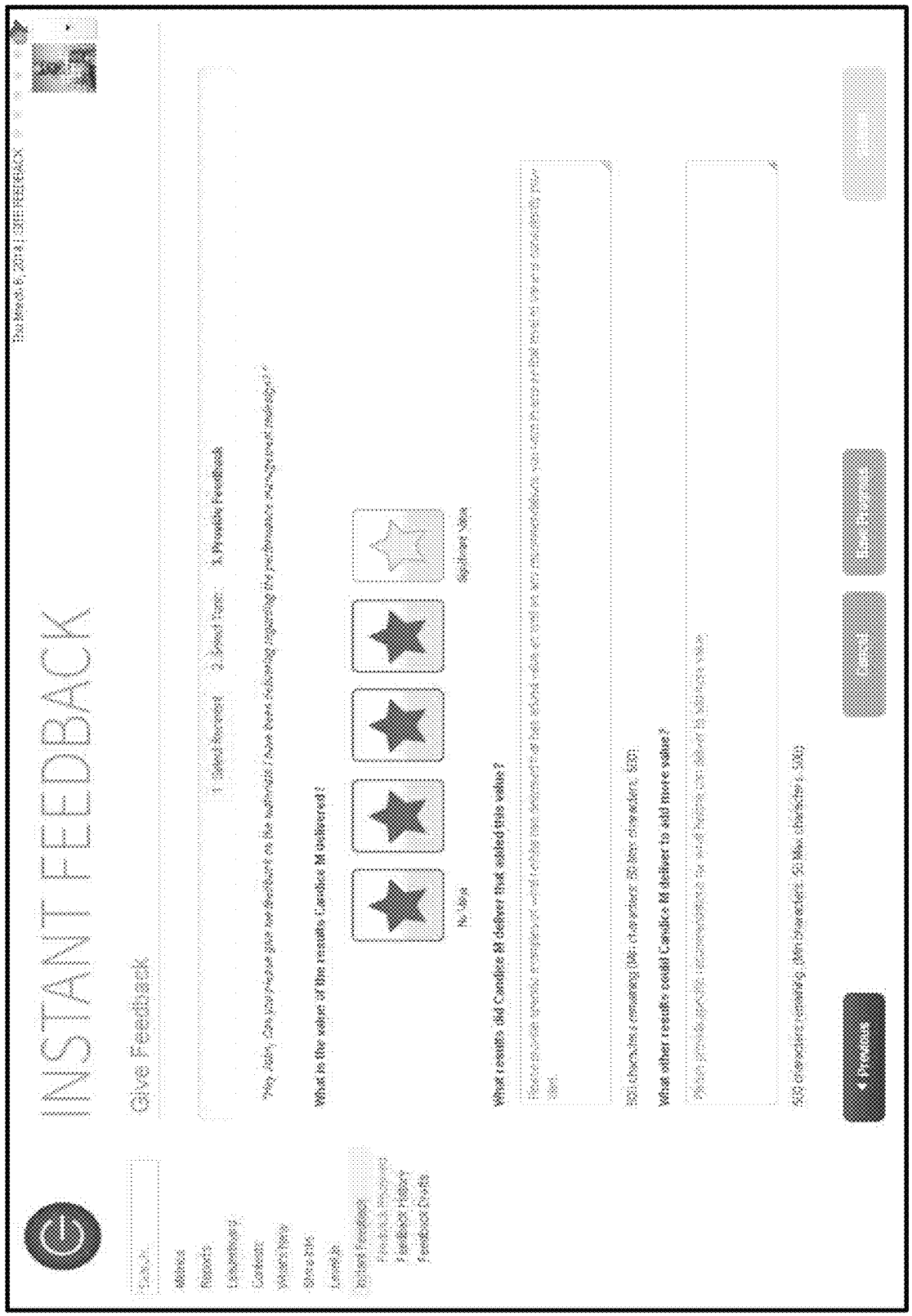
FIG. 38 illustrates an example screen image showing another "Give Feedback" page similar to that shown in FIG. 13, in accordance with a representative embodiment of the present disclosure.

FIG. 38 illustrates an example screen image 3800 showing another "Give Feedback" page similar to that shown in FIG. 13, in accordance with a representative embodiment of the present disclosure.

Figure 39:
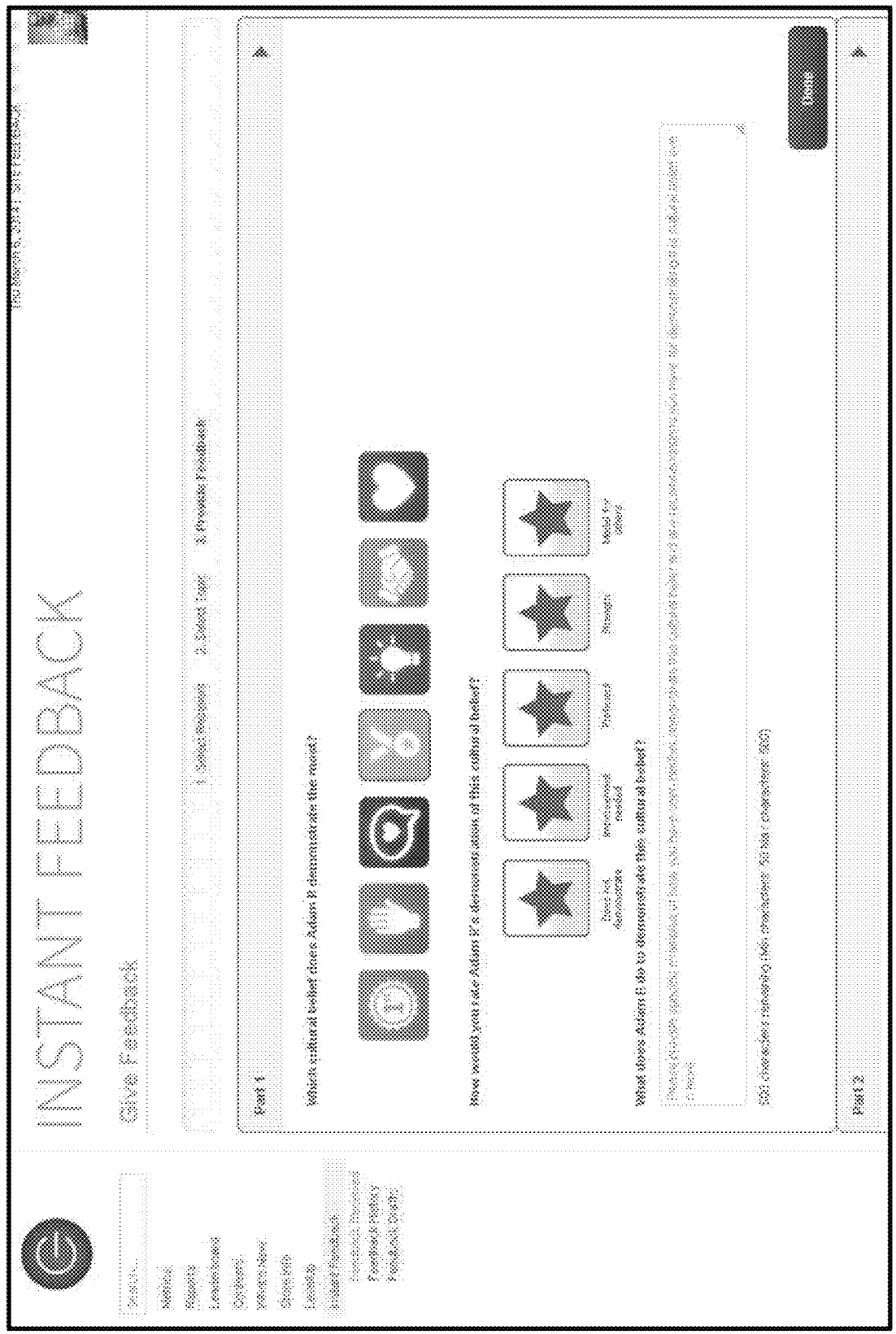
FIG. 39 illustrates an example screen image showing another "Give Feedback" page similar to that shown in FIG. 14, in accordance with a representative embodiment of the present disclosure.

FIG. 39 illustrates an example screen image 3900 showing another "Give Feedback" page similar to that shown in FIG. 14, in accordance with a representative embodiment of the present disclosure.

Figure 40:
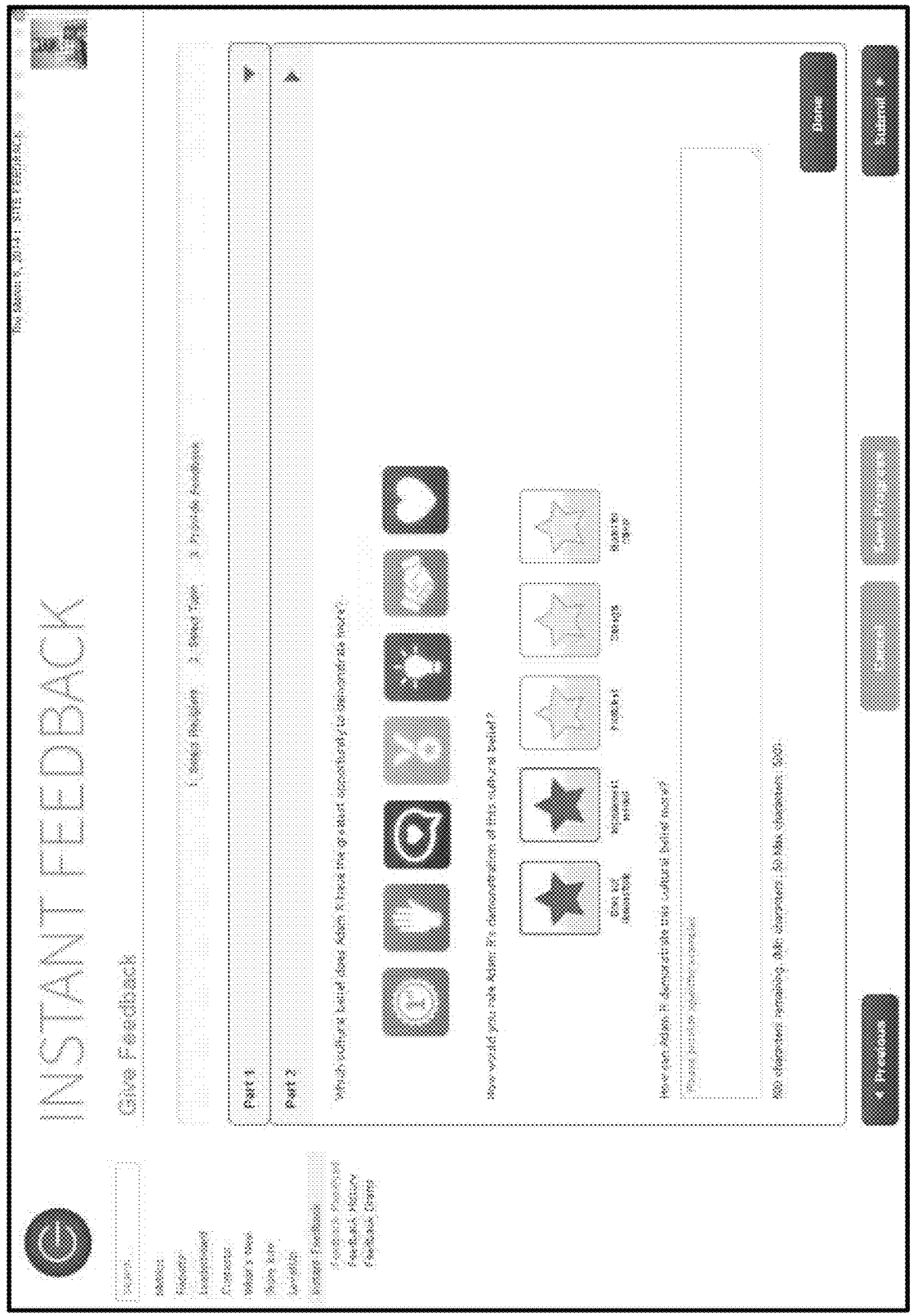
FIG. 40 illustrates an example screen image showing another "Give Feedback" page similar to that shown in FIG. 15, in accordance with a representative embodiment of the present disclosure.

FIG. 40 illustrates an example screen image 4000 showing another "Give Feedback" page similar to that shown in FIG. 15, in accordance with a representative embodiment of the present disclosure.

Figure 41:
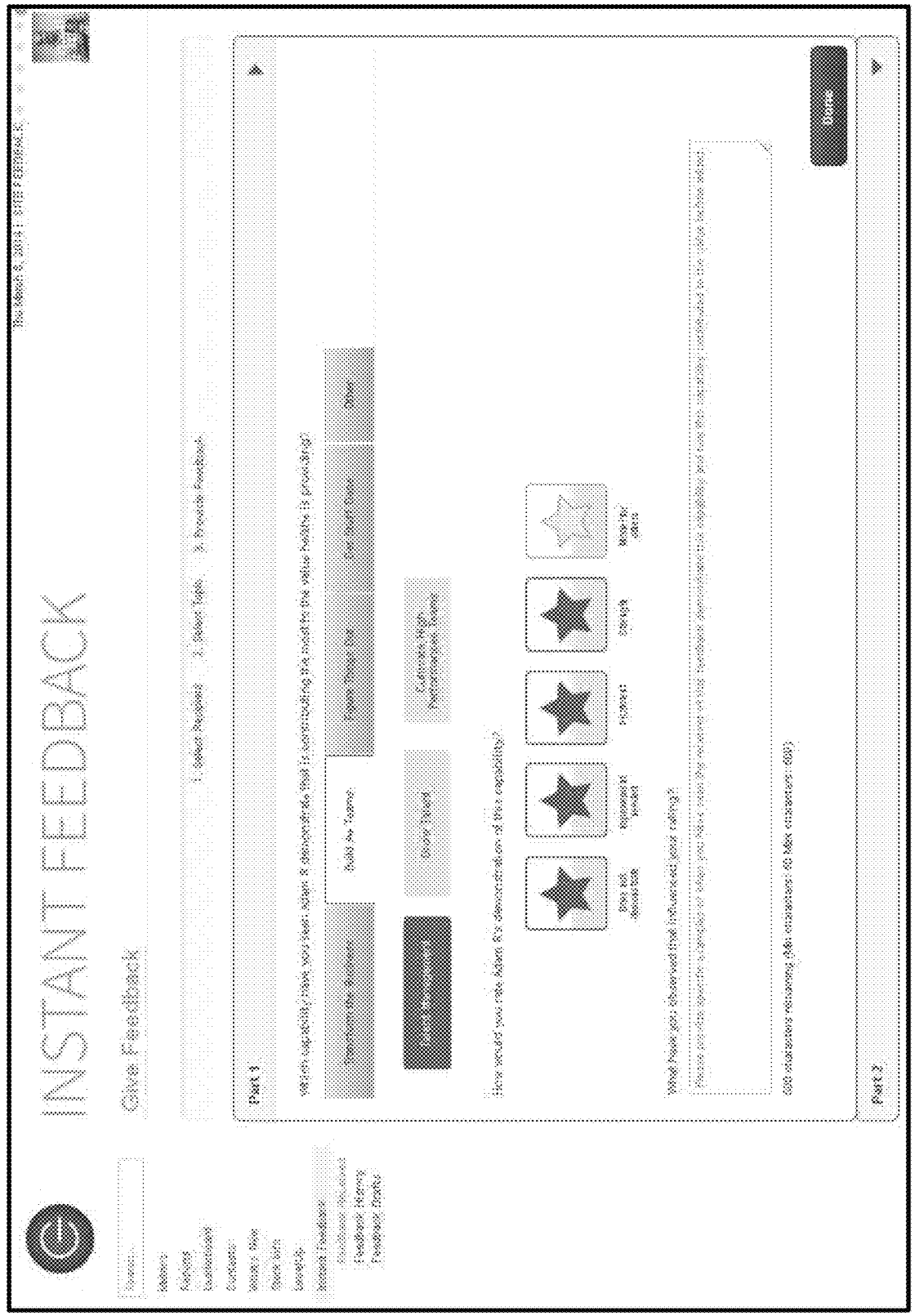
FIG. 41 illustrates an example screen image showing another "Give Feedback" page similar to that shown in FIG. 16, in accordance with a representative embodiment of the present disclosure.

FIG. 41 illustrates an example screen image 4100 showing another "Give Feedback" page similar to that shown in FIG. 16, in accordance with a representative embodiment of the present disclosure.

Figure 42:
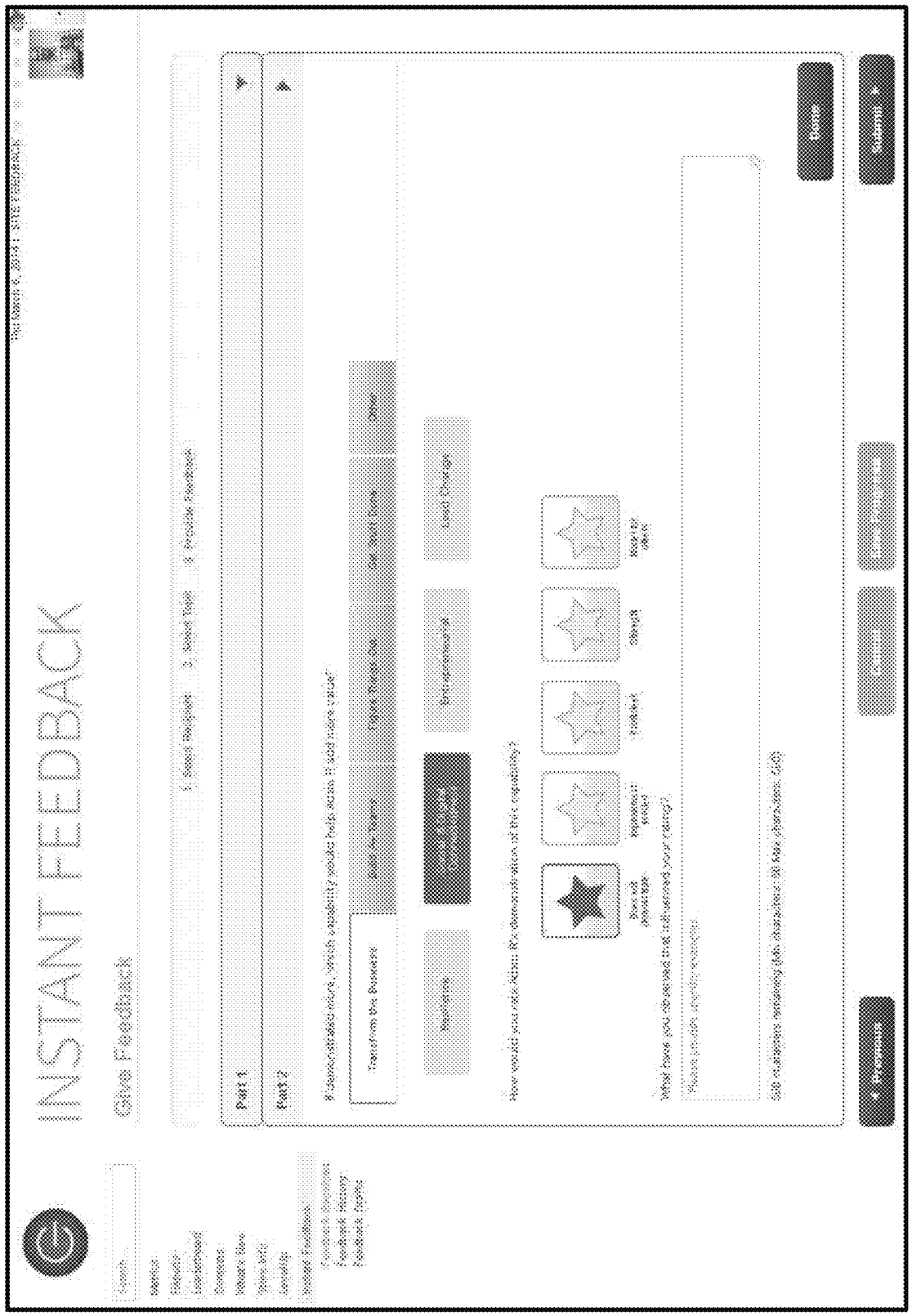
FIG. 42 illustrates an example screen image showing another "Give Feedback" page similar to that shown in FIG. 16, in accordance with a representative embodiment of the present disclosure.

FIG. 42 illustrates an example screen image 4200 showing another "Give Feedback" page similar to that shown in FIG. 16, in accordance with a representative embodiment of the present disclosure.

Figure 43:
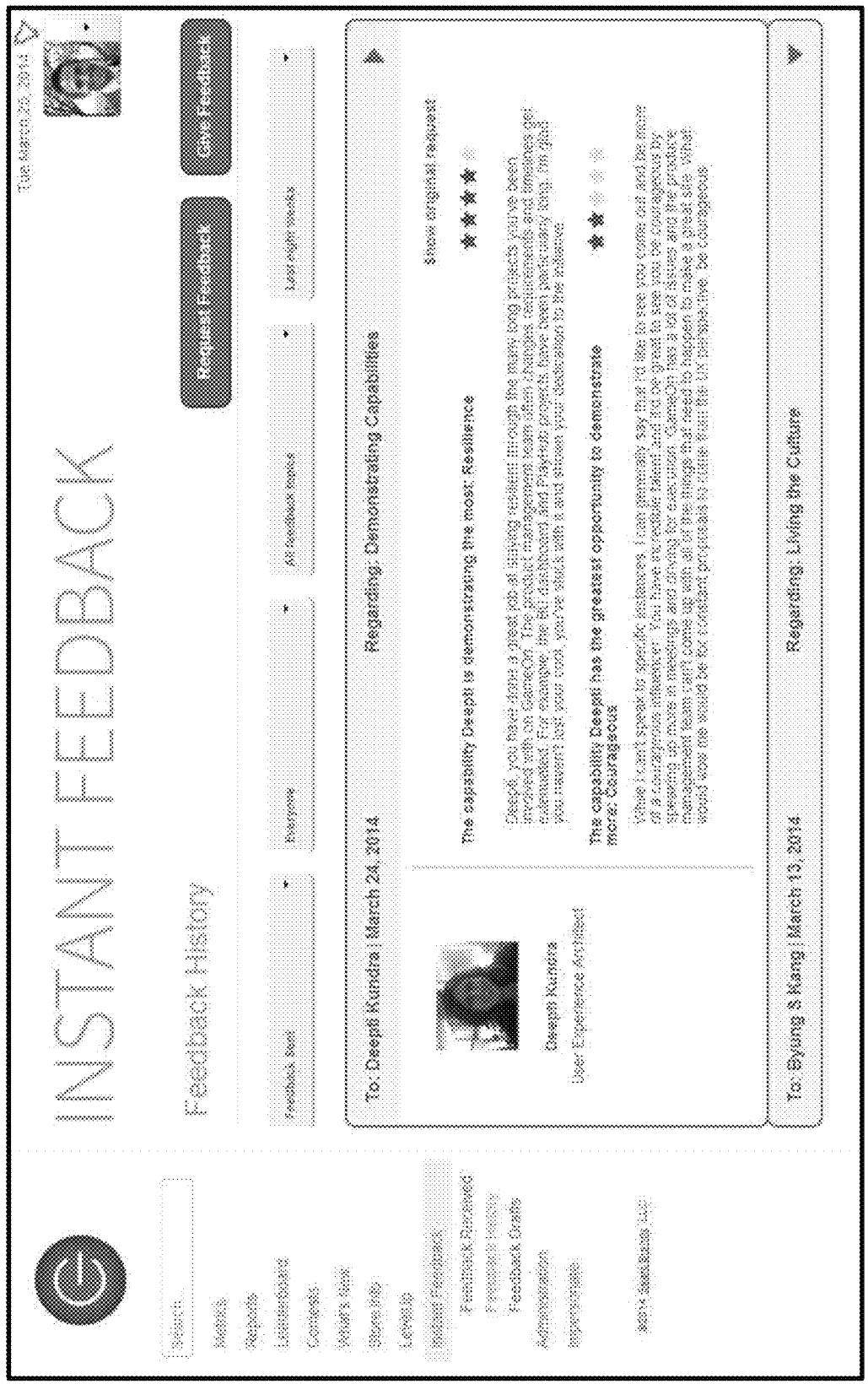
FIG. 43 illustrates an example screen image showing a "Feedback History" page, in accordance with a representative embodiment of the present disclosure.

FIG. 43 illustrates an example screen image 4300 showing a "Feedback History" page, in accordance with a representative embodiment of the present disclosure. The "Feedback History" page of FIG. 43 permits a member of the enterprise to choose to view feedback sent to others, feedback received from others, and to select feedback by the individual that sent the feedback or the individual to whom feedback was sent. The user may also view feedback by topic, and according to the time frame in which it was sent or received. The combination of these filters may result in no, one, or multiple feedback instances, which may be displayed in compact or expanded form, both of which are shown in the illustration of the example of FIG. 43. Each of the entries when displayed in expanded form may include a thumbnail picture, name, and role of the feedback sender or recipient, the date of the feedback, and the topic of the feedback. The user may also give or request feedback from the "Feedback History" page of FIG. 43.

Figure 44:
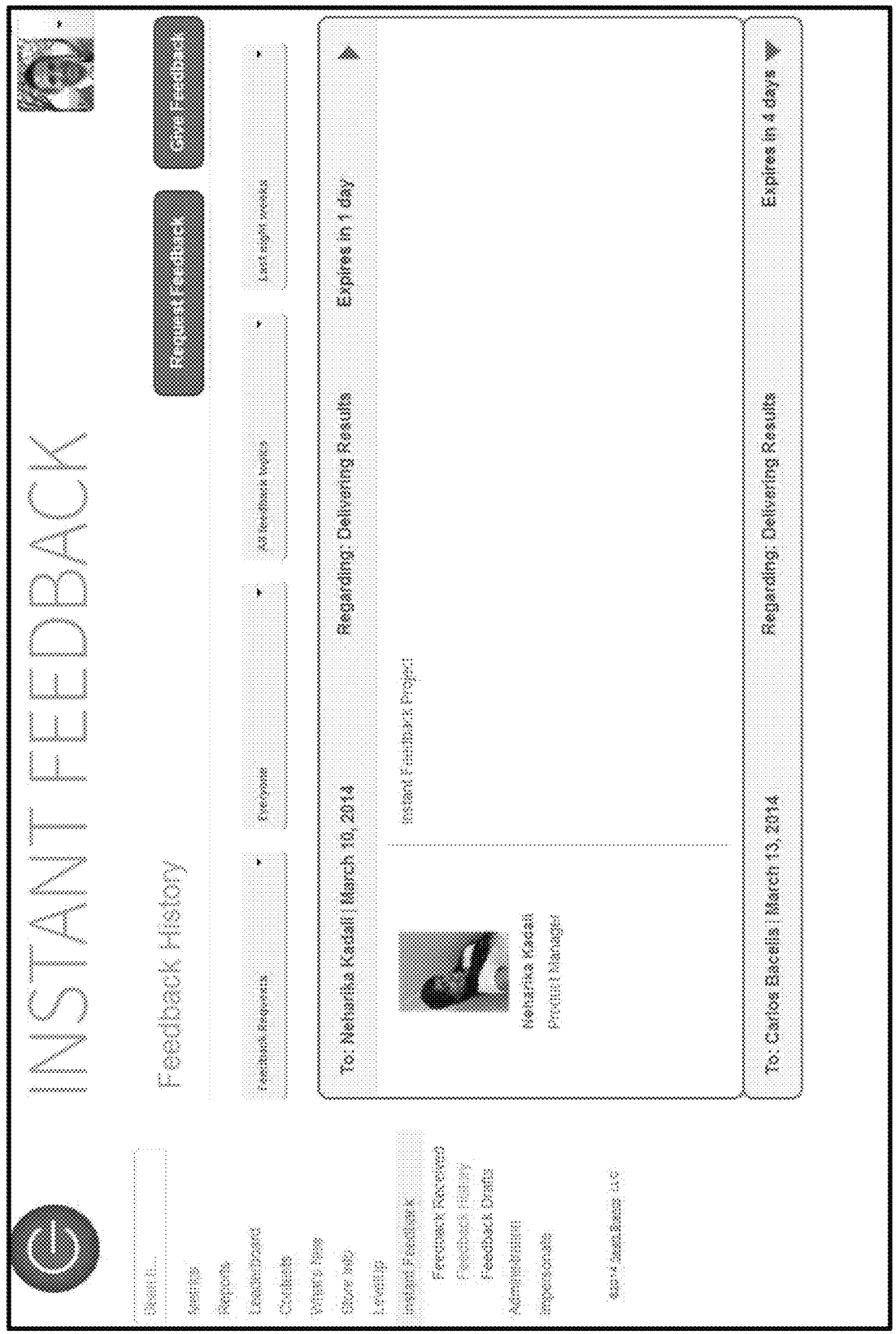
FIG. 44 illustrates an example screen image showing another "Feedback History" page similar to that shown in FIG. 43, in accordance with a representative embodiment of the present disclosure.

FIG. 44 illustrates an example screen image 4400 showing another "Feedback History" page similar to that shown in FIG. 43, in accordance with a representative embodiment of the present disclosure.

Figure 45:
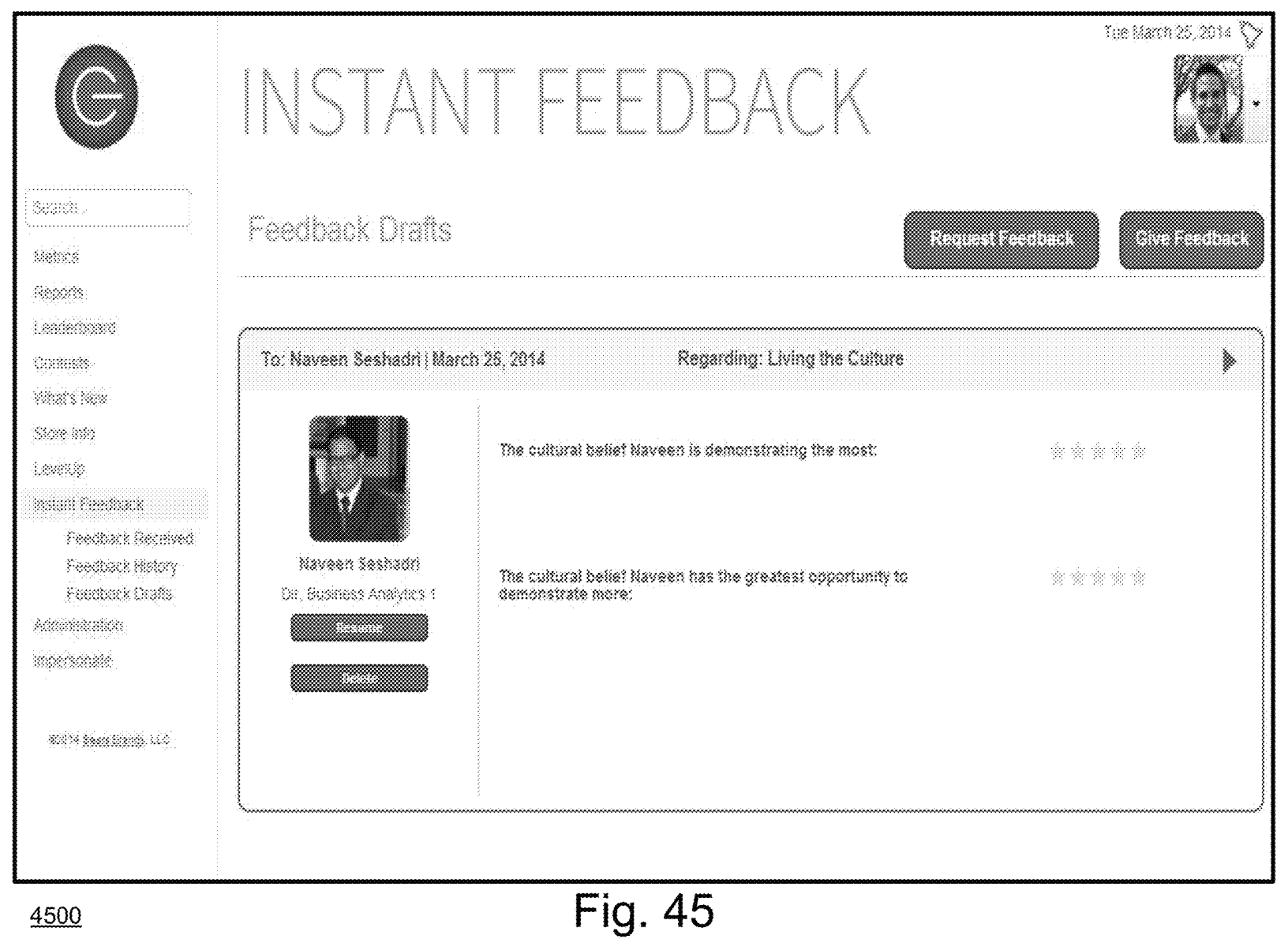

FIG. 45 illustrates an example screen image 4500 showing another "Feedback Drafts" page similar to that shown in FIG. 17, in accordance with a representative embodiment of the present disclosure.

Figure 46:
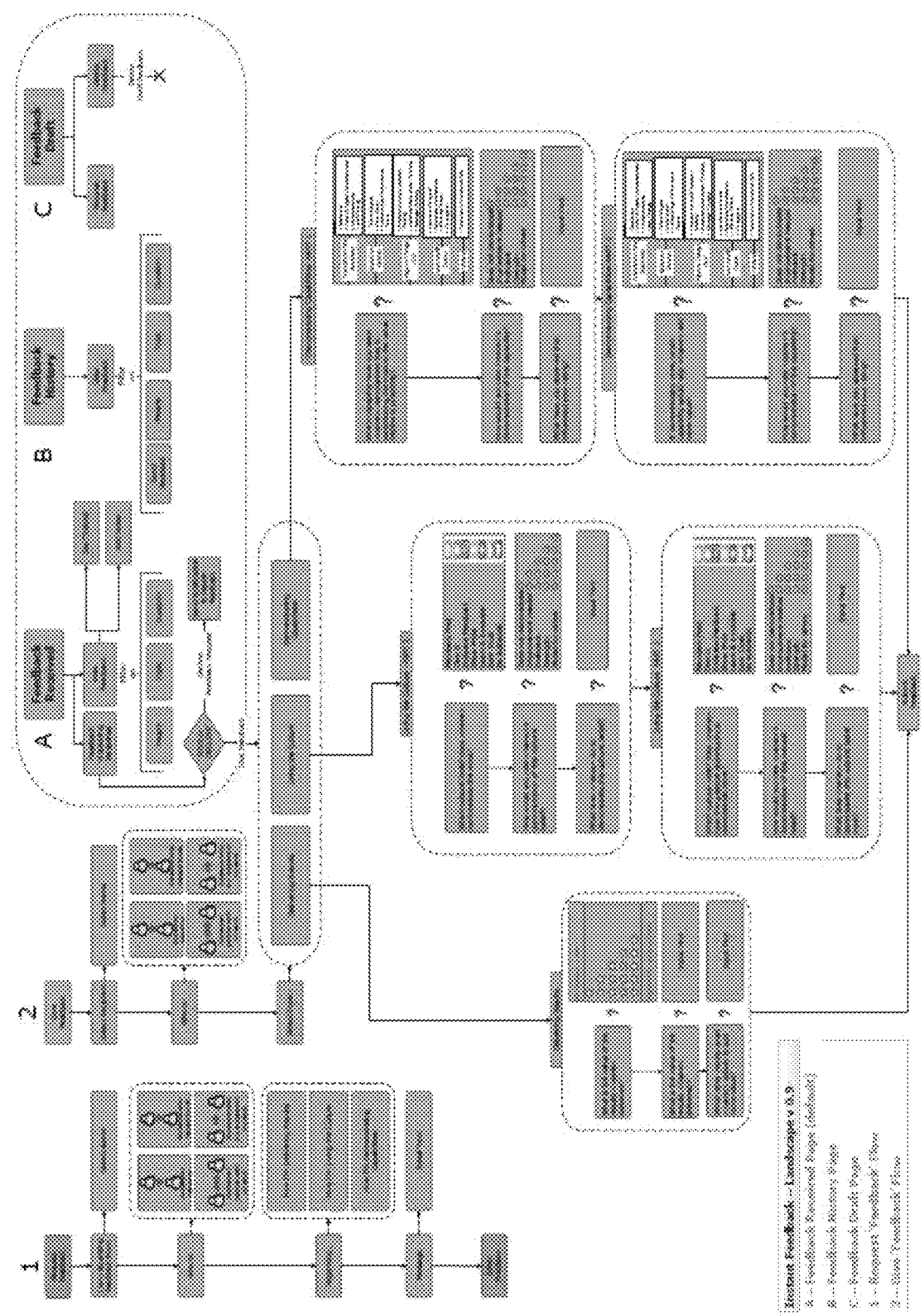
FIG. 46 illustrates an example user interface landscape showing various example portions of the information content to be conveyed to a user/member of an enterprise while using a system supporting ongoing worker feedback, in accordance with a representative embodiment of the present disclosure.

FIG. 46 illustrates an example user interface landscape 4600 showing various example portions of the information content to be conveyed to a user/member of an enterprise while using a system supporting ongoing worker feedback, in accordance with a representative embodiment of the present disclosure.

Figure 47:
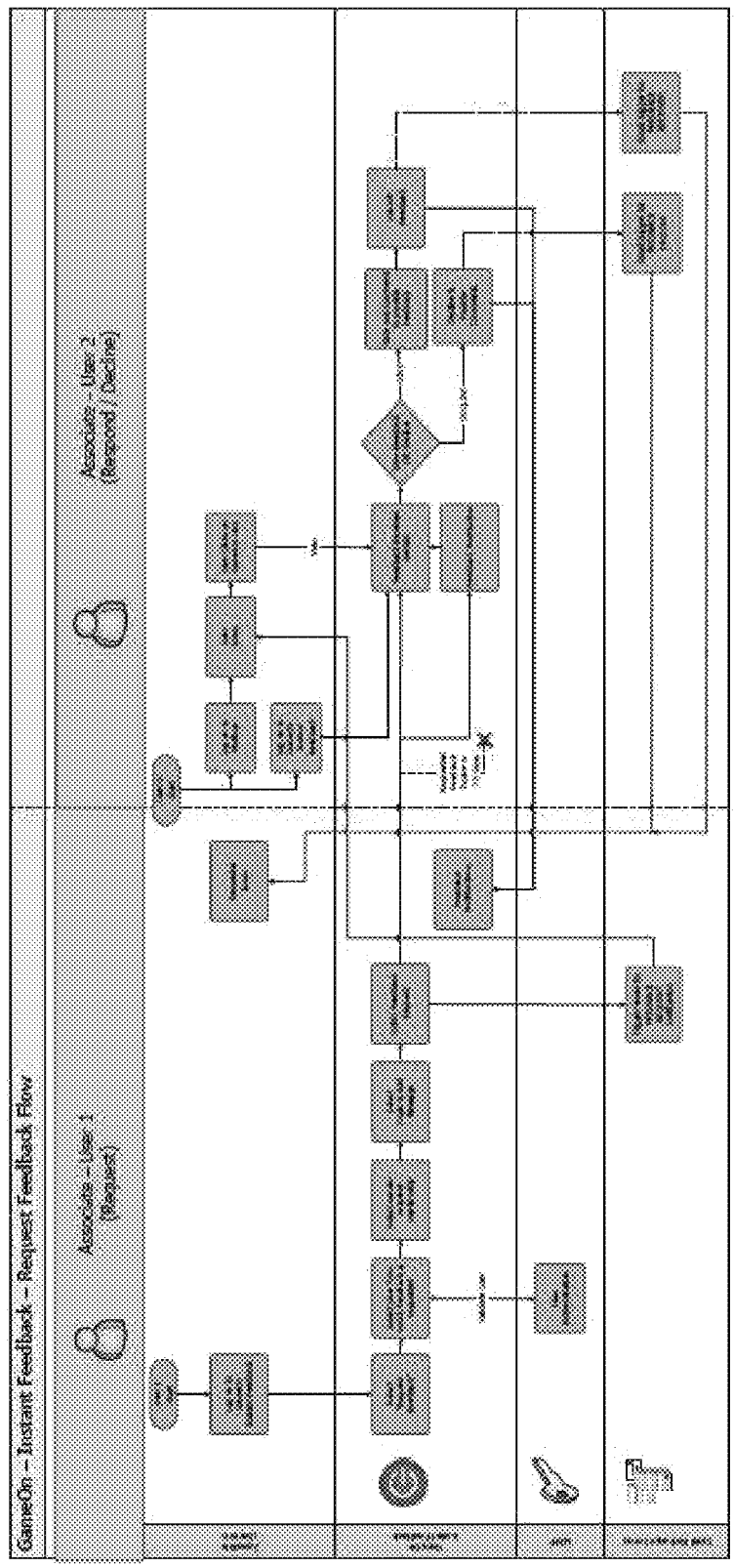
FIG. 47 illustrates an example flow diagram showing the flow of information and control during processing of a request for feedback, in accordance with a representative embodiment of the present disclosure.

FIG. 47 illustrates an example flow diagram showing the flow of information and control during processing of a request for feedback, in accordance with a representative embodiment of the present disclosure.

Figure 48:
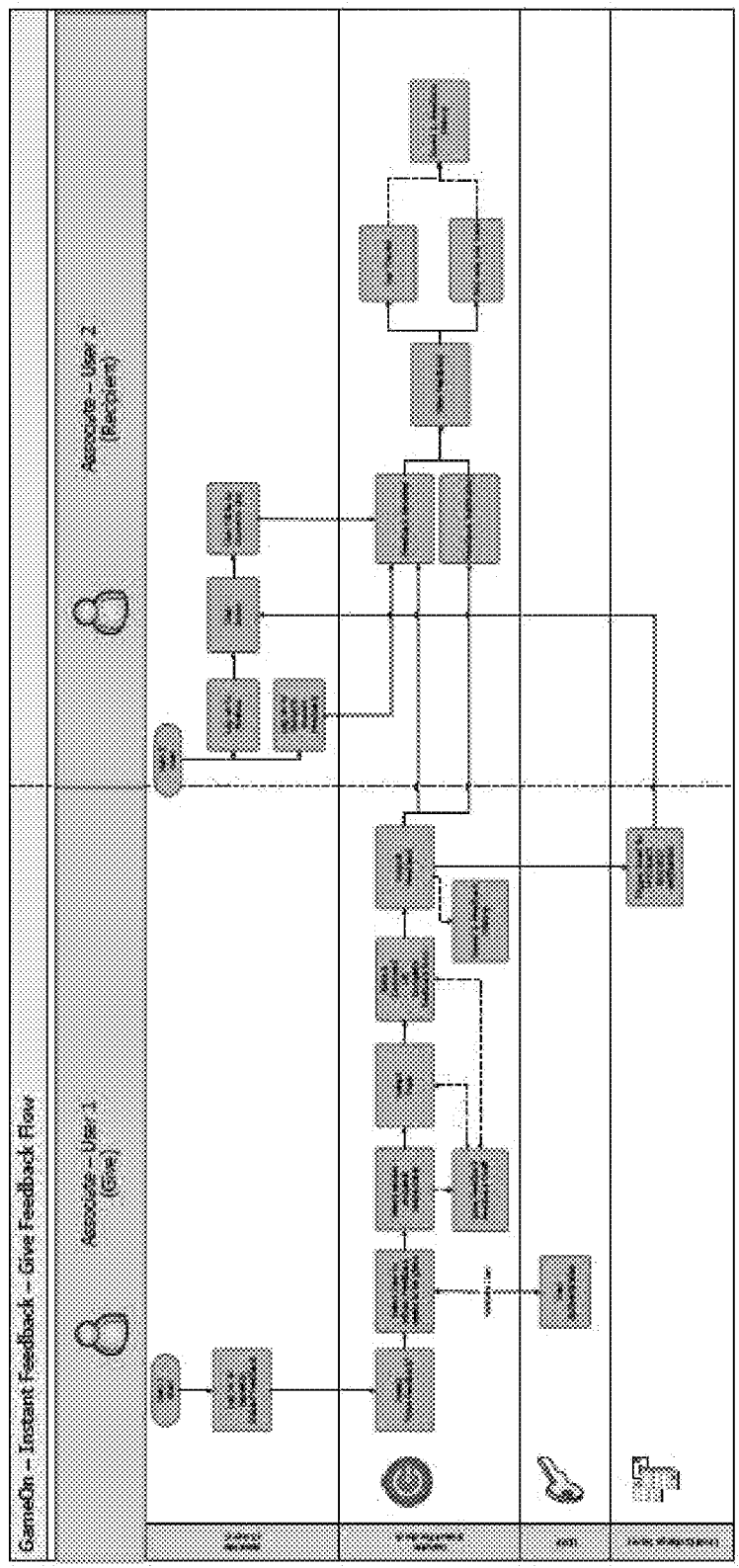
FIG. 48 illustrates an example flow diagram showing the flow of information and control during processing of feedback being given, in accordance with a representative embodiment of the present disclosure.

FIG. 48 illustrates an example flow diagram showing the flow of information and control during processing of feedback being given, in accordance with a representative embodiment of the present disclosure.

Figure 49:
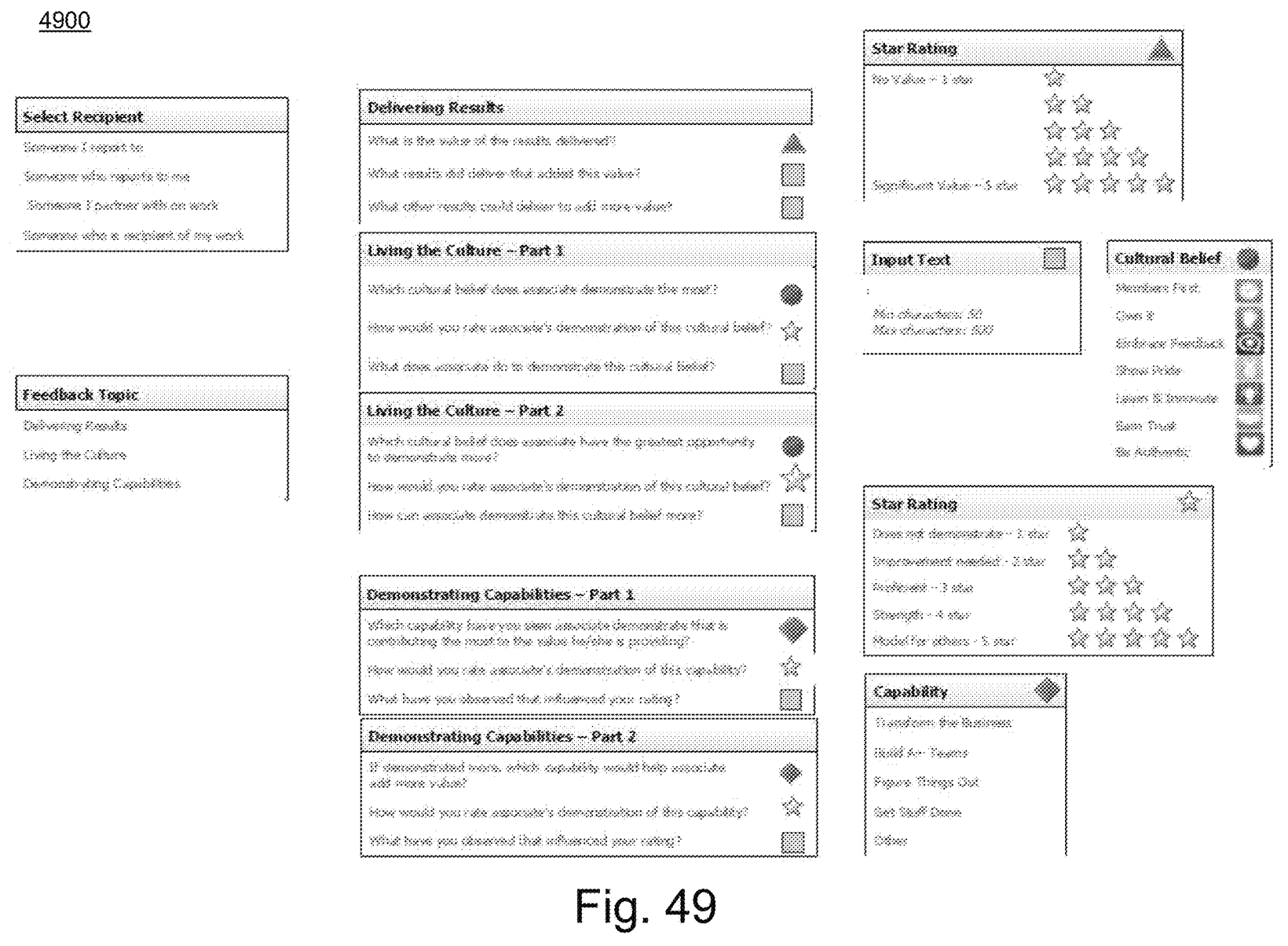

FIG. 49 illustrates a chart showing example topics, working relationships, capabilities, and questions to gather feedback, and quantitative scales used in user interfaces related to giving and requesting feedback, in accordance with a representative embodiment of the present disclosure.

Figure 50:
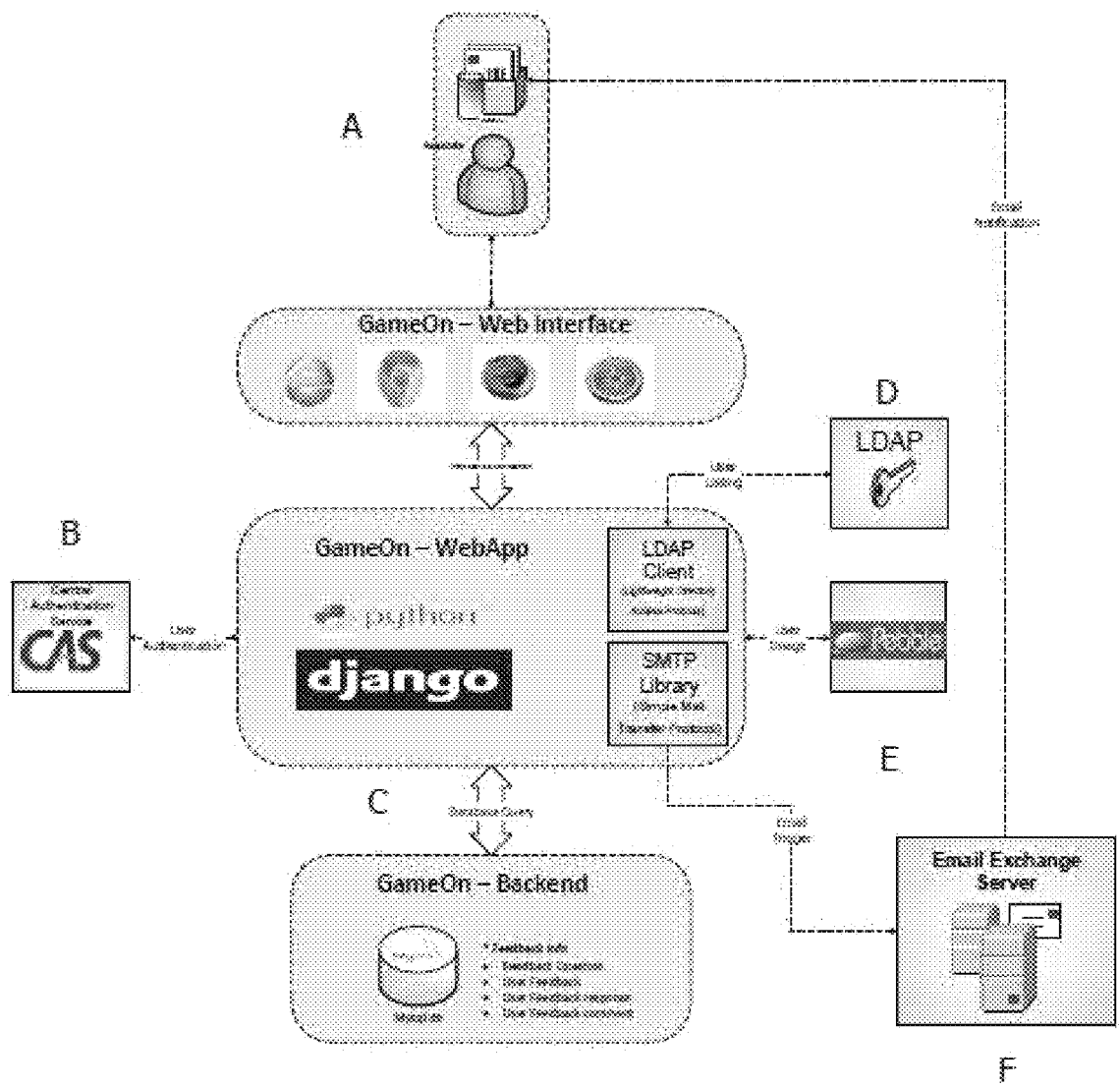
FIG. 50 illustrates an example system architecture showing the various functional blocks that may be used in implementing a system supporting ongoing worker feedback, in accordance with a representative embodiment of the present disclosure.

FIG. 50 illustrates an example system architecture showing the various functional blocks that may be used in implementing a system supporting ongoing worker feedback, in accordance with a representative embodiment of the present disclosure.

Figure 51:
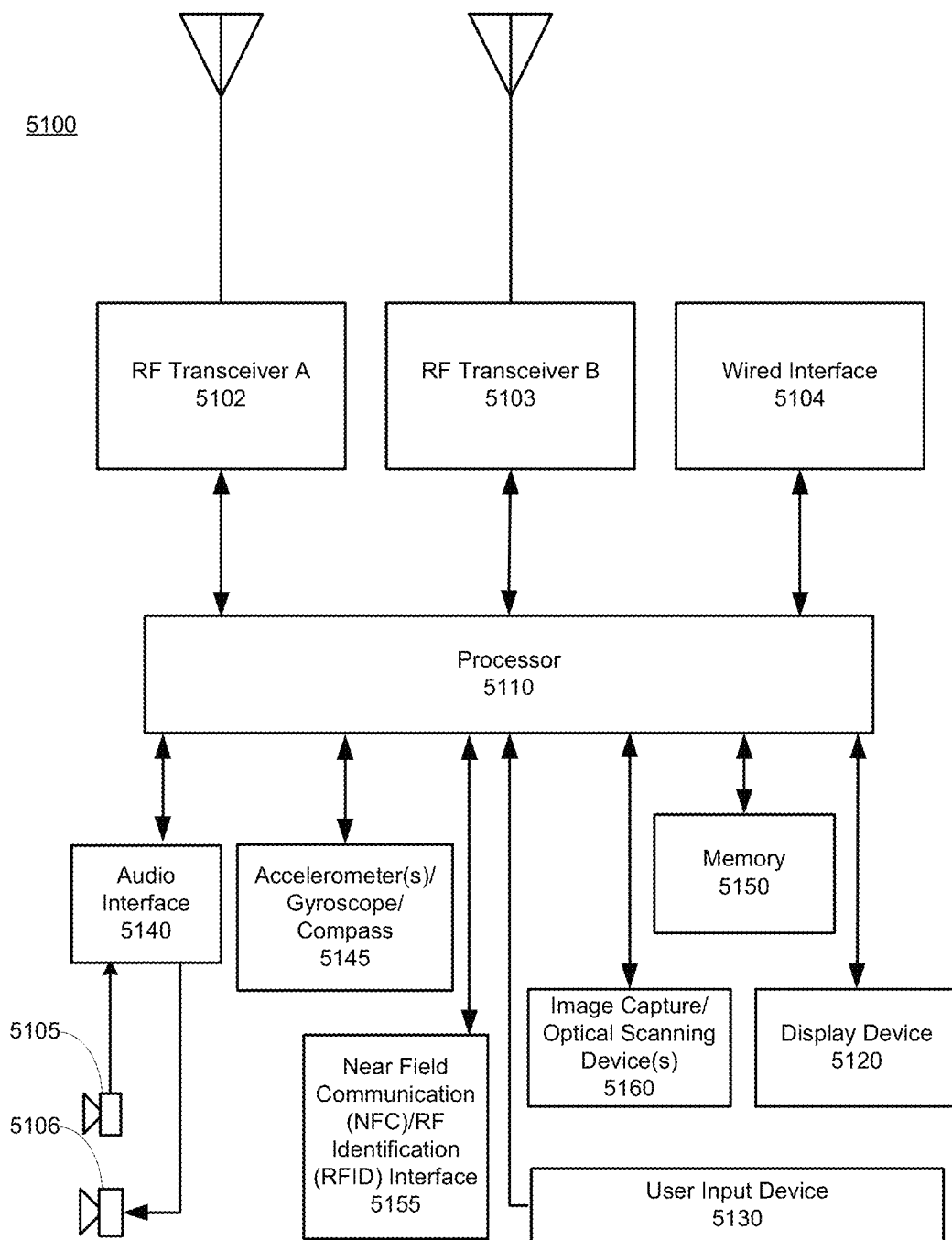
FIG. 51 is a block diagram illustrating a personal electronic device that may correspond, for example, to electronic devices shown in FIG. 1, in accordance with a representative embodiment of the present disclosure.

FIG. 51 is a block diagram illustrating a personal electronic device 5100 that may correspond, for example, to electronic devices 20, 20', 20" shown in FIG. 1, in accordance with a representative embodiment of the present disclosure. The personal electronic device 5100 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 51, the personal electronic device 5100 includes a processor 5110, an RF transceiver A 5102, an RF transceiver B 5103, a wired interface 5104, a display device 5120, a user input device 5130, an audio interface 5140, and a memory 5150. The processor 5110 may be, for example, a suitable microprocessor or microcomputer having sufficient computing power to control the personal electronic device 5100, and is operably coupled to the RF transceiver A 5102, the RF transceiver B 5103, and the wired interface 5104. The RF transceiver A 5102 and RF transceiver B 5103 may comprise any necessary circuitry, logic, and software/firmware for wireless communication over any of, for example, the cellular, Bluetooth, Wi-Fi (e.g., IEEE 802.11 a/b/g/n/ac), Zigbee, WiMAX, NFC (Near Field Communication), or any other wireless network known now or in the future. The wired interface 5104 may comprise any necessary circuitry, logic, and software/firmware for wired communication over any of, for example, an Ethernet, Universal Serial Bus, FireWire (IEEE 1394) or other wired networks known now or in the future.

The processor 5110 is also operably coupled to the memory 5150, and may be used for non-transitory storage of executable program instructions, parameters, and data for any of the circuitry of the personal electronic device 5100. The display device 5120 is also operably coupled to the processor 5110, and may comprise, for example, one or more LED, OLED, LCD, or other form of visual display capable of presenting text or graphics, and may comprise any circuitry, logic, or software/firmware to support, for example, a graphical user interface (GUI). The user input device 5130 may comprise, for example, suitable switches, buttons, or touch sensitive surfaces to enable user control and operation of the personal electronic device 5100, and may comprise any necessary circuitry, logic, and software/firmware to allow it to perform those functions. In a representative embodiment of the present disclosure, the user input device 5130 may be a touch sensitive surface at the viewing side of the display device 5120, enabling a user to use the touch sensitive surface of the display device to enter user inputs and respond to displayed information. The audio interface 5140 comprises any necessary circuitry, logic, and software to interface a microphone 5105 and a speaker 5106 to the processor 5110.

Aspects of the present disclosure may be found in a method of operating a system that supports the ongoing communication, tracking, and management review of feedback among a population of end users of the system comprising workers and managers of the workers. Such a method may comprise providing a repository of data comprising information representing working relationships of the population of end users and information representing each request for feedback and each feedback response submitted by each of the population of end users. The method may also comprise guiding creation, by a first end-user of the population of end users, of a request for feedback to a second end user of the population of end users, wherein the first end user and the second end user known to one another, and storing the request for feedback in the repository of data in association with the first end user and the second end user. The method may further comprise assigning one or both of an expiration date and an expiration time to the request for feedback, and guiding creation, by the second end user, of a feedback response to the first end user, the feedback response comprising one or both of quantitative feedback representing a rank or scale of a characteristic of the first end user selected by the second end user and qualitative feedback comprising textual information provided by the second end user. The method may also comprise analyzing any quantitative feedback in one or more feedback responses for the second end user, in view of the working relationships of the population of end users; and upon request of a manager of the second end user, delivering one or both of the analysis of quantitative feedback for the second end user and the qualitative feedback for the second end user, to the manager of the second end user.

In a representative embodiment of the present disclosure, the method further comprise transmitting a reminder to the second end user, based on the one or both of an expiration date and an expiration time. The method may also comprise storing, in the repository of data in association with the second end user, an indication of failure respond to the request for feedback of the first end user, if the second end user does not respond to the request for feedback of the first end user by the one or both of an expiration date and an expiration time. The method may further comprise notifying the first end user upon receipt of the feedback response of the second end user, and making the request for feedback unavailable for access by the second end user, upon occurrence of the one or both of an expiration date and an expiration time. In a representative embodiment of the present disclosure, guiding creation of the request for feedback may comprise creating the request for feedback based on feedback stored for the first end user, and the repository of data may be configured to support reporting of all quantitative feedback associated with end users managed by a particular manager.

Additional aspects of the present disclosure may be seen in a system that supports the ongoing communication, tracking, and management review of feedback among a population of end users of the system comprising workers and managers of the workers. Such a system may comprise one or more computer systems communicatively coupled to a repository of data comprising information representing working relationships of the population of end users and information representing each request for feedback and each feedback response submitted by each of the population of end users. The one or more computers may be operable to, at least, perform the steps of the method described above.

Further aspects of the present disclosure may be observed in a non-transitory computer-readable medium comprising executable instructions for causing one or more processor to perform the steps of a method of operating a system that supports the ongoing communication, tracking, and management review of feedback among a population of end users of the system comprising workers and managers of the workers. In such an embodiment, the steps of the method may be as described above.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure as defined by this disclosure and appended diagrams.

Accordingly, embodiments in accordance with the present disclosure may be realized in hardware, software, or a combination of hardware and software. Embodiments in accordance with the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Embodiments of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method of operating a system that supports the ongoing communication, tracking, and management review of feedback among a population of end users of the system comprising workers and managers of the workers, the method comprising:
  providing, in one or more electronic memory devices, a repository for storing data comprising:
    information representing working relationships of the population of end users;
    information representing each request for feedback; and
    information representing feedback submitted by each of the population of end users;
  generating, by a processing circuitry of the system, at least one first graphical user interface (GUI) via which a first end user of the population of end users is enabled to input, using one or more input devices of the system, first information representing feedback from the first end user regarding a second end user of the population of end users;
  storing the first information in the one or more electronic memory devices, and associating, in the repository of data by the processing circuitry, the first information with the first end user and the second end user;
  analyzing, by the processing circuitry, information stored in the repository representing feedback regarding the second end user, to determine areas of performance behaviors for which information representing feedback is missing or which information represents feedback from less than a certain number of end users of the population of end users;
  generating, by the processing circuitry, at least one second GUI via which a third end user of the population of end users is enabled to input, using one or more input devices of the system, second information representing feedback from the third end user regarding the second end user, wherein the generating comprises adjusting the second GUI for gathering third information representing feedback on areas of additional performance behaviors, based on the determined areas of performance behaviors for which information representing feedback is missing or for which feedback was received from less than the certain number of end users of the population of end users;

storing the second information in the one or more electronic memory devices, and associating, in the repository of data by the processing circuitry, the third end user and the second end user; and generating, by the processing circuitry, at least one third GUI via which a manager of the second end user is enabled to view one or both of:
an analysis of quantitative feedback for the second end user; and
qualitative feedback for the second end user.

2. The method according to claim 1, wherein feedback from the first end user and feedback from the third end user each comprise one or both of:
quantitative feedback representing a rank or scale of a characteristic of the second end user; and
qualitative feedback comprising textual information describing a characteristic of the second end user.

3. The method according to claim 1, the method further comprising:
storing, in the repository of data in association with the second end user, an indication of a request for feedback received by the second end user from a fourth end user of the population of end users, an identity of the fourth end user, and one or both of an expiration date and an expiration time.

4. The method according to claim 3, the method further comprising:
notifying, via a reminder transmitted over an electronic network, the fourth end user upon receipt of the feedback requested from the second end user.

5. The method according to claim 3, the method further comprising:
making the request for feedback unavailable for access by the second end user, upon occurrence of the one or both of the expiration date and the expiration time.

6. The method according to claim 1, wherein the repository of data is configured to support reporting of all quantitative feedback associated with end users managed by a particular manager.

7. The method according to claim 1, wherein the at least one first GUI comprises one or more graphical elements that enable the first end user to indicate a working relationship of the first end user to the second end user; and wherein the method further comprises verifying that the first end user has the indicated working relationship to the second end user, based upon information in the repository.

8. A system that supports the ongoing communication, tracking, and management review of feedback among a population of end users of the system comprising workers and managers of the workers, the system comprising:
one or more electronic memory devices that store a repository of data comprising information representing working relationships of the population of end users, information representing each request for feedback, and information representing feedback submitted by each of the population of end users; and
processing circuitry operable to:
generate at least one first graphical user interface (GUI) via which a first end user of the population of end users is enabled to input, using one or more input devices of the system, first information representing feedback from the first end user regarding a second end user of the population of end users;

store the first information in the one or more memory devices, and associate, in the repository of data, the first information with the first end user and the second end user;

analyze information stored in the repository representing feedback regarding the second end user, to determine areas of performance behaviors for which information representing feedback is missing or which information represents feedback from less than a certain number of end users of the population of end users;

generate at least one second GUI via which a third end user of the population of end users is enabled to input, using one or more input devices of the system, second information representing feedback from the third end user regarding the second end user, wherein the generating comprises adjusting the second GUI for gathering third information representing feedback on areas of additional performance behaviors, based on the determined areas of performance behaviors for which information representing feedback is missing or for which feedback was received from less than the certain number of end users of the population of end users;

store the second information in the one or more electronic memory devices, and associate, in the repository of data, the third end user and the second end user; and generate at least one third GUI via which a manager of the second end user is enabled to view one or both of:
an analysis of quantitative feedback for the second end user; and
qualitative feedback for the second end user.

9. The system according to claim 8, wherein feedback from the first end user and feedback from the third end user each comprise one or both of:
quantitative feedback representing a rank or scale of a characteristic of the second end user; and
qualitative feedback comprising textual information describing a characteristic of the second end user.

10. The system according to claim 8, wherein the processing circuitry is further operable to, at least:
store, in the repository of data in association with the second end user, an indication of a request for feedback received by the second end user from a fourth end user of the population of end users, an identity of the fourth end user, and one or both of an expiration date and an expiration time.

11. The system according to claim 10, wherein the processing circuitry is further operable to, at least:
notify, via a reminder transmitted over an electronic network, the fourth end user upon receipt of the feedback requested from the second end user.

12. The system according to claim 10, wherein the processing circuitry is further operable to, at least:
make the request for feedback unavailable for access by the second end user, upon occurrence of the one or both of the expiration date and the expiration time.

13. The system according to claim 8, wherein the repository of data is configured to support reporting of all quantitative feedback associated with end users managed by a particular manager.

14. The system according to claim 8, wherein the at least one first GUI comprises one or more graphical elements that enable the first end user to indicate a working relationship of the first end user to the second end user; and wherein the processing circuitry is further operable to verify that the first end user has the indicated working relationship to the second end user, based upon information in the repository.

15. A non-transitory computer-readable medium comprising executable instructions that, when executed by processing circuitry of a system that supports the ongoing communication, tracking, and management review of feedback among a population of end users of the system comprising workers and managers of the workers, cause the processing circuitry to perform a method comprising:

generating at least one first graphical user interface (GUI) via which a first end user of the population of end users is enabled to input, using one or more input devices of the system, first information representing feedback from the first end user regarding a second end user of the population of end users;

storing the first information in a repository of data comprising one or more electronic memory devices, and associating, in the repository, data comprising information representing working relationships of the population of end users, information representing each request for feedback, information representing feedback submitted by each of the population of end users, and the first end user and the second end user;

analyzing information stored in the repository representing feedback regarding the second end user, to determine areas of performance behaviors for which information representing feedback is missing or which information represents feedback from less than a certain number of end users of the population of end users;

generating at least one second GUI via which a third end user of the population of end users is enabled to input, using one or more input devices of the system, second information representing feedback from the third end user regarding the second end user, wherein the generating comprises adjusting the second GUI for gathering third information representing feedback on areas of additional performance behaviors, based on the determined areas of performance behaviors for which information representing feedback is missing or for which feedback was received from less than the certain number of end users of the population of end users;

storing the second information in the one or more electronic memory devices, and associating, in the repository of data, the third end user and the second end user; and generating at least one third GUI via which a manager of the second end user is enabled to view one or both of:

an analysis of quantitative feedback for the second end user; and qualitative feedback for the second end user.

16. The non-transitory computer-readable medium according to claim 15, wherein feedback from the first end user and feedback from the third end user each comprise one or both of:

quantitative feedback representing a rank or scale of a characteristic of the second end user; and qualitative feedback comprising textual information describing a characteristic of the second end user.

17. The non-transitory computer-readable medium according to claim 15, the steps of the method further comprising:

storing, in the repository of data in association with the second end user, an indication of a request for feedback received by the second end user from a fourth end user of the population of end users, an identity of the fourth end user, and one or both of an expiration date and an expiration time.

18. The non-transitory computer-readable medium according to claim 17, the steps of the method further comprising:

notifying, via a reminder transmitted over an electronic network, the fourth end user upon receipt of the feedback requested from the second end user.

19. The non-transitory computer-readable medium according to claim 17, the steps of the method further comprising:

making the request for feedback unavailable for access by the second end user, upon occurrence of the one or both of the expiration date and the expiration time.

20. The non-transitory computer-readable medium according to claim 15, wherein the repository of data is configured to support reporting of all quantitative feedback associated with end users managed by a particular manager.

21. The non-transitory computer-readable medium according to claim 15, wherein the at least one first GUI comprises one or more graphical elements that enable the first end user to indicate a working relationship of the first end user to the second end user; and wherein the method further comprises verifying that the first end user has the indicated working relationship to the second end user, based upon information in the repository.

* * * * *